United States Patent

Sato et al.

[11] Patent Number: 5,974,269
[45] Date of Patent: Oct. 26, 1999

[54] IMAGE BLUR PREVENTING APPARATUS

[75] Inventors: Shigeki Sato, Yokohama; Koichi Washisu; Seiichi Kashiwaba, both of Tokyo; Takashi Watanabe, Fuchu, all of Japan

[73] Assignee: Canon Kabushiki Kaisha, Tokyo, Japan

[21] Appl. No.: 08/965,531

[22] Filed: Nov. 6, 1997

[30] Foreign Application Priority Data

Nov. 17, 1996 [JP] Japan ................................. 8-295029
Apr. 17, 1997 [JP] Japan ................................. 9-114198
Apr. 17, 1997 [JP] Japan ................................. 9-114199

[51] Int. Cl.⁶ .................................................. G03B 17/00
[52] U.S. Cl. ............................................................ 396/55
[58] Field of Search ........................................ 396/52, 55

[56] References Cited

U.S. PATENT DOCUMENTS

| | | | |
|---|---|---|---|
| 4,869,108 | 9/1989 | Washisu | 73/517 |
| 4,965,619 | 10/1990 | Shikaumi et al. | 354/410 |
| 5,020,369 | 6/1991 | Washisu et al. | 73/517 |
| 5,153,633 | 10/1992 | Otani | 396/55 |
| 5,181,056 | 1/1993 | Noguchi et al. | 396/55 |
| 5,402,202 | 3/1995 | Washisu et al. | 354/435 |
| 5,608,703 | 3/1997 | Washisu | 369/55 |
| 5,633,756 | 5/1997 | Kaneda et al. | 396/55 |
| 5,745,801 | 4/1998 | Taguchi | 396/55 |
| 5,748,995 | 5/1998 | Kitagawa et al. | 396/55 |
| 5,758,203 | 5/1998 | Konno | 396/55 |
| 5,771,405 | 6/1998 | Hirano | 396/55 |
| 5,781,805 | 7/1998 | Shiomi | 396/55 |

FOREIGN PATENT DOCUMENTS

| | | |
|---|---|---|
| 62-18875 | 1/1987 | Japan . |
| 3-188430 | 8/1991 | Japan . |
| 7-98469 | 4/1995 | Japan . |

*Primary Examiner*—Russell Adams
*Attorney, Agent, or Firm*—Fitzpatrick, Cella, Harper & Scinto

[57] ABSTRACT

This specification discloses an image blur preventing apparatus having a movable member moved for image blur prevention, a driving device producing a drive force for operating the movable member in conformity with a signal conforming to the blur, a regulating member for regulating the movement of the movable member, the regulating member being movable to a regulating position for effecting the regulation and a non-regulating position in which the regulation has been released, and a step driving motor for moving the regulating member to at least one of the regulating position and the non-regulating position,:wherein the regulating member is moved by the step driving motor and the regulating member is held at a predetermined position by its self-holding force during the non-electrical energization of the step driving motor.

13 Claims, 34 Drawing Sheets

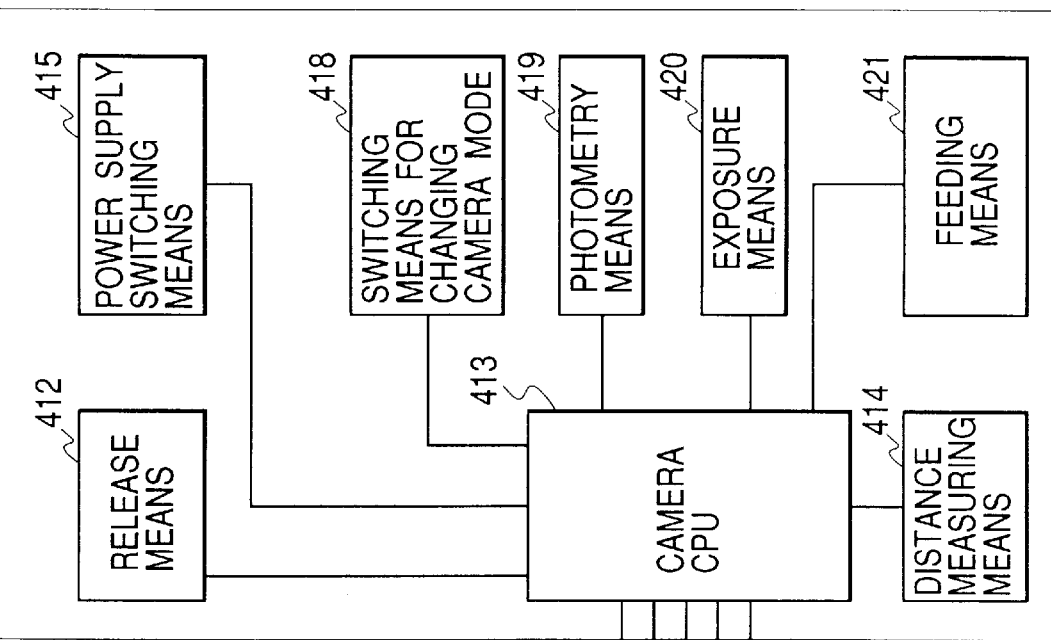
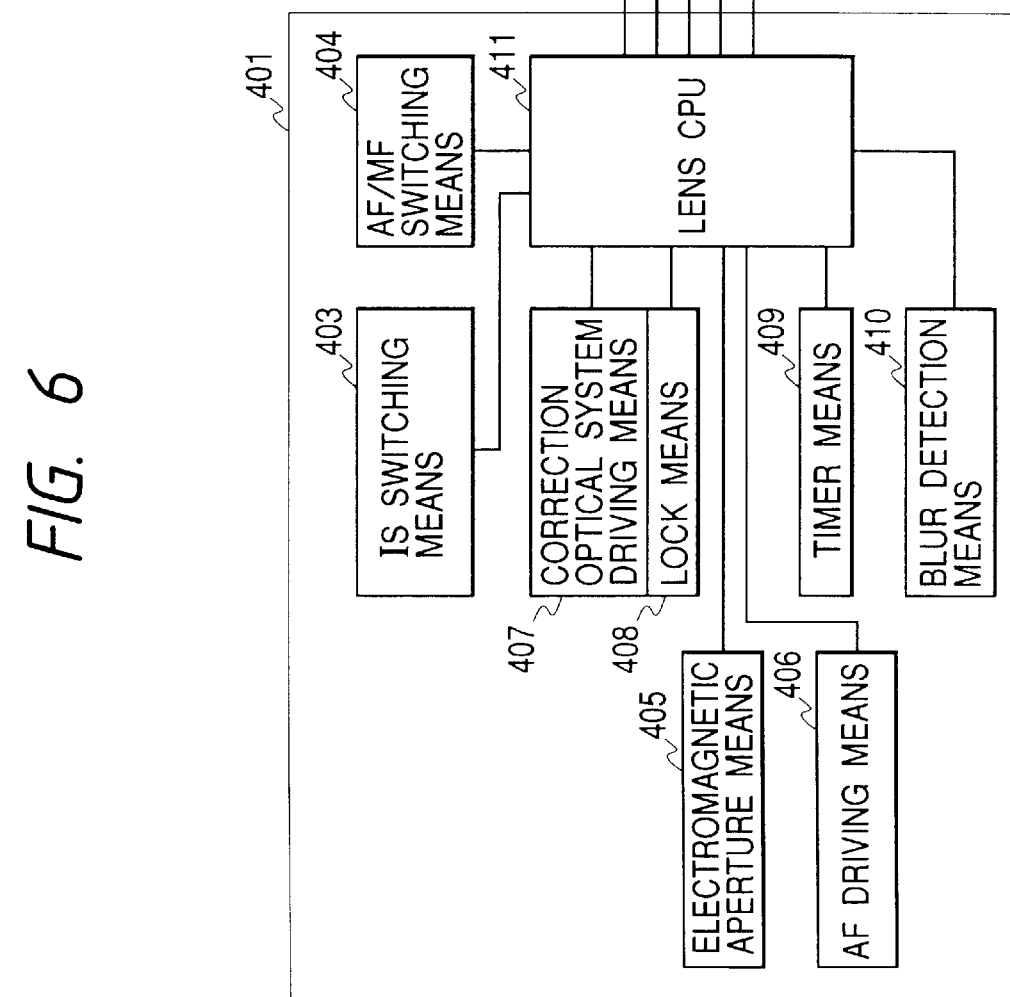
FIG. 6

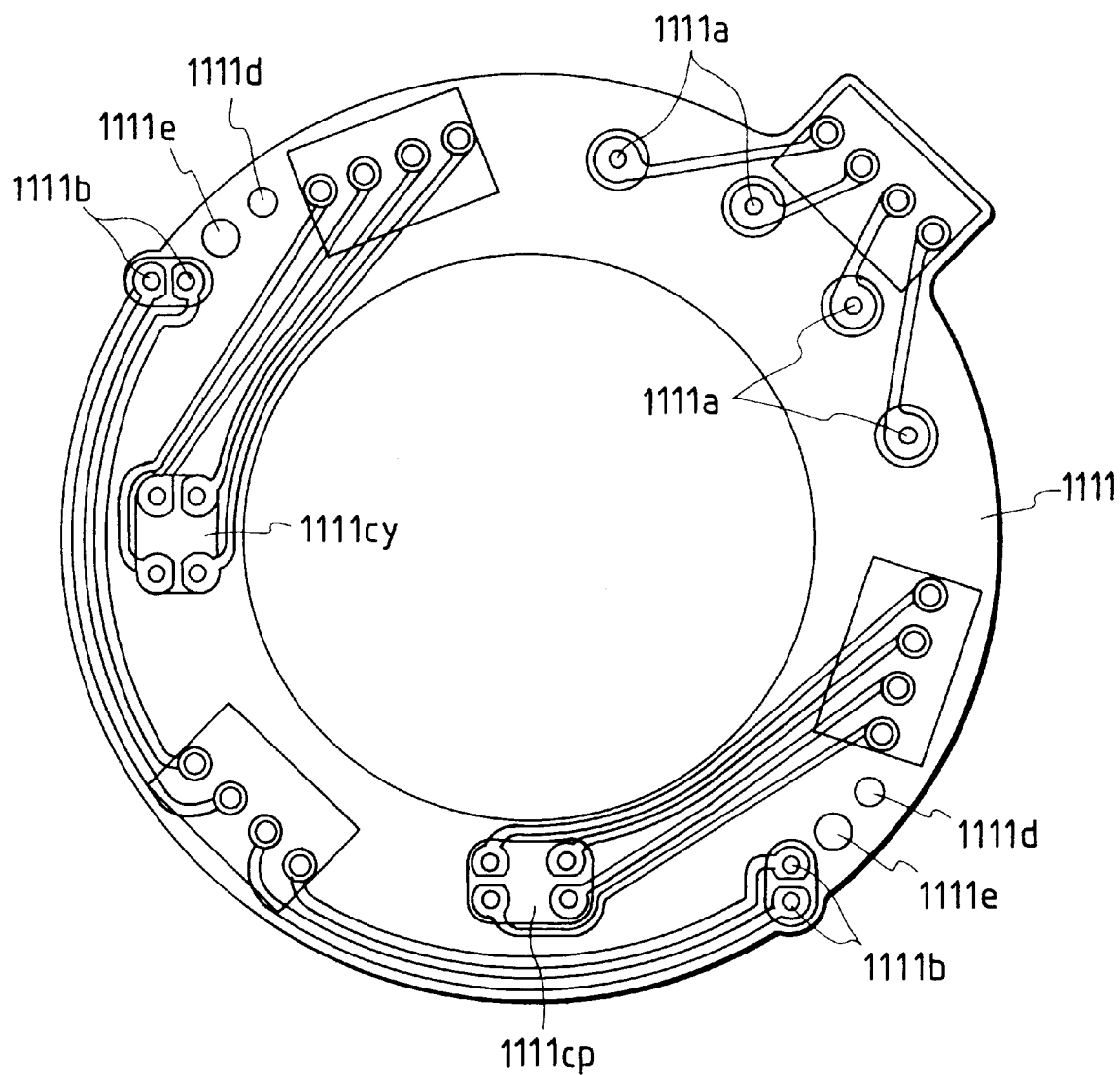

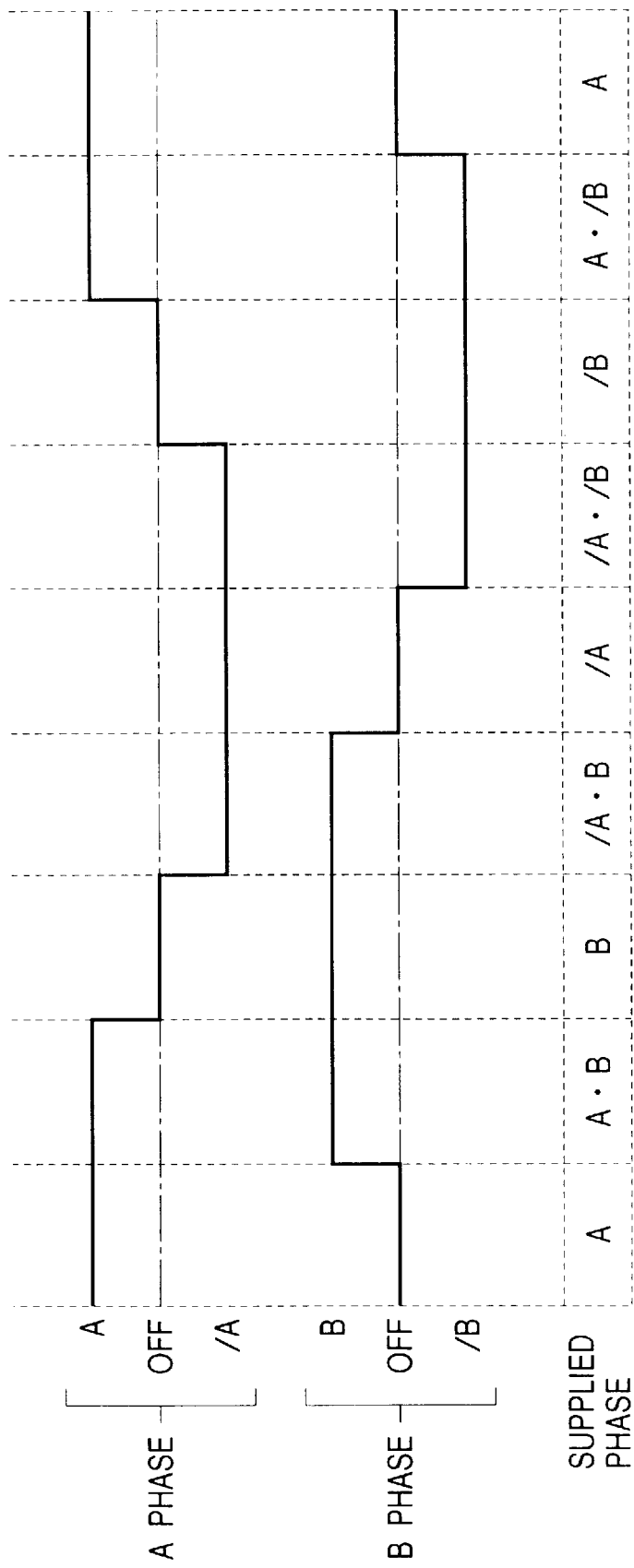

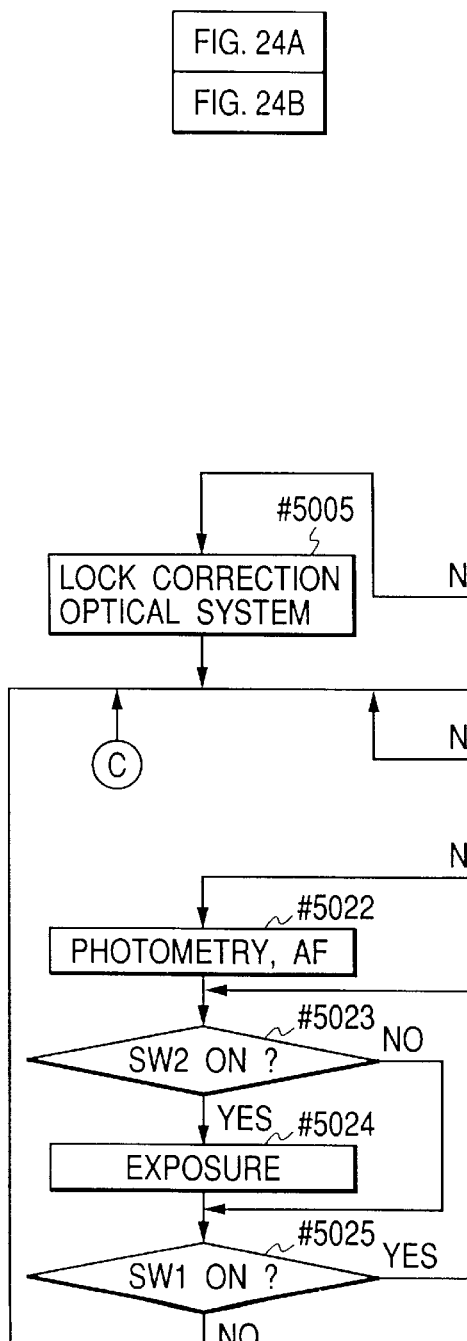
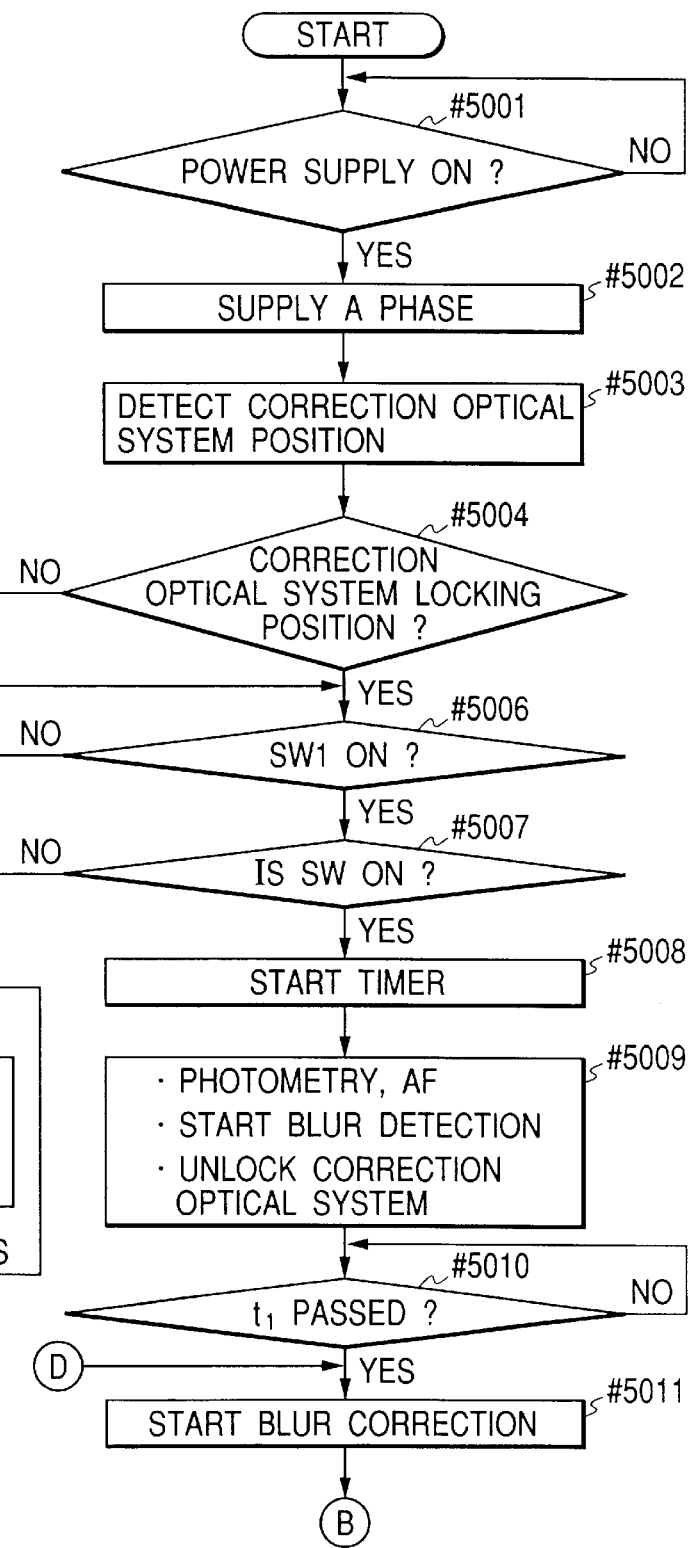
FIG. 24
FIG. 24A

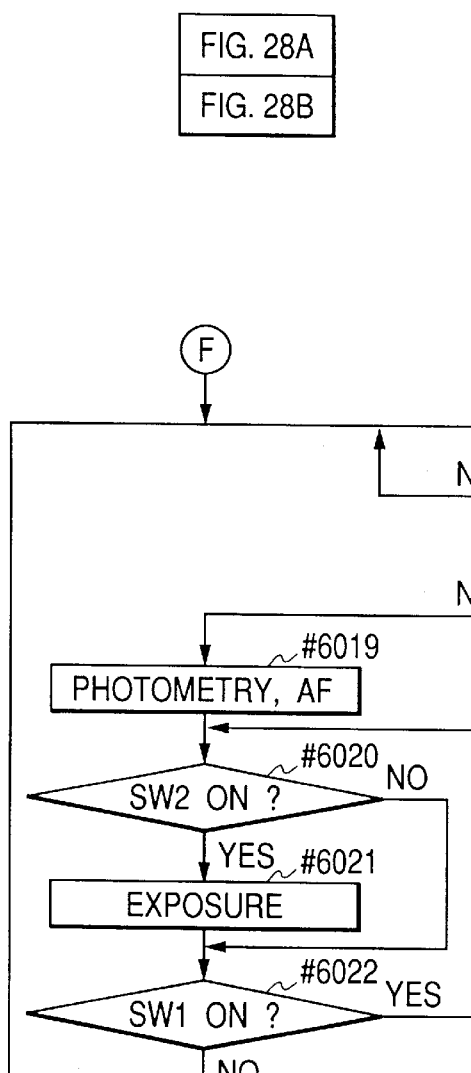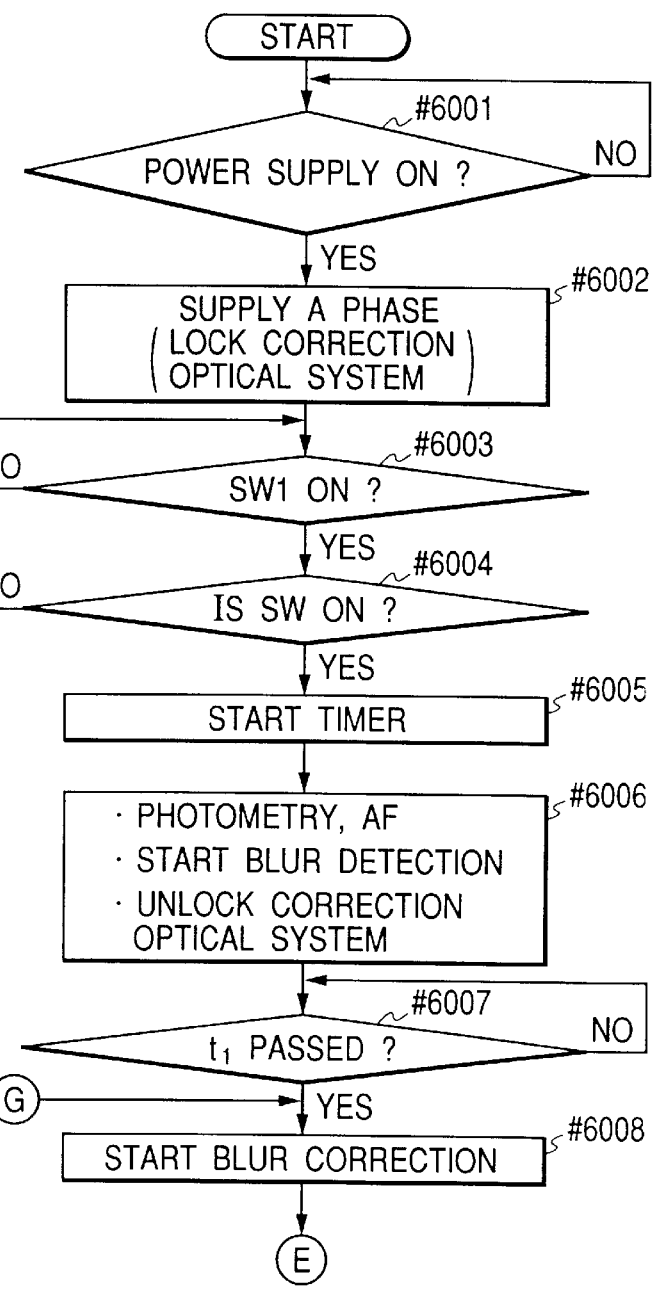
FIG. 28
FIG. 28A
FIG. 28B

IMAGE BLUR PREVENTING APPARATUS

BACKGROUND OF THE INVENTION

1. Field of the Invention

This invention relates to an image blur preventing apparatus for preventing image blur caused by hand vibration or the like in a camera, an optical apparatus or the like.

2. Related Background Art

In cameras today, operations important to photographing, such as exposure determination and focusing, are all automated and even those unskilled in camera operation rarely fail to perform photography. Recently, a system for correcting hand vibration of a camera has been studied and the applicant has disclosed such a system in Japanese Laid-Open Patent Application No. 3-188430, etc.

In the correction of hand vibration, it has been necessary to perform a locking operation after completion of a hand vibration correction driving operation or upon cosumption of a power source as a counter-measure for preventing damage due to disturbance of the correction optical means when carrying the camera in an unlocked state, and for preventing photographing in an unlocked state except during a hand vibration correction driving operation.

A system for preventing hand vibration will be briefly described here. The hand vibration of a camera during photographing is a vibration of usually 1 Hz to 12 Hz as a frequency. The basic concept for enabling a photograph to be taken free of image blur, even if such hand vibration is caused at a point of time whereat the shutter is released, is that vibration of the camera due to the hand vibration is detected and a correction lens is displaced by an amount in conformity with the detected vibration.

Accordingly, to enable a photograph to be taken which will not make one sense image blur, even if vibration of the camera is caused, it becomes necessary to first detect the vibration of the camera accurately, and then correct any change in the optical axis caused by the vibration.

This detection of the vibration can be effected, in principle, by providing means for detecting angular acceleration, angular velocity, angular displacement or the like, and means for electrically or mechanically integrating the output signal of the vibration detecting means and outputting angular displacement. On the basis of this detected information, a correction optical device for making the photo-taking optical axis eccentric is driven, whereby image blur suppression is effected. An embodiment of a blur prevention system using the vibration detecting means will be described with reference to FIG. 29 of the accompanying drawings. FIG. 29 shows a system for suppressing image blur resulting from a vertical vibration component 81$p$ and a lateral vibration component 81$y$ of a camera vibration (arrow 81).

In FIG. 29, the reference numeral 82 designates a lens barrel, the reference characters 83$p$ and 83$y$ denote vibration detecting means for detecting camera vertical vibration and camera lateral vibration, respectively, and the directions of vibration detection thereof are indicated by 84$p$ and 84$y$, respectively. The reference numeral 85 designates a correction optical apparatus (86$p$ and 86$y$ denote coils for giving thrust to correction optical means including optical apparatus 85, and 87$p$ and 87$y$ designate detection elements for detecting the position of the correction optical apparatus 85), and this correction optical apparatus 85 is provided with a position control loop, and is driven with the outputs of the vibration detecting means 83$p$ and 83$y$ as a target value, to provide image stabilization in the image plane 88.

FIG. 30 of the accompanying drawings is an exploded perspective view of a correction apparatus according to the prior art, and FIG. 31 of the accompanying drawings is a plan view from locking means side after completion of assembly. The vicinity of the locking means in this example will now be described. A permanent magnet 718 (lock magnet) is incorporated in a through-hole 71$i$ formed in a ground plate 71 and is magnetically coupled to a second yoke 72. A coil 720 (lock coil) is adhesively secured to a lock ring 719, and there is a bearing 719$b$ on the back of the ear portion 719$a$ of the lock ring 719, and armature rubber 722 is extended over an armature pin 721, which in turn is extended through the bearing 719$b$, whereafter an armature spring 723 is extended over the armature pin 721, is fitted into an armature 724 and is fixed by caulking. Therefore, the armature 724 is slidable in the direction of arrow 725 relative to the lock ring 719 against the armature spring 723. The lock ring 719 is rotatably mounted on the ground plate 71 by a so-called bayonet coupling wherein cut-away portions 719$c$ (three locations) formed in the outer diameter of the lock ring are pushed in accord with the inner diameter projected portions 71$j$ (three locations) of the ground plate 71, whereafter the lock ring 719 is rotated to therebyeffect anti-slippage. However, In order to prevent the lock ring 719 from rotating and the cut-aways from becoming the same in phase as the projections again and coming off the projections, lock rubber 726 is forced into the ground plate and rotation is regulated so that the lock ring 719 can rotate only by the angle $\theta$ of a cut-away portion 719$d$ regulated by the lock rubber. A permanent magnet 718 (lock magnet) is also mounted on a lock yoke 727 mode of a magnetic material and is threadably coupled to the lock yoke with holes 727$a$ (two locations) fitted to the pin 71$k$ of the ground plate 71 and by holes 727$b$ (two locations) and 711. A conventional closed magnetic circuit is formed by the permanent magnet 718 on the ground plate 71 side, the permanent magnet 718 on the lock yoke 727 side, the second yoke 72 and the lock yoke 727. The lock rubber 726 is prevented from slipping off by the lock yoke 727 being threadably coupled.

In FIG. 31, the lock yoke 721 is not shown.

A lock spring 728 is extended between a hook 719$e$ on the lock ring and a hook 71$m$ on the ground plate 71 and biases the lock ring 719 in a clockwise direction.

An adsorption coil 730 is inserted in an adsorption yoke 729 and is threadably coupled to the ground plate 71 by a hole 729$a$. The terminal of the coil 720 and the terminal of the adsorption coil 730 are soldered to the trunk portion 716$d$ of a flexible base plate 716 by means of lead wire or the like.

The operation of this lock means will now be described. A support frame 75 holding an optical member is provided with three radial projections 75$f$, and in the locked state, the tip ends of the projections 75$f$ fit to the inner peripheral surface 719$g$ of the lock ring 719. To bring about an unlocked state, an electric current is supplied to the lock coil 720 by a control circuit, not shown, through the flexible base plate 716 to thereby produce a torque for rotating the lock ring 719 about the optical axis because there is a coil in the closed magnetic circuit. Thereby the lock ring 719 is rotated in a counter-clockwise direction against the spring force of the lock spring 728.

When the lock ring 719 is rotated, the armature 724 bears against the adsorption yoke 729 to thereby shrink the armature spring 723 and equalize the positional relation between the adsorption coil and the armature 724 and thus, the lock ring stops its rotation. When at this time, the adsorption coil is electrically energized, the armature 724 is adsorbed by the adsorption yoke 729. Even if thereafter the coil 720 is deenergized, the lock ring can be maintained at this position.

At this time, the projections 75f of the support frame 75 are in respective positions opposed to three cams 719f provided in the inner diameter of the lock ring and therefore, the support frame becomes movable in the directions 713p and 713y by the clearance between the projections 75f of the support frame and the cams 719f.

To bring about a locked state, the electrical energization of the adsorption coil 730 is stopped, whereby the adsorbing force of the armature 724 becomes null and the lock ring 719 is rotated by the lock spring 728, and the locked state of FIG. 31 is brought about.

The other members shown in FIG. 30 will hereinafter be described.

Projected ears 71a on the back of the ground plate 71 (three locations, one of which is hidden and unseen) fit to a lens barrel not shown, and a conventional lens barrel roller or the like is screwed to a hole 71b and is fixed to the lens barrel.

The second yoke 72 which is a magnetic material and is luster-plated is screwed to the hole 71c of the ground plate 71 by a screw extending through a hole 72a. Also, a permanent magnet (shift magnet) such as a neodymium magnet is magnetically attracted to the second yoke 72.

The direction of magnetization of each permanent magnet 73 is the direction of arrow 73a, as indicated in FIG. 30.

Coils 76p and 76y (shift coils) are patching-secured to the support frame 75 to which a lens 74 is fixed by a C-ring or the like, and light projection elements 77p and 77y such as IREDs are adhesively secured to the back of the support frame 75, and emergent light enters position detecting elements 78p and 78y such as PSD's through slits 75ap and 75ay.

Support balls 79a, 79b having spherical tip ends such as POM's and a charge spring 710 are inserted in the holes 75b (three locations) of the support frame 75, and the support ball 79a is heat-caulked and fixed to the support frame 75 (the support ball 79b is slidable in the direction of extension of the holes 75b against the spring force of the charge spring 710).

Referring to FIG. 32A of the accompanying drawings which is a transverse cross-sectional view of the correction optical apparatus after assembled, the support ball 79b, the charged charge spring 710 and the support ball 79a in the named order are fitted into the hole 75b of the support frame 75 in the direction of arrow 79c (the support balls 79a and 79b are parts of the same shape) and finally, the peripheral end portion 75c of the hole 75b is heat-caulked to thereby effect the anti-slippage of the support ball 79a.

A cross-sectional view of the hole 75b in a direction orthogonal to FIG. 32A is shown in FIG. 32C of the accompanying drawings. Also, a plan view in which the cross-sectional view of FIG. 32C is seen from the direction of arrow 79c is shown in FIG. 32B, and the depths of ranges indicated by characters A to D in FIG. 32B are shown at A to D in FIG. 32C.

The rear end portion of the vane portion 79aa of the support ball 79a is received and regulated within the range of a surface of depth A and therefore, by the peripheral end portion 75c being heat-caulked, the support ball 79a is fixed to the support frame 75.

Since the fore end portion of the vane portion 79ba of the support ball 79b is received within the range of a surface of depth B, the support ball 79b does not slip out of the hole 75b in the direction of arrow 79c due to the charge spring force of the charge spring.

Of course, when the assembly of the correction optical apparatus is complete, the support ball 70b is received by the second yoke 72 and therefore, the support ball 70b does not slip out of the support frame, but rather a surface of slippage preventing range B is provided with the assembly property taken into account.

The shape of the hole 75b of the support frame 75 of FIGS. 31 and 32A to 32C does not require a complicated inner diameter slide mold even when the support frame 75 is molded, but can be molded by a simple two-division mold pulled in a direction opposite to the direction of arrow 79c. Therefore, dimensional accuracy can be accurately set correspondingly thereto.

Also, the support balls 79a and 79b are interchangeable parts and, therefore, there is no error of assembly and this is advantageous in terms of the maintenance of parts.

Turning back to FIG. 30, for example, grease of the fluorine origin is applied to the bearing portion 75d of the support 75 and an L-shaped shaft 711 (of a non-magnetic stainless material) is inserted thereinto, and the other end of the L-shaped shaft 711 is inserted into a bearing portion 71d (to which grease is likewise applied) formed on the ground plate 71, and the three support balls 79b are all placed on the second yoke 72 and the support frame 75 is contained in the ground plate 71.

Next, the positioning holes 712a (three locations) of the first yoke 712 are fitted to the pins 71f (FIG. 32C, three locations) of the ground plate 71, and the first yoke 712 is received by receiving surface 71e (five locations) and is magnetically coupled to the ground plate 71 (the magnetic force of the permanent magnet 73).

Thereby, the back of the first yoke 712 bears against the support ball 79a, and the support frame 75 is sandwiched between the first yoke 712 and the second yoke 72 and is positioned in the direction of the optical axis.

Grease of the fluorine origin is also applied to the surfaces of contact between the support balls 79a, 79b and the first yoke 712 and the second yoke 72, and the support frame 75 is freely slidable relative to the ground plate 71 in a plane orthogonal to the optical axis.

The L-shaped shaft 711 supports the support frame 75 for sliding movement only in the directions of arrows 713p and 713y relative to the ground plate 71, whereby the rotation (rolling) of the support frame 75 relative to the ground plate 71 about the optical axis is regulated.

The backlash of the fitting (play or tolerance) between the L-shaped shaft 711 and the bearing portions 71d, 75d is set large in the direction of the optical axis to thereby prevent them from fitting overlappingly with the regulation in the direction of the optical axis by the sandwiching between the support balls 79a, 79b and the first yoke 712 and the second yoke 72.

An insulating sheet 714 is put on the surface of the first yoke 712, and a hard substrate 715 having thereon a plurality of IC's (position detecting elements 78p, 78y, output amplifying IC, coils 76p, 76y, driving IC, etc.) is threadably coupled to the hole 71g of the ground plate 71 with a hole 715b and the hole 712b of the first yoke 712 with the positioning holes 715a (two locations) fitted over the pins 71h (two locations, FIG. 32C) of the ground plate 71.

The position detecting elements 78p and 78y are positioned by a tool and are soldered to the hard substrate 715, and a signal transmitting flexible substrate 716 has its surface 716a heat-pressed against the back of the hard substrate 715 within a range 715c encircled by a broken line.

A pair of arms 716bp and 716by extend from the flexible substrate 716 in the direction of a plane orthogonal to the optical axis, and are hooked on the hook portions 75ep and 75ey, respectively, of the support frame 75, and the terminals of IREDs 77p, 77y and the terminals of coils 76p and 76y are soldered thereto.

In this manner, driving of the IREDs 77p, 77y and the coils 76p, 76y is effected from the hard substrate 715 through the flexible substrate 716.

The arm portions 716bp and 716by of the flexible substrate 716 have bent portions 716cp and 716cy, respectively, and by the resiliency of these bent portions, the loads of the arm portions 716bp and 716by relative to the movement of the support frame 75 in a plane orthogonal to the optical axis are reduced.

The first yoke 712 has a protruded surface 712c, formed by embossing, and the protruded surface 712c passes through a hole 714a in the insulating sheet 714 and is arranged in direct contact with the hard substrate 715.

An earth (GND: ground) pattern is formed on that side of this contact surface which is adjacent to the hard substrate 715, and the hard substrate 715 is threadably coupled to the ground plate, whereby the first yoke 712 is grounded, thereby preventing the first yoke for becoming an antenna and transmitting noise to the hard substrate 715.

A mask 717 is positioned by the pin 71h of the ground plate 71 and is fixed onto the hard substrate 715 by a both-surface tape (two-sided adhesive tape.

In the above-described example of the prior art, the lock ring 719 is normally pulled in a direction toward the locking state by the lock spring 728 and therefore, when a hand vibration correcting operation is performed, it is necessary to hold the lock ring 719 in its unlocking state by the adsorption coil 30, and an electric current must continue to be supplied to the adsorption coil 30 during the hand vibration correcting operation and thus, power consumption has been great. Also, the locking means itself requires a lock spring, a lock coil, a plurality of lock magnets, an adsorption coil, an armature, etc., and this has led to the problem that the apparatus itself becomes: bulky.

Also, in many examples of the prior art (Japanese Laid-Open Patent Application No. 62-18875, Japanese Laid-Open Patent Application No. 7-98469, etc.), the correction optical apparatus has therein a locking member capable of mechanically fixing and locking the displacement of the correction lens, and when an image blur correcting operation is unnecessary (a state in which an interchangeable lens carrying an image blur correcting device therein has been removed from a camera body or a state in which an image blur operation switch has been opened), driving means controlled by control means such as a CPU moves the locking member and fixes and locks it so as to make the optical axis of the correction lens coincident with the optical axis of the other lens, thereby preventing any damage due to disturbance vibration (such as vibration applied during carrying) caused by a backlash of the correction lens and the wasteful power consumption by the correction optical apparatus.

SUMMARY OF THE INVENTION

One aspect of the present invention is an image blur preventing apparatus having a movable member movable for image blur prevention, a driving device that produces a drive force for operating the movable member in accordance with a signal conforming to the blur, a regulating member that regulates the movement of the movable member, the regulating member being movable to a regulating position for effecting the regulation and a non-regulating position, and a step driving motor that moves the regulating member to at least one of the regulating position and the non-regulating position, wherein the regulating member is moved by the step driving motor and the regulating member is held at a predetermined position by its self-holding force during the non-electrical energization of the step driving motor. By such construction, it becomes unnecessary to discretely provide a construction for moving the regulating member and a construction for holding the regulating member at a predetermined position, and simplification of the construction can be achieved.

BRIEF DESCRIPTION OF THE DRAWINGS

FIG. 6 is a block diagram schematically showing the construction of the lens barrel according to an embodiment of the present invention.

FIGS. 13A, 13B and 13C are a plan view, a side view and a cross-sectional view along line 13C—13C, respectively, of the coil unit.

FIGS. 14A, 14B and 14C show the second embodiment of the present Invention, an example of a non-preferred structure, and the structure according to the prior art, respectively.

FIG. 15 is a plan view of a hard substrate shown in FIG. 9, etc.

FIG. 21 is a timing chart of the electrical energization of a coil in the stepping motor of FIG. 19.

DESCRIPTION OF THE PREFERRED EMBODIMENTS

Figure 1:
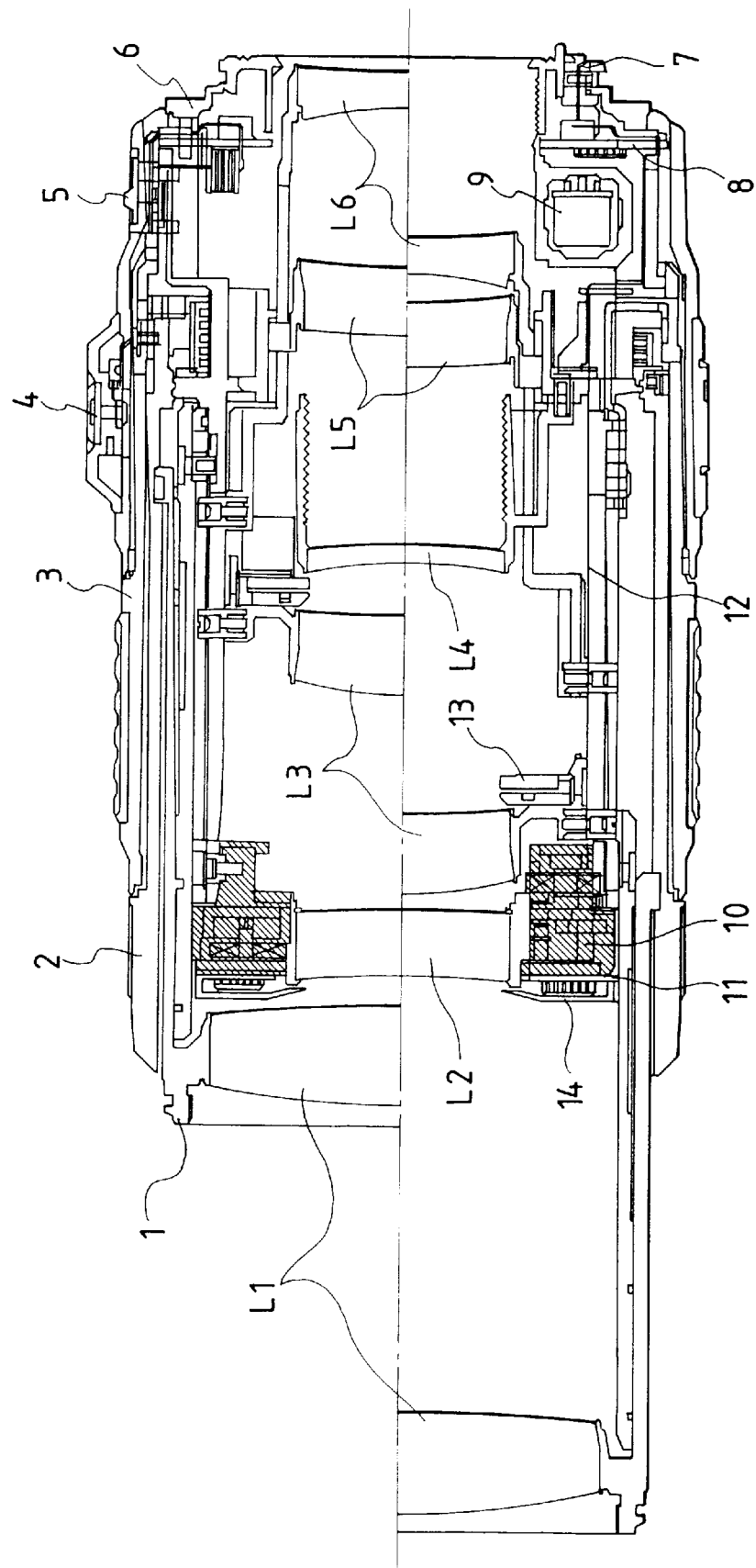
FIG. 1 is a cross-sectional view of a lens barrel according to an embodiment of the present invention.

The present invention will hereinafter be described in detail with respect to some embodiments thereof shown in the drawings.

FIG. 1 is a cross-sectional view of a zoom lens barrel with a correction optical apparatus for a single-lens reflex camera according to the present invention. For the sake of convenience, the upper side from the center line represents the state of the lens barrel during wide angle photography and the lower side from the center line represents the state of the lens barrel during telephoto photography.

The reference characters L1 to L6 designate lens units, and first, third, fifth and sixth lens units L1, L3, L5 and L6 are lens units that are movable in the direction of the optical axis in a zooming operation by rotating a zoom ring 3. The lens unit L2 is a shift lens unit movable in a direction perpendicular to the optical axis for deflecting the optical axis to thereby correct image blur. The lens unit L4 is a fixed lens unit.

Focus adjustment of the lens is effected by the lens unit L1 being moved in the direction of the optical axis. When an AF/MF changeover switch 5 is set at AF, the first unit lens barrel is movable toward an object side while being rotated by the drive force of a motor unit, not shown, and when the AF/MF changeover switch is set at MF, a manual ring 2 may be rotated to thereby rotate the first unit lens barrel and move it in the direction of the optical axis.

The reference numeral 4 denotes a hand vibration correcting switch adapted to be closed when a hand vibration correcting operation of the lens unit L2 is effected, and to be opened when this lens is used as an ordinary lens. The reference numeral 6 designates a bayonet structure connected to the single-lens reflex camera by a mount. The reference numeral 7 denotes a contact block which effects the transmission of an electrical signal to a microcomputer or the like on the camera side. The reference numeral 8 designates a main substrate on which an element such as an IC is actually mounted.

The reference numeral 9 denotes a hand vibration detecting device for detecting a hand vibration of a photographer or a vibration of the lens barrel itself. A hatched portion 10 is a correction optical apparatus adapted to obtain a hand vibration correcting effect by driving the shift lens L2 in a direction perpendicular to the optical axis. The reference numeral 11 designates a shift substrate on which an IC or the like for effecting the drive control of the correction optical apparatus is actually mounted.

Figure 30:
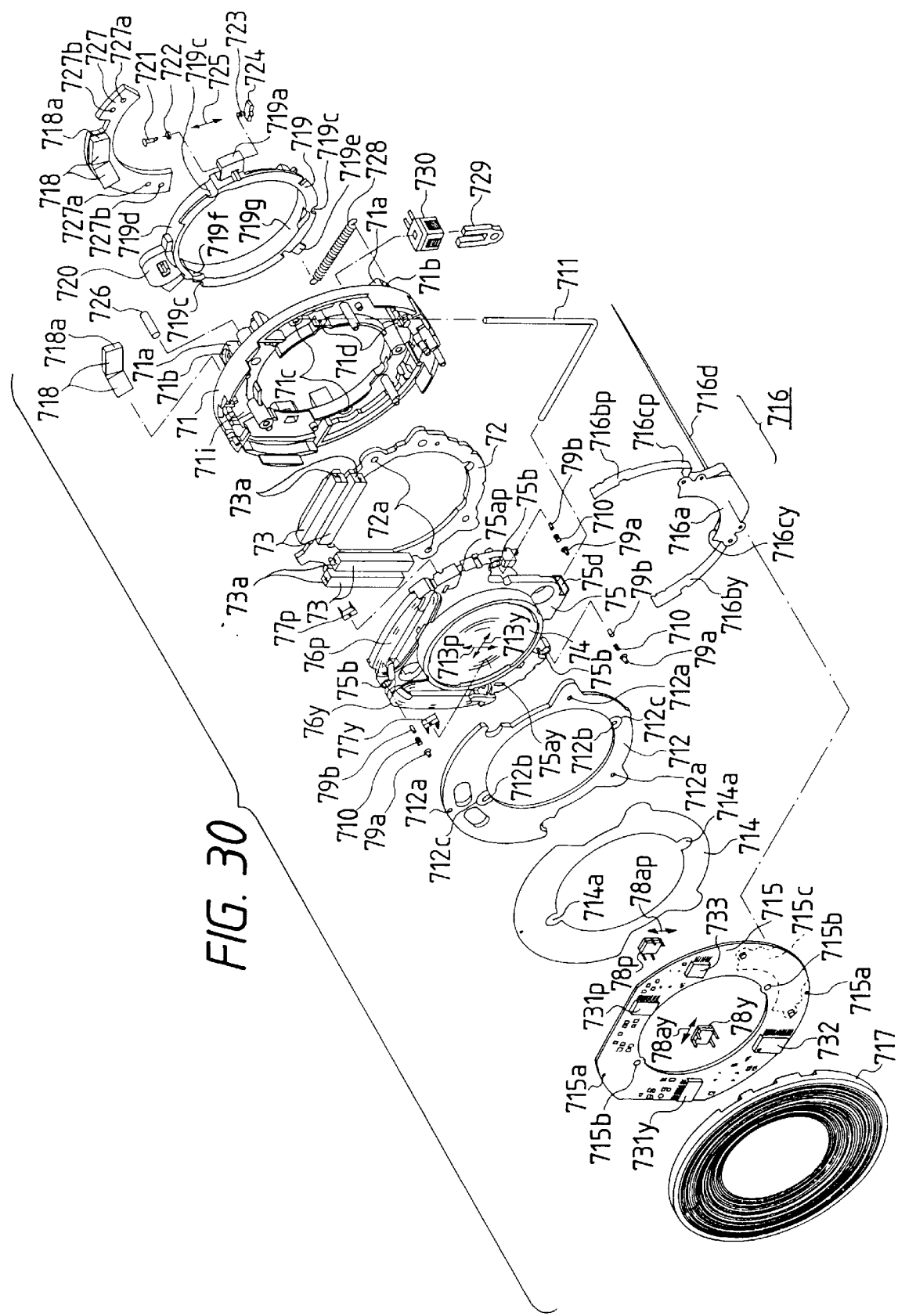
FIG. 30 is an exploded perspective view of an image blur correcting apparatus according to the prior art.
Figure 31:
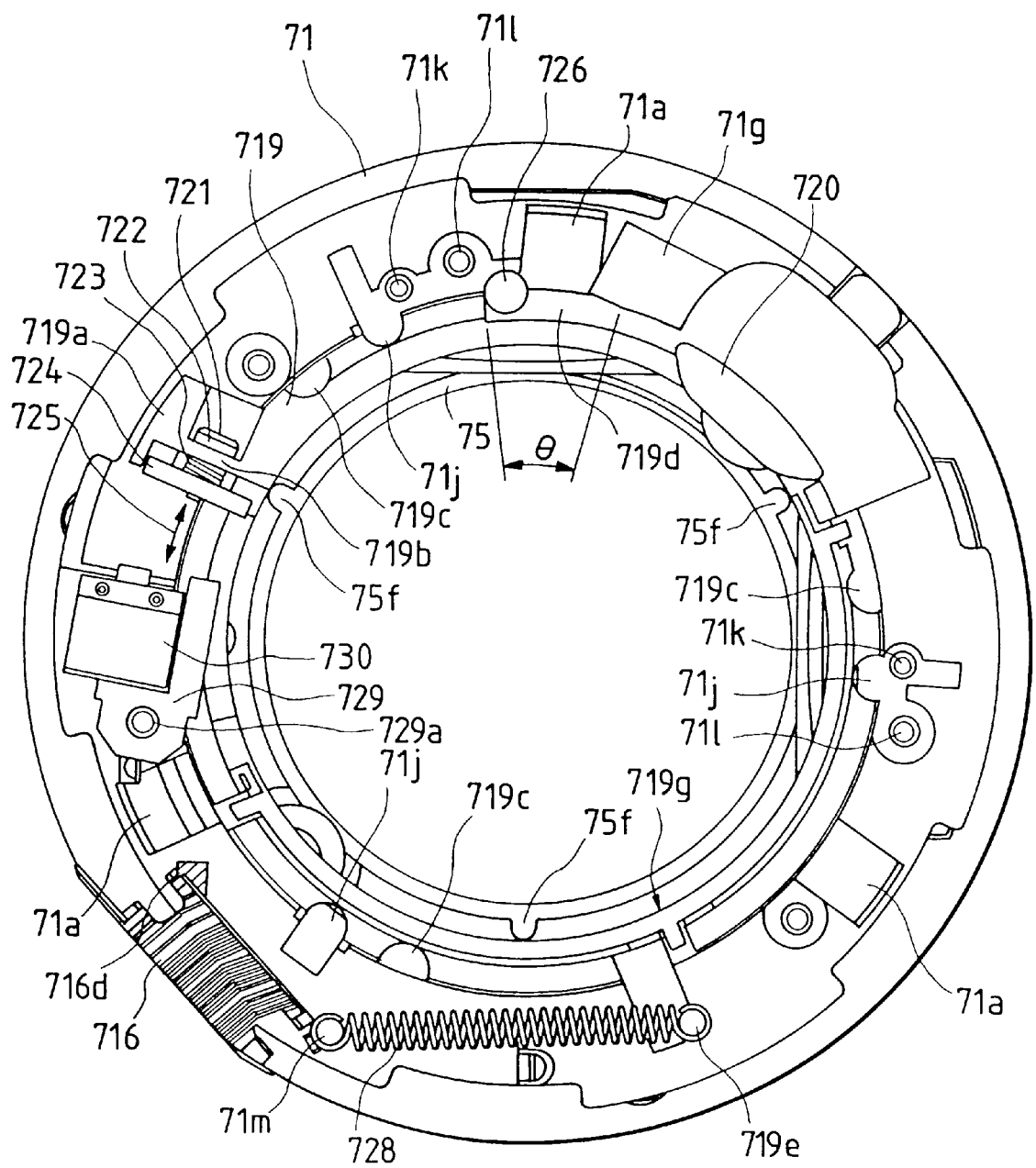
FIG. 31 is a cross-sectional view showing the construction of the image blur correcting apparatus according to the prior art.
Figure 32A:
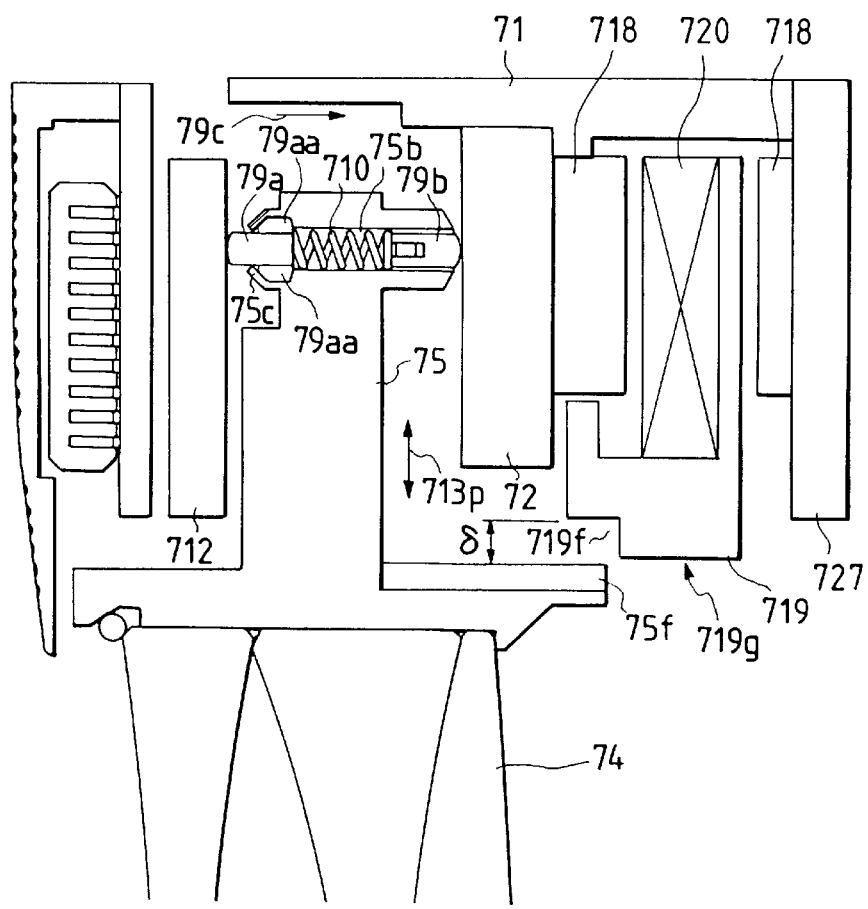
FIG. 32A is a cross-sectional view showing the construction of the image blur correcting apparatus according to the prior art.
Figure 32B:
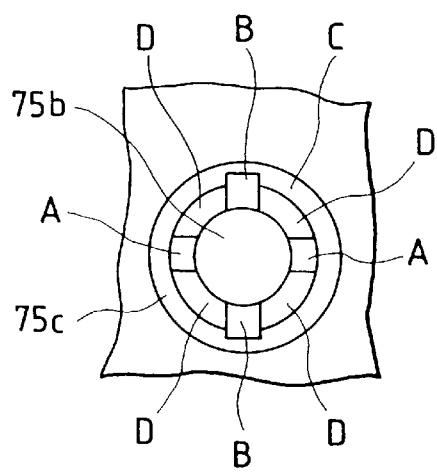
FIG. 32B is a plan view of a hole 75b in FIG. 32A as it is seen along the direction of arrow 79C.
Figure 32C:
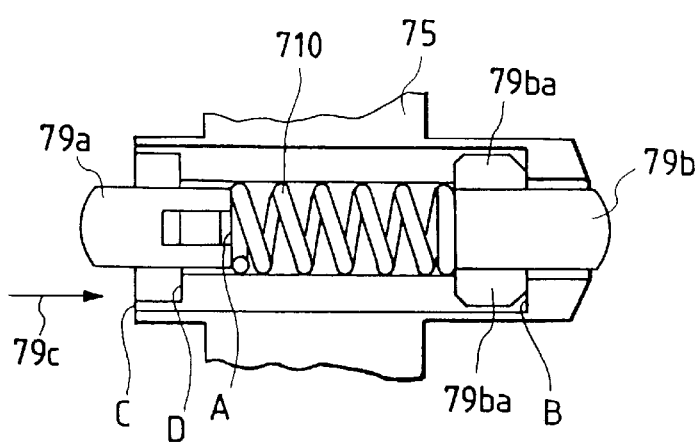
FIG. 32C is a cross-sectional view of the hole 75b in FIG. 32A taken along a direction differing from that in FIG. 32A (a direction perpendicular to the plane of the drawing sheet of FIG. 32A).

The reference numeral 12 denotes a flexible circuit substrate for connecting the main substrate 8 and the hard substrate 11 (in FIG. 30, 715) together.

The reference numeral 13 designates an electromagnetic aperture capable of communicating with the main substrate 8 by a flexible circuit substrate, not shown. The reference numeral 14 (in FIG. 30, 717) denotes a decorative ring which provides a blindfold for the hard substrate 11.

The driving of the shift lens will now be described briefly. An electrical signal from the hand vibration detecting device 9 is transmitted to the main substrate 8, and the information thereof is transmitted to the hard substrate 11 by the flexible circuit substrate 12. The shift lens L2 is driven in a direction perpendicular to the optical axis by a shift driving unit so as to prevent/compensate for hand vibration of the photographer. The driving method, the drive control, etc. are as shown in the example of the prior art and need not be described here. Also, the construction is the same as that of the example of the prior art except for lock means and shock countermeasure means.

Figure 2:
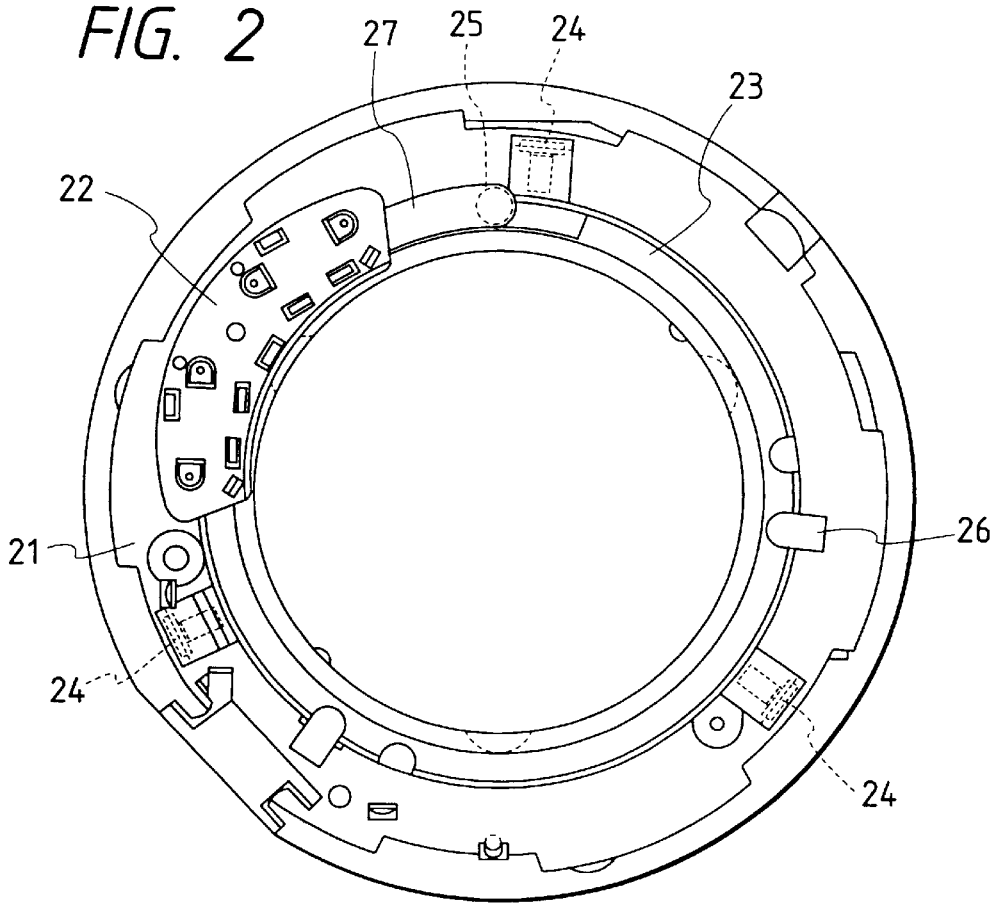
FIG. 2 is a rear view showing part of the construction of the lens barrel according to an embodiment of the present invention.
Figure 3:
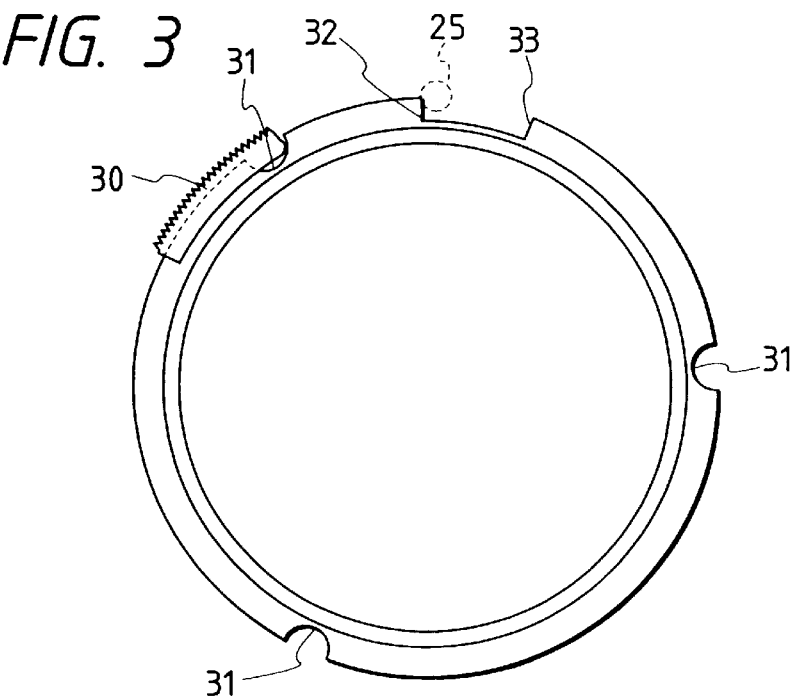
FIG. 3 shows a lock ring in part of the construction of the lens barrel according to an embodiment of the present invention.

FIG. 2 is a rear view of the correction optical apparatus of FIG. 1, and FIG. 3 shows the lock ring 23 of FIG. 2. The other parts in the vicinity of the lock means are similar to those in the example of the prior art and therefore are not shown.

The reference numeral 21 in FIG. 2 designates the ground plate of the correction optical apparatus which is adapted to be integrally connected to another lens barrel by a mounting portion 24. The reference numeral 22 denotes a step driving motor portion which will be described later and which is fixed to the ground plate from the back side thereof. The reference numeral 23 designates a lock ring. In FIG. 2, a method of locking a correction optical system is the same as the method represented in the example of the prior art, and design is made such that the correction optical system is locked by rotating the lock ring 23.

The lock ring 23 is provided with a gear 30 meshing with a gear portion provided on the rotor of the step driving motor 22, and is also provided with a recess 31 for escaping a projection 26 provided on the ground plate. When the lock ring 23 is to be attached to the ground plate, the lock ring 23 is incorporated with the phases of the projection 26 and recess 31 adjusted to each other, whereafter lock rubber 25 is inserted into an aperture formed in the ground plate, whereby the lock ring becomes supported on the ground plate by a conventional bayonet structure.

Next, the step driving motor portion 22 is fixed from the back side (in FIG. 2, the front side) of the ground plate, whereby the lock rubber 25 does not come off by the extending portion 27 (40a in FIG. 4) of the bearing plate of the step driving motor portion 22. Also, at this time, the angle of rotation of the lock ring 23 is regulated by the lock rubber 25 with the aid of wall portions 32 and 33. In the present embodiment, the lock ring is rotatable by only 15°.

Figure 4:
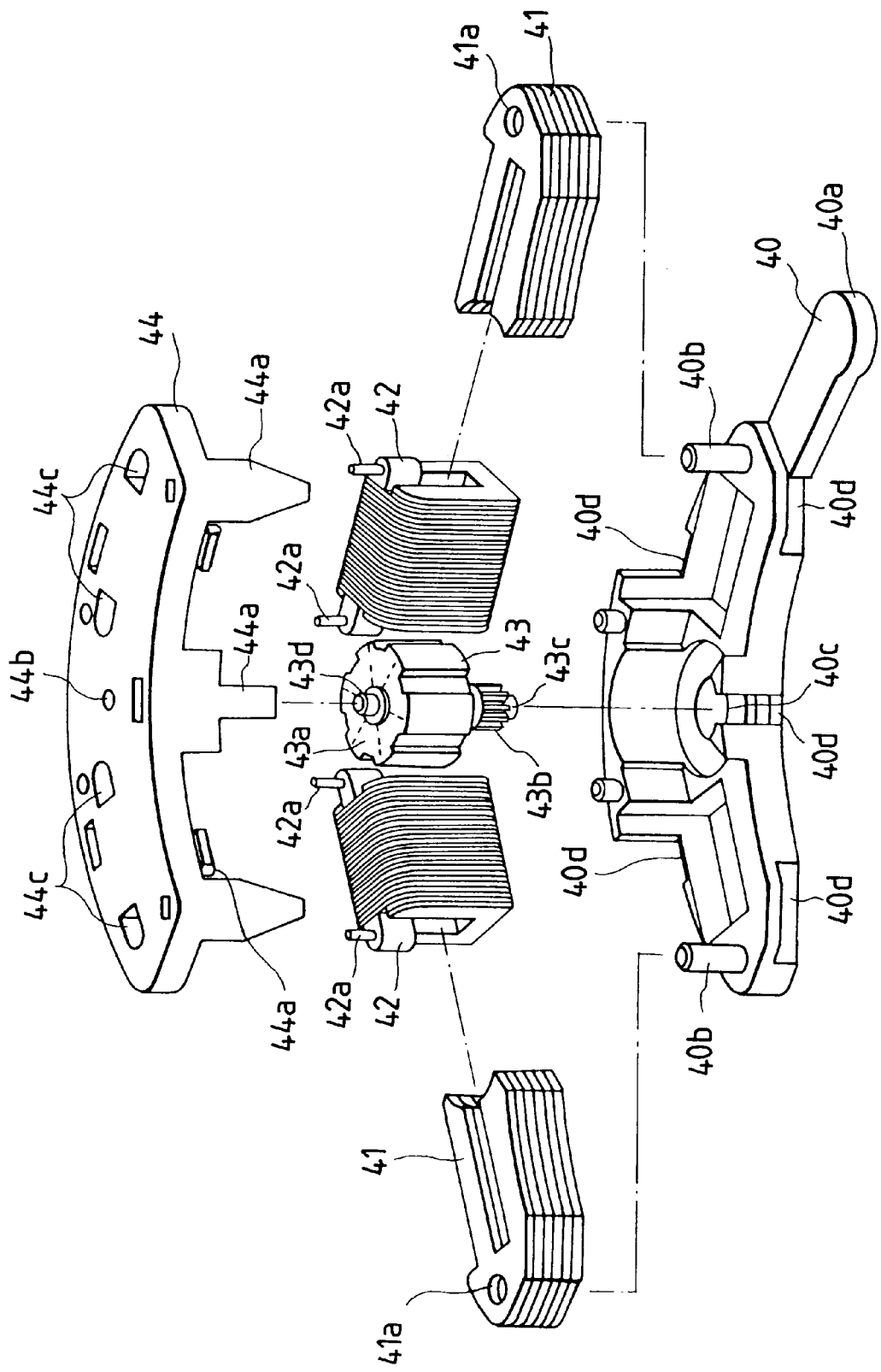
FIG. 4 is an exploded perspective view of a step drive motor which is part of the construction of the lens barrel according to an embodiment of the present invention.

The step driving motor portion 22 will now be described with reference to FIG. 4. The reference numeral 40 designates a bearing plate, a part of which extends out to provide an extending portion 40a for holding down the lock rubber. The reference numeral 43 denotes a rotor magnet, and the tip end shaft portion 43c thereof fits in a hold 40c, and the gear portion 43b thereof is adapted to mesh with a gear portion provided on the lock ring. The reference character 43a designates a polarized magnet portion which, in the present embodiment, is polarized into six poles.

The reference numeral 41 designates yokes which come into the aperture portions 42b of bobbins 42, and the holes 41a thereof come over projected portions 40b provided on the bearing plate 40, whereby the position of the yokes is fixed. The reference numeral 44 denotes a cover portion having a hole 44b into which the shaft portion 43d of the rotor magnet 43 fits, and the pawl portions 44a of the cover portion 44 come into recesses 40d formed in the bearing plate 40, whereby the whole of the step driving motor portion 22 is supported. Also, the terminal portions 42a of the bobbins 42 are exposed through apertures 44c, and are soldered to a flexible substrate, not shown, whereby they are electrically connected together.

The control of step driving is widely known and is therefore omitted. Also, in case of assembly, the lock ring is incorporated and the lock rubber is forced in, whereafter the bearing plate is fixed to the ground plate, and the rotor magnet 43, the bobbins 42, the yokes 41, etc. are assembled together, and the assembly is fixed by the cover portion 44.

Figure 5:
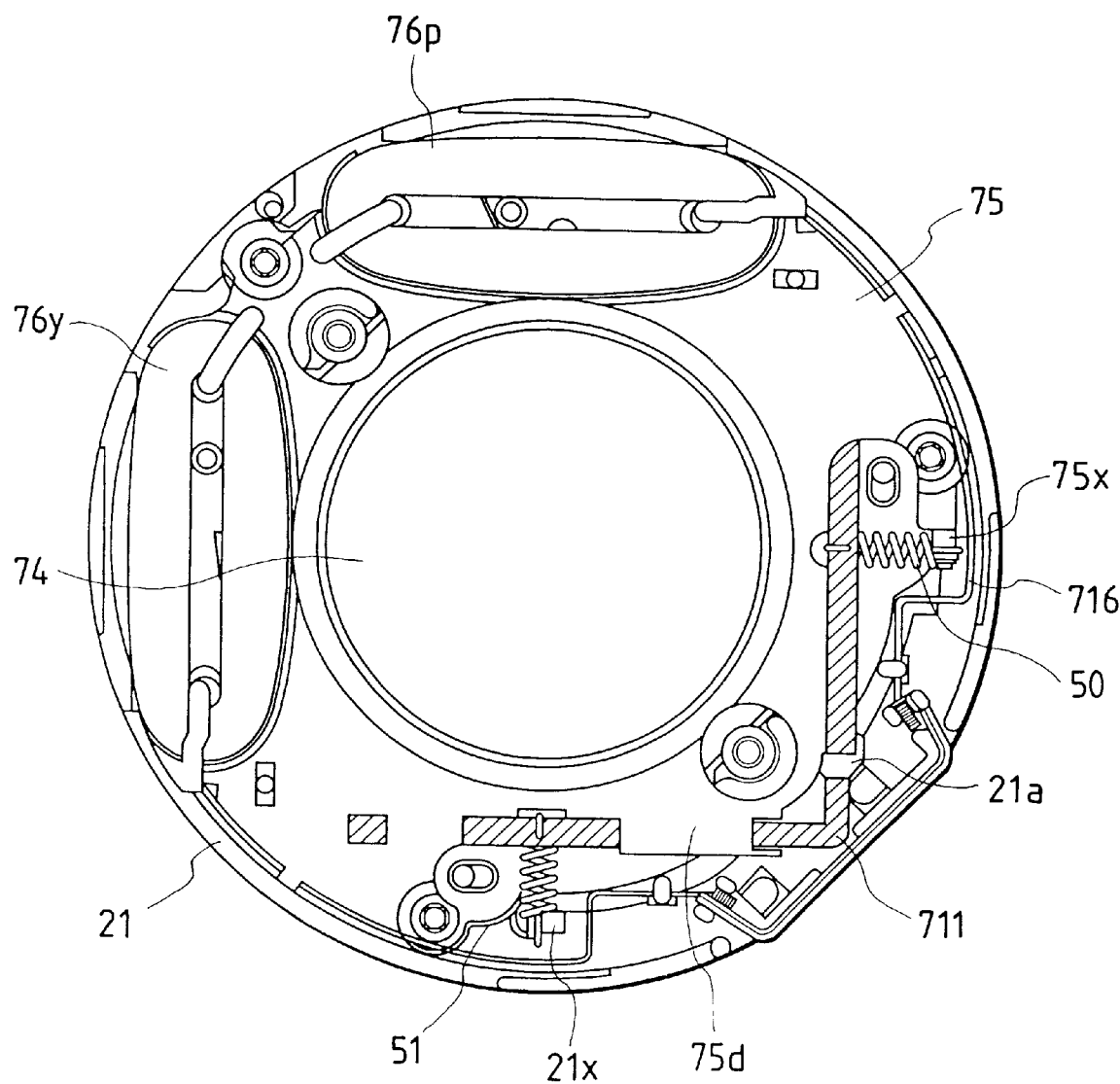
FIG. 5 is a front view of the lens barrel according to an embodiment of the present invention.
Figure 8:
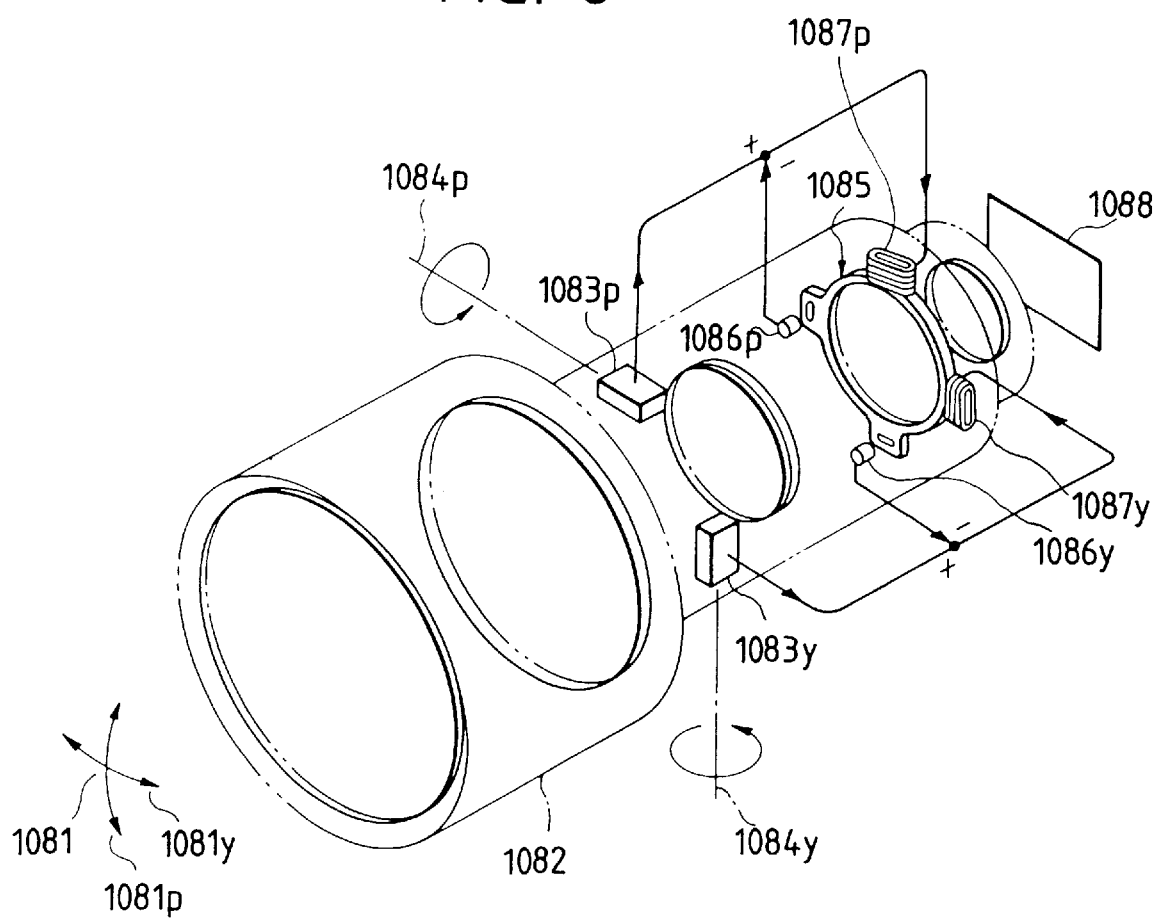
FIG. 8 schematically shows the construction of a system for correcting image blur according to a second embodiment of the present invention.

FIG. 5 is a front view (the side opposite to FIG. 2) of the correction optical apparatus according to the present embodiment. Constructions similar to constructions shown in FIG. 8 are designated by the same reference characters. For the sake of illustration, the side forward from the yoke 1 is shown as being not mounted. In FIG. 5, a hatched portion 711 is an L-shaped shaft provided to prevent the rolling of a support frame 75. The L-shaped shaft 711 is supported for sliding movement in a pitch direction in FIG. 5 relative to the ground plate 21 by the bearing portion 21a provided on the ground plate 21 and further, the support frame 75 is slidable in a yaw direction in FIG. 5 relative to the support shaft 711 by a bearing portion 75d. By such construction, the support frame 75 is displaceable in the pitch and yaw directions relative to the ground plate 21.

The reference numerals 50 and 51 designate springs as shock countermeasure means. The spring 50 has its opposite ends hooked on a hooking projected portion 75x provided on the support frame 75 and the L-shaped shaft 711, and the L-shaped shaft is regulated in the yaw direction by bearing portion 21a and can therefore alleviate the shock of the lens support frame 75 and lens 74 in the yaw direction.

Also, the spring 51 has its opposite ends hooked on a hooking projected portion 21x provided on the ground plate 21 and the L-shaped shaft 711, and the L-shaped shaft 711 is moved in the pitch direction with the support frame 75 by 75d and can therefore alleviate the shock of the support frame 75 and lens 74 in the pitch direction.

FIG. 6 is a block diagram showing the epitome of the present embodiment. It represents a state in which the lens barrel 401 of the present embodiment is mounted on a single-lens reflex camera 402.

A lens CPU 411 is communicating with a camera CPU 413 through a contact block 24. The reference numeral 403 designates hand vibration correcting switch means which outputs hand vibration correcting operation ON and OFF signals to the lens CPU. The reference numeral 404 denotes AF/MF switching means which outputs AF and MF signals to the lens CPU.

Also, the lens CPU has electrically connected thereto the correction optical system driving means 407 of the correction optical system, the lock means 408 of the correction optical system, electromagnetic aperture means 405 for effecting aperture control, AF driving means 406 for driving the focusing lens unit L3 on the basis of the output from distance measuring means 414, a timer 409 for counting the driving time of the lock means and counting the time from completion of exposure, and blur detection means 410 for detecting the blur of the lens barrel.

The camera CPU 413 has electrically connected thereto the release means 412 of a two-stage switch, distance measuring means 414 for measuring the object distance, power supply switching means 415 for starting the camera CPU, switching means 418 for changing camera mode, photometry means 419 for effecting photometry, exposure means 420 for effecting mirror-up: and shutter driving, and feeding means 421 for effecting the feeding of film.

Figure 7:
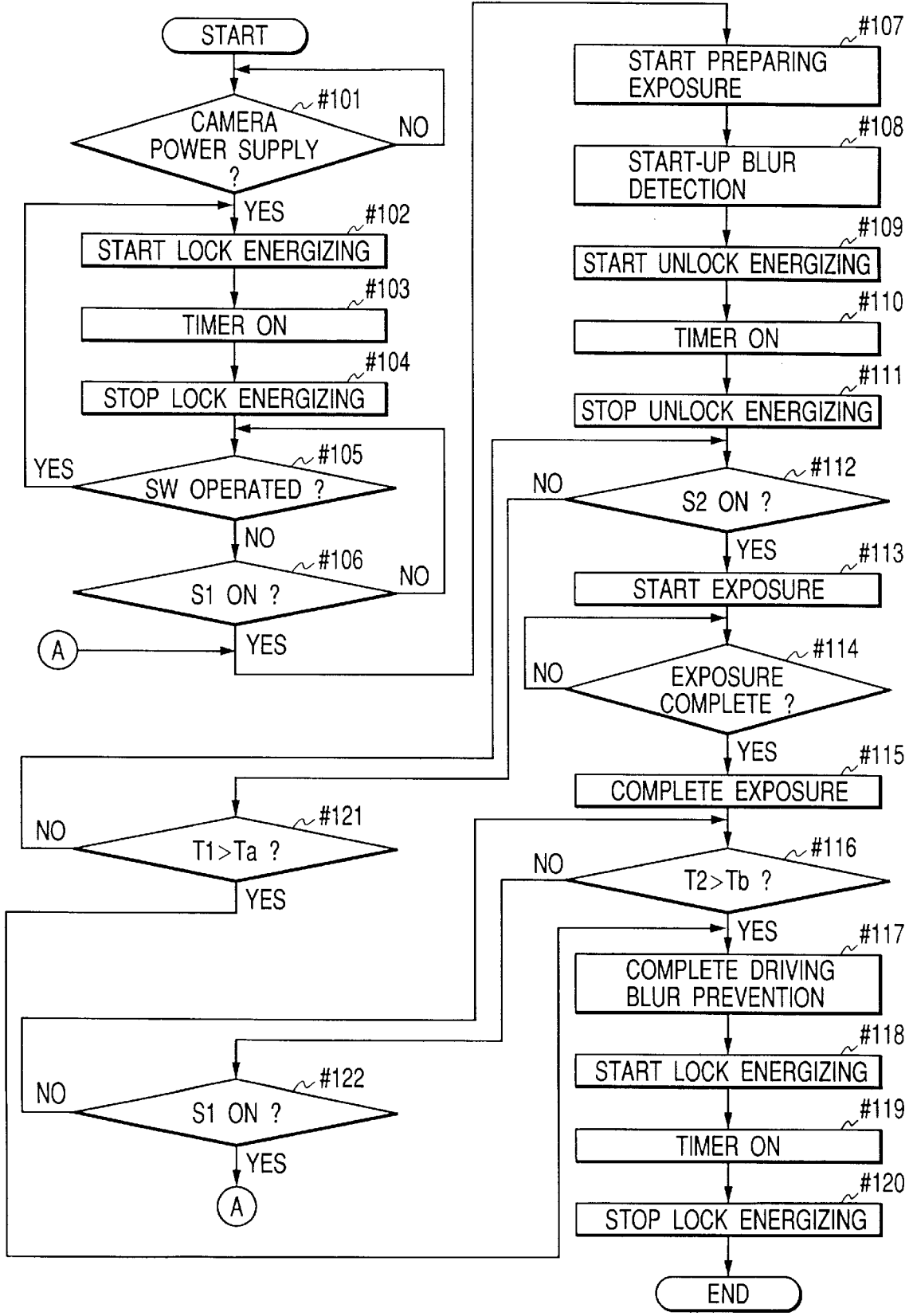
FIG. 7 is a flow chart showing the operation of the lens barrel according to an embodiment of the present invention.

FIG. 7 shows a flow-chart during the hand vibration correcting mode of the present embodiment. When at #101, a power source is supplied to the lens side by the signal of a power supply switch 415 from the camera, advance is made to #102, where the electrical energization of the step driving motor of the lock means 408 is started. The electrically energizing method at this time is based on the conventional drive control method for the step driving motor. At the same time, the counting of the time regarding the locking operation is started by the timer means 409 at #103. When at #104, the timer has counted a predetermined time, the electrical energization of the step driving motor is terminated. In the present embodiment, it Is set to 30 msec.

Thereafter, at #105, a switch operation other than release, for example, the operation of the switching means 418 for changing camera mode is detected, and when any switch other than the release switch is operated, return is made to #102 so as to perform the locking operation. By this control, the unlocking state can be prevented from being inadvertently brought about.

At #106, the signal S1 of the release means 412 is detected. The release is effected by a two-step switch, and S1 is the first step and S2 is the second step. When S1 is not detected, return is made to #105, and when S1 is detected, exposure preparations, in the present embodiment, photometry, distance measurement and lens focusing drive, are effected by the photometry means 419, the distance measuring means 414 and the AF driving means 406, respectively, at #107.

Also, at #108, the blur detection means 410 is started to thereby effect the detection of vibration, and at #109, electrical energization Is started so as to drive the step driving motor of the lock means in an unlock state direction and at the same time, at #110, the timer 409 is started.

When at #111, the timer has counted a predetermined time, the electrical energization of the step driving motor is terminated. This unlock energization differs from lock energization (because the direction of rotation is opposite). At #112, the signal S2 is detected and when the switching of S2 is detected, exposure is started by the exposure means 420 at #113. When the switching of S2 is not detected, the time after the detection of the switching of S1 is counted at #121 and whether a time equal to or longer than T1 has passed is judged, and when it has passed, advance is made to #117. When it has not passed, return is made to #112. In the present embodiment, the time T1 is 1 sec.

At #114, whether it is timing for terminating the exposure operation is judged, and if it is timing for terminating, advance is made to #115, where the exposure operation is completed. Thereafter, at #116, whether a time T2 has passed is judged, and when it has passed, advance is made to #117. When the time T2 has not passed, advance is made to #122, and if S1 is not detected, return is made to #116. When S1 has been detected, return is made to #107. In the present embodiment, T2 is set to 1.5 sec.

Thereby the time lag (due to the driving of the step driving motor) in continuous photographing can be reduced. #118 to #120 are the same flow as #102 to #104, and at #118, the electrical energization of the step driving motor is started and at the same time, at #119, the counting by the timer 409 regarding the locking operation is started. When at #120, the timer has counted a predetermined time, the electrical energization of the step driving motor is terminated, thus ending a series of operations.

The above-described embodiment is an embodiment used in a lens barrel, but of course, the present invention can also be applied to another optical instrument or an instrument on which the correction optical apparatus is mountable. Also, a spring is used as the shock countermeasure means, but a similar effect can be obtained even if another resilient member is used or another method is employed.

Also, in the above-described embodiment, there has been shown an example in which the driving time of the step driving motor is controlled to thereby control the amount of driving, but use may be made of another control method, for example, a control method such as one using the number of step signals for driving the step driving motor.

Also, in the above-described embodiment, a step driving motor is used as a motor for driving locking means, but use may also be made of another motor which has a self-holding force.

As described above, according to the construction of the above-described embodiment of the present invention, the support means supporting the correction optical means has shock countermeasure means for preventing damage thereto caused by the oscillation of correction optical means due to a disturbance vibration input, whereby even when the locking means assumes its unlocked state, damage to the apparatus can be prevented, and the driving of the locking means is effected by the step driving motor, whereby the holding of the locking means can be effected by the strong self-holding force of the step driving motor, and this leads to low costs and small power consumption as well as the compactness of the apparatus.

Also, the step driving motor is arcuately disposed on the support means, whereby the motor can be constructed compactly along the apparatus without becoming bulky.

Also, the shock countermeasure means is a resilient member, whereby it can be made into a compact construction, and this leads to the ease of assembly.

Also, by timer control, driving of the locking means is accomplished by controlling the driving time of the step driving motor for step driving, whereby new drive detecting means or the like need not be provided and control can be effected easily without increasing the number of parts.

Also, driving of the locking means is done by the step driving motor and the holding of the locking means is effected by the self-holding force of the step driving motor, and this can contribute to small power consumption. Also, it is difficult for the locking means to assume its unlocked state due to a disturbance in control, and even in the unlocked state, damage to the apparatus can be minimized.

(Second Embodiment)

FIG. 8 schematically shows the construction of a system for correcting image blur due to hand vibration according to a second embodiment of the present invention (an image blur correcting apparatus provided with a correction optical apparatus, a vibration detecting device, etc.), and more particularly shows a system for correcting image blur resulting from camera vertical vibration 1081$p$ and lateral vibration 1081$y$ in the direction of arrow 1081.

In FIG. 8, the reference numeral 1082 designates a lens barrel, and the reference characters 1083$p$ and 1083$y$ denote vibration detecting portions for detecting camera vertical vibration and camera lateral vibration, respectively, and their respective vibration detection directions are indicated by 1084$p$ and 1084$y$. The reference numeral 1085 designates a correction optical apparatus (1087$p$ and 1087$y$ denote coils giving thrust to correction lenses, and 1086$p$ and 1086$y$ designate position detecting elements for detecting the positions of the correction lenses), and this correction optical apparatus 1085 is driven with the outputs of vibration detecting sensors 1083$p$ and 1083$y$ as target values, and secures its stability on an image plane 1088.

Figure 9:
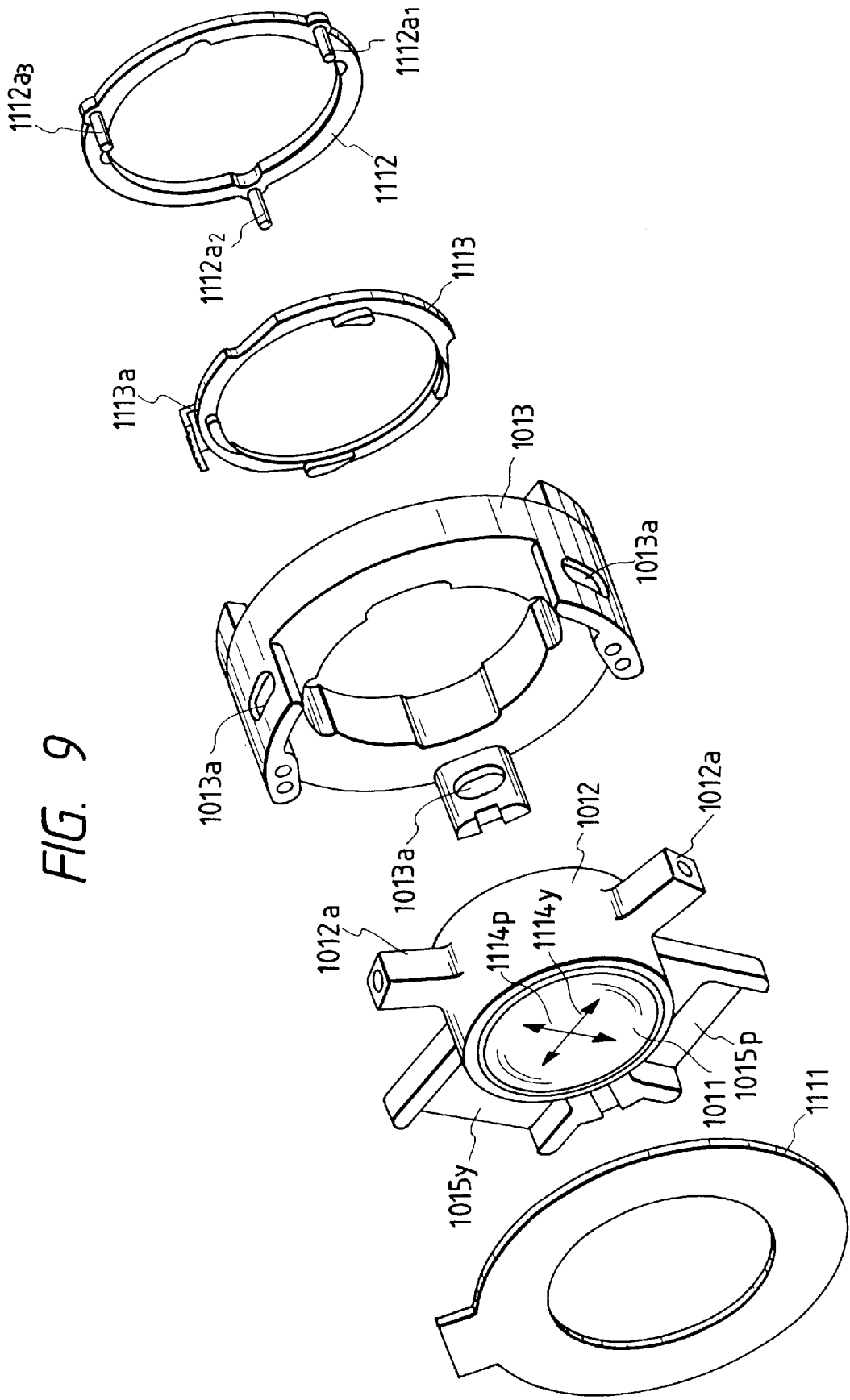
FIG. 9 is an exploded perspective view showing the constituent elements of an essential portion of the correction optical apparatus according to the second embodiment of the present invention.
Figure 10:
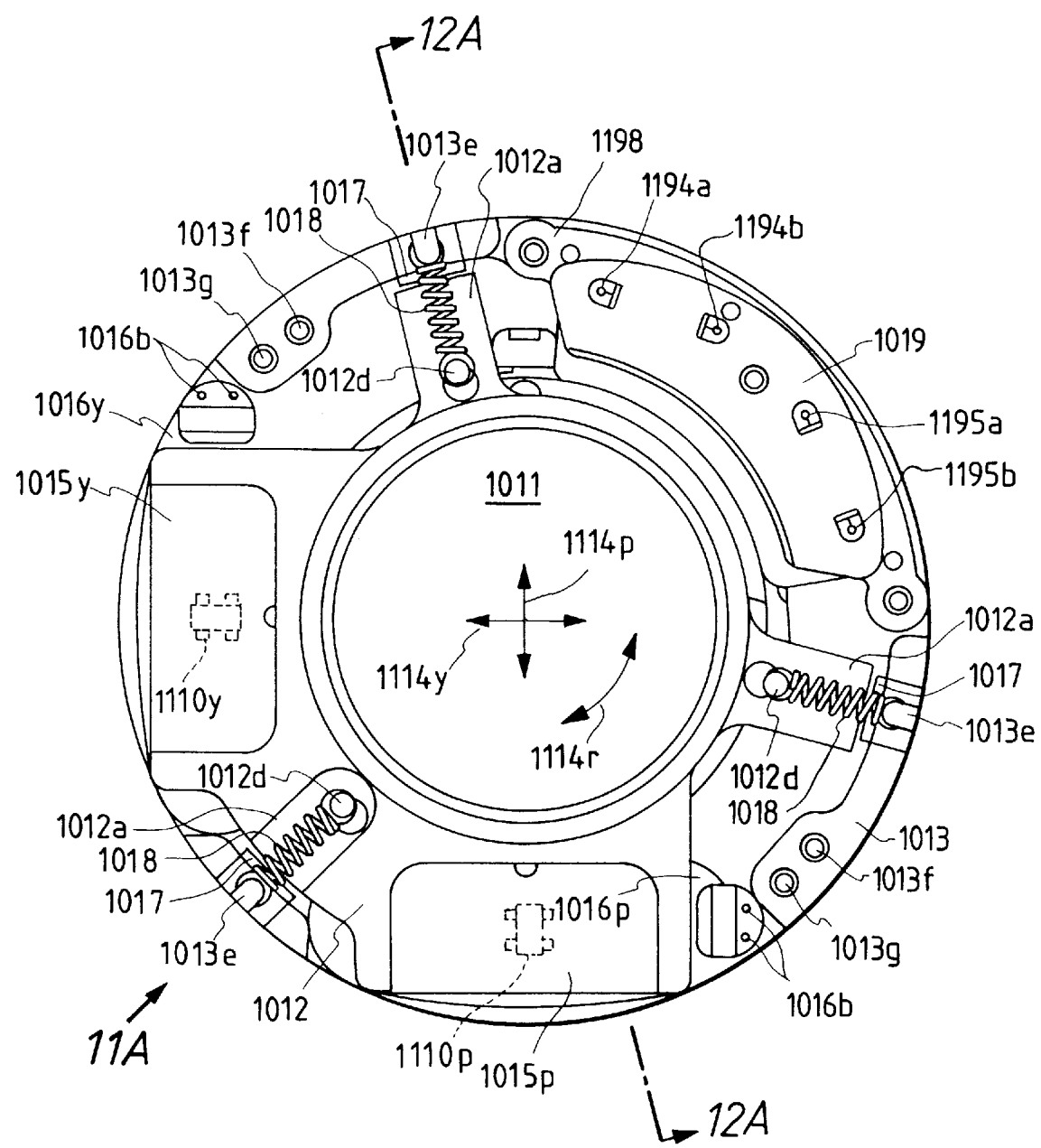
FIG. 10 shows the correction optical apparatus as it is seen from the left side of FIG. 9.
Figure 11A:
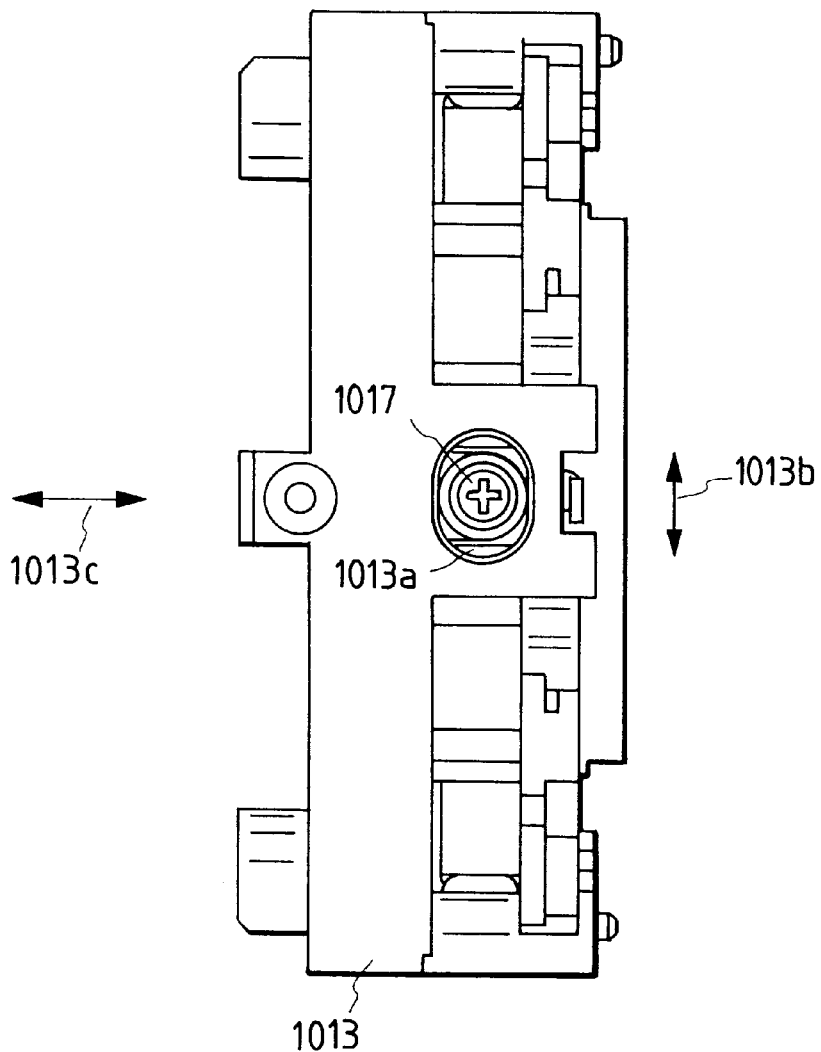
FIG. 11A is a view taken along the arrow 11A of FIG. 10.
Figure 11B:
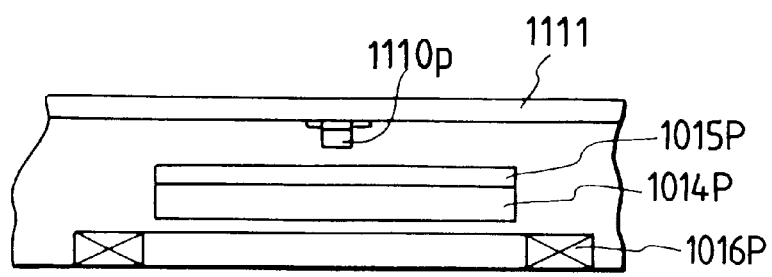
FIG. 11B shows the construction of a portion regarding the position detection of a correction lens.
Figure 12A:
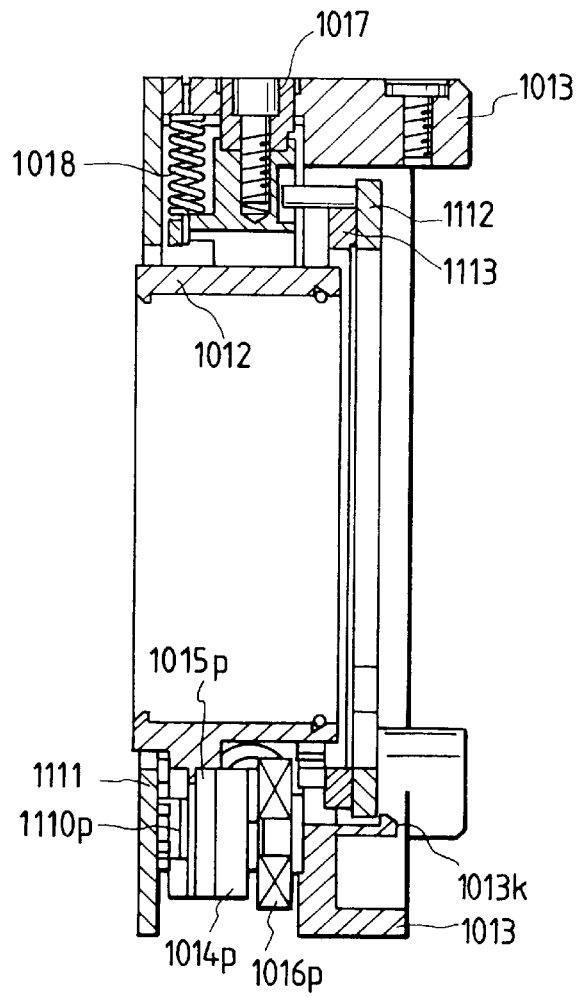
FIG. 12A is a cross-sectional view taken along the line 12A—12A of FIG. 10.
Figure 12B:
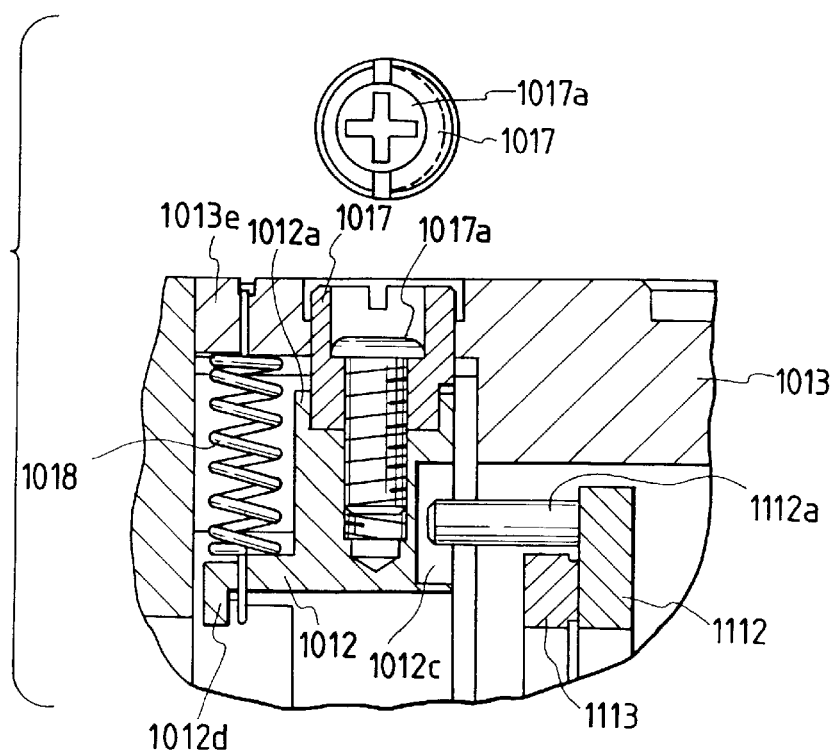
FIG. 12B is a plan and cross-sectional view showing a portion of FIG. 12A on an enlarged scale.
Figure 13A:
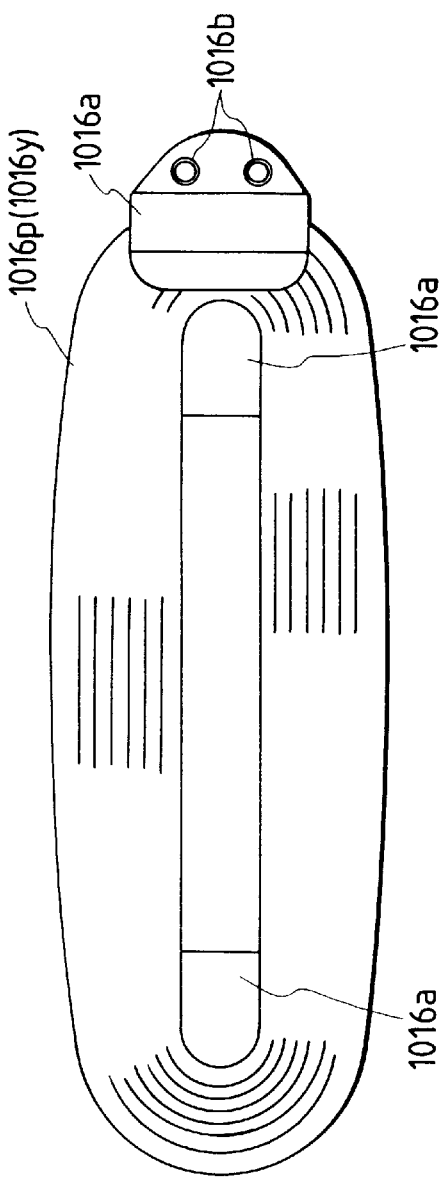
FIGS. 13A, 13B and 13C show a coil unit according to the second embodiment of the present invention.
Figure 13B:
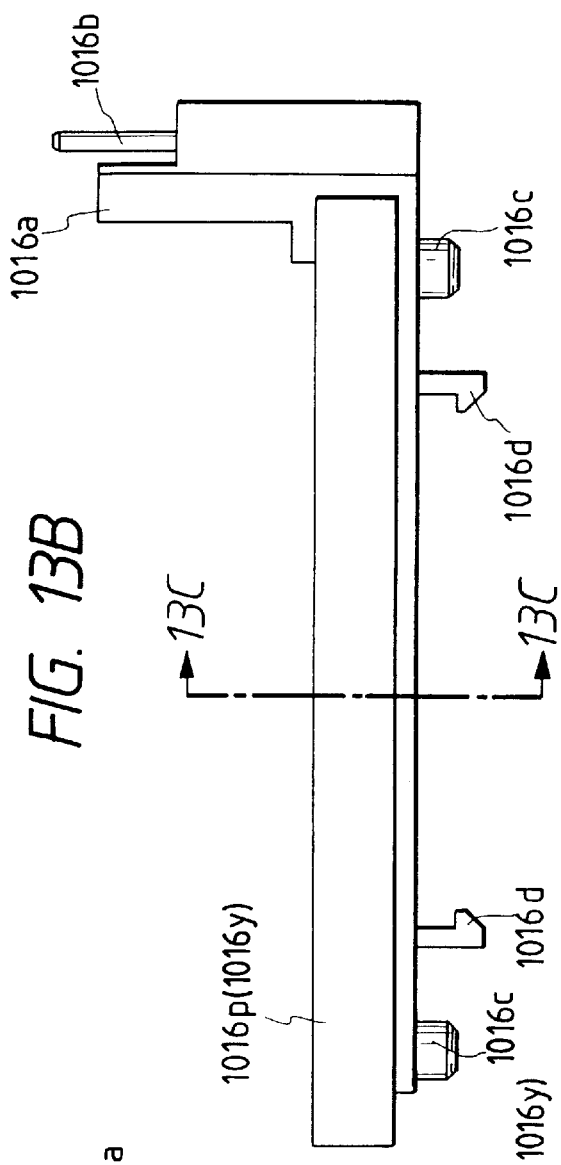
Figure 13C:
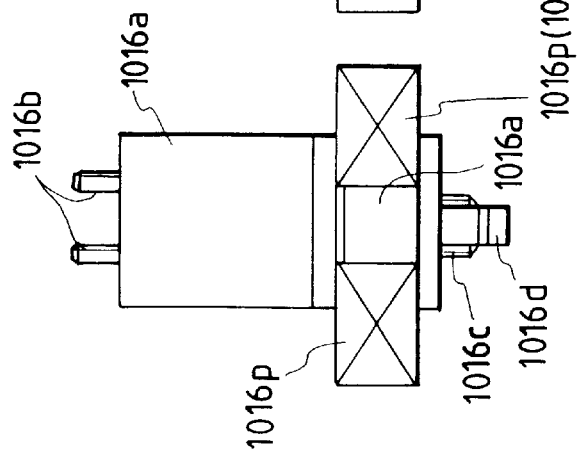
Figure 14C:
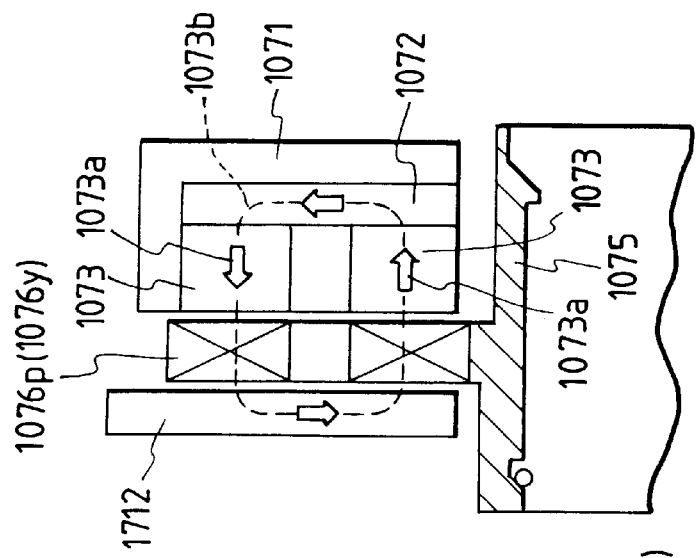
FIGS. 14A, 14B and 14C are views for illustrating the construction of driving means for blur correction according to the second embodiment of the present invention by the comparison with the construction according to the prior art.
Figure 14B:
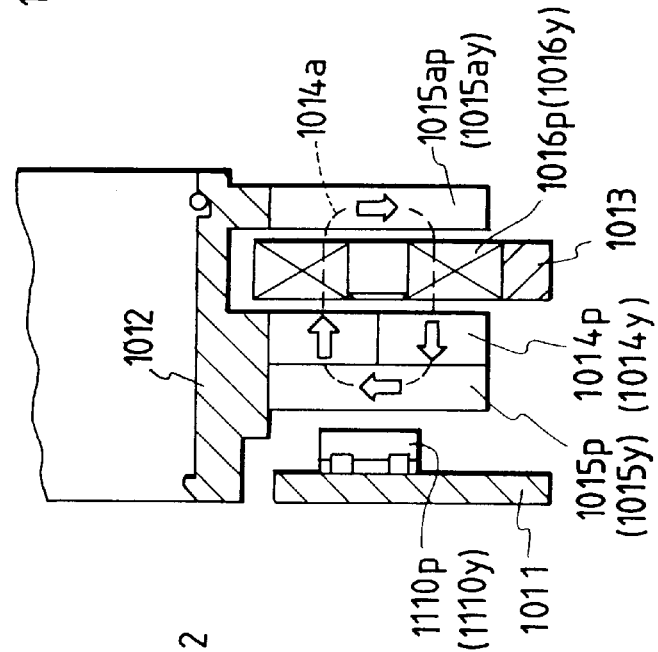
Figure 14A:
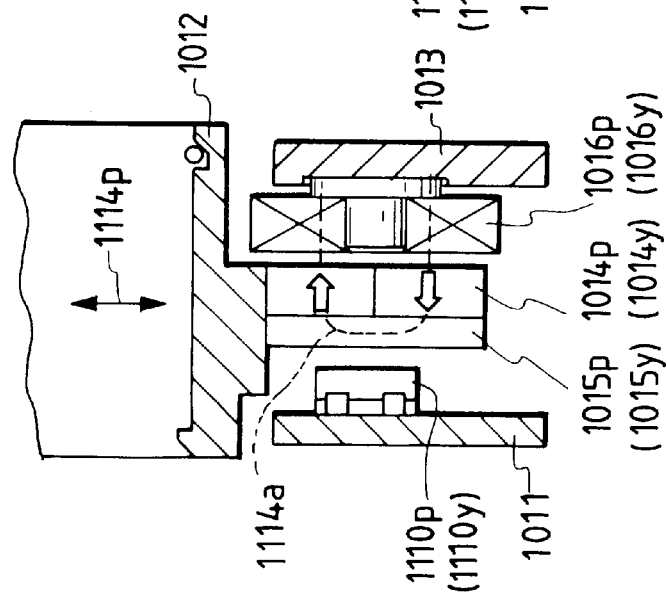
Figure 16A:
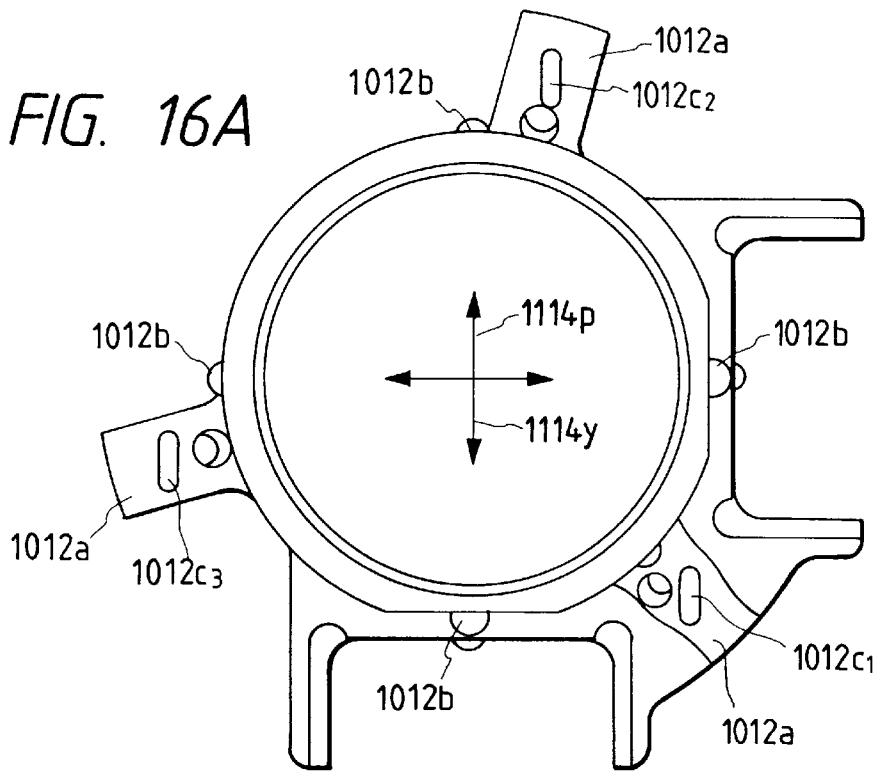
FIG. 16A shows a support frame shown in FIG. 9, etc., as it is seen from the back side of FIG. 10.
Figure 16B:
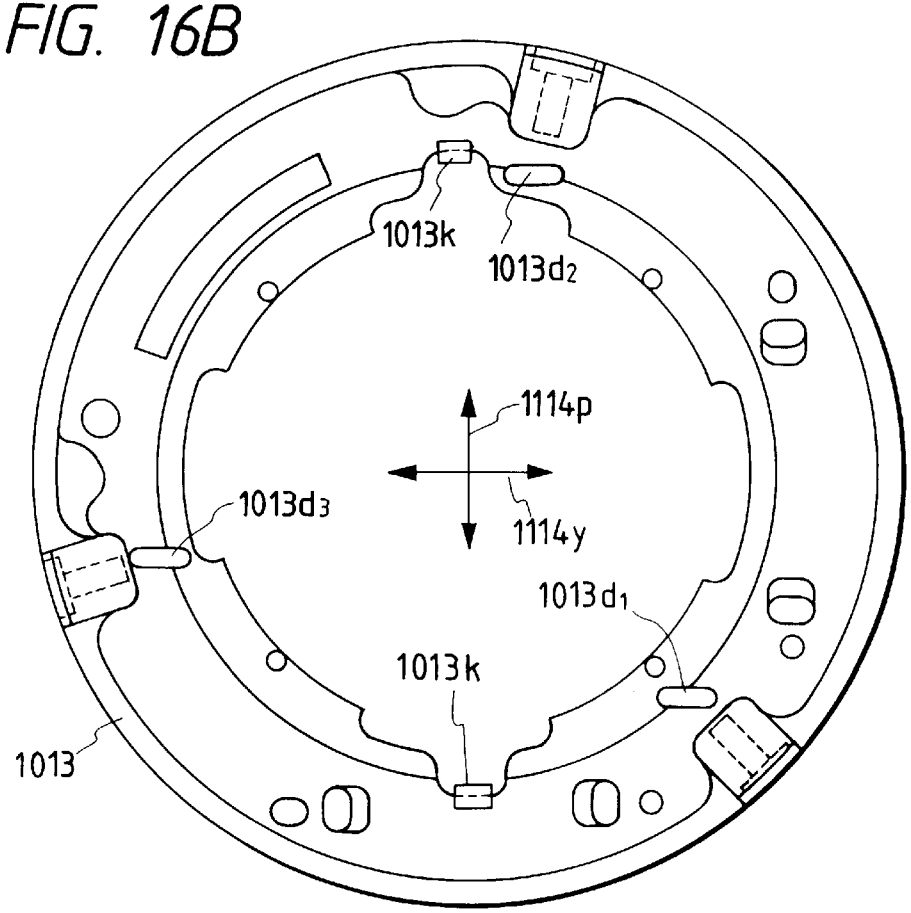
FIG. 16B shows a ground plate shown in FIG. 9, as it is seen from the back side of FIG. 10.
Figure 18A:
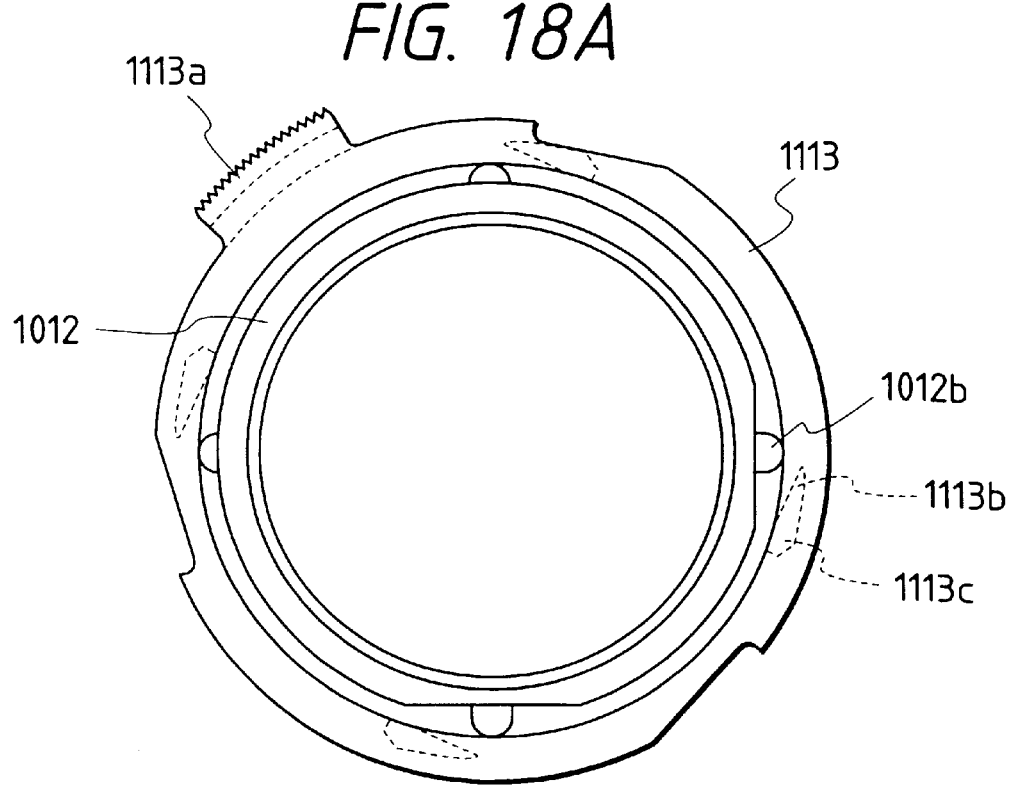
FIGS. 18A and 18B are views for illustrating a lock mechanism for a support frame by a lock ring shown in FIG. 9, etc., and illustrate an unlocking state and a locking state, respectively.
Figure 18B:
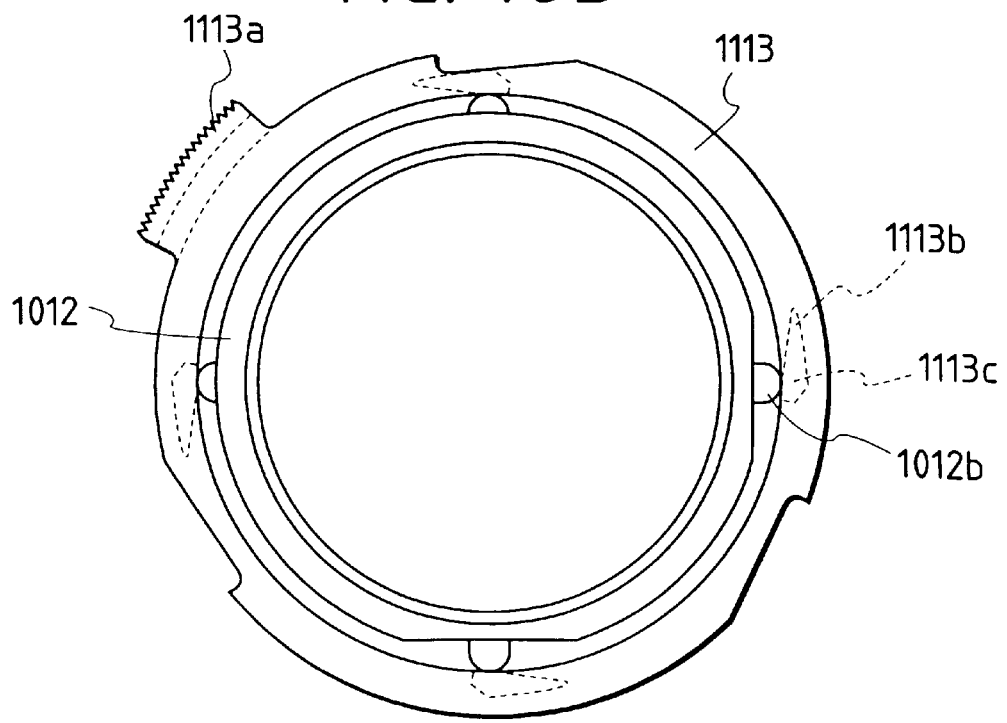
Figure 19:
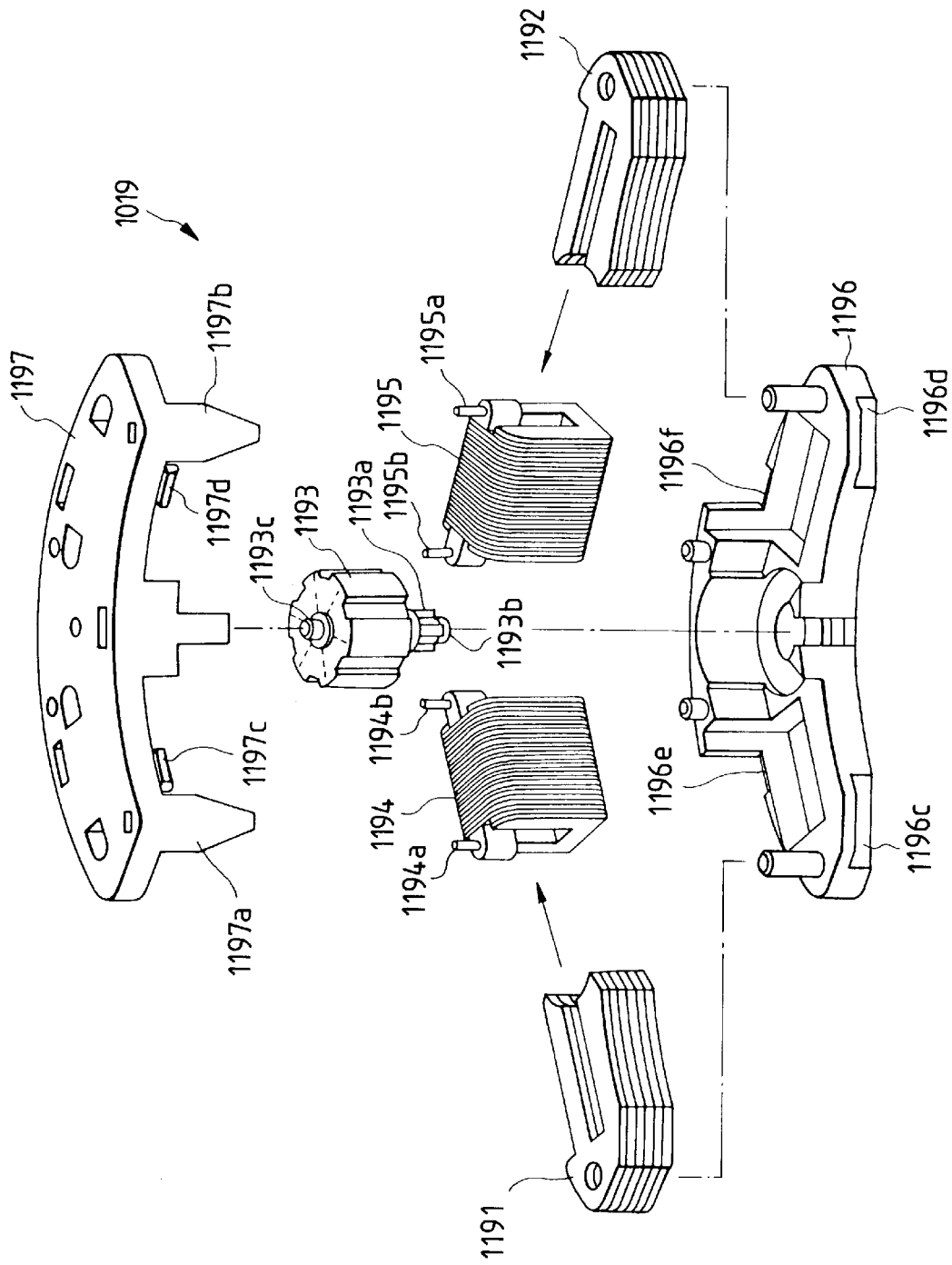
FIG. 19 is an exploded perspective view showing the constituent elements of a stepping motor according to the second embodiment of the present invention.
Figure 22:
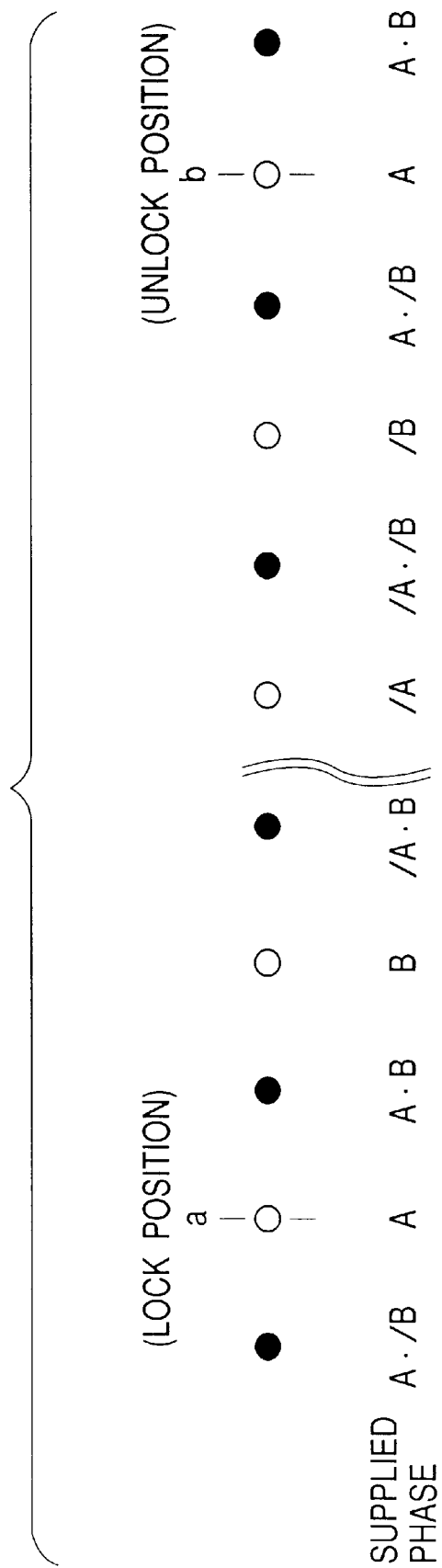
FIG. 22 shows the relation between the stopped position of the stepping motor of FIG. 19 and the state of the lock ring.

FIGS. 9 to 22 show the mechanical constructions of a correction optical apparatus in an image blur correcting apparatus according to the second embodiment of the present invention. FIG. 9 is an exploded perspective view showing the constituent elements of the essential portions of the correction optical apparatus, FIG. 10 shows the correction optical apparatus as it is seen from the left of FIG. 9 (for illustration, a hard substrate 111 is removed so that the interior can be seen), FIG. 11A is a view of the correction optical apparatus as it is seen in the direction of arrow 11A in FIG. 10, FIG. 11B shows the construction of a portion concerned in the position detection of a correction lens 1011, FIG. 12A is a cross-sectional view taken along the line 12A—12A of FIG. 10, FIG. 12B is a plan and cross-sectional view showing a portion of FIG. 12A on an enlarged scale, FIGS. 13A to 13C are a plan view, a side view and a cross-sectional view, respectively, of a coil unit, FIGS. 14A to 14C are views for illustrating the construction of driving means for blur correction in the present embodiment by comparison with the construction according to the prior art, FIG. 15 shows the hard substrate 1111 shown in FIG. 9, etc., FIGS. 16A and 16B show a support frame 1012 and a ground plate 1013 shown in FIG. 9, etc. as they are seen from the back side of the surface shown in FIG. 10, FIGS. 17A to 17D show a lock ring 1113 and a rolling regulating ring 1112 shown in FIG. 9, etc. as they are seen from the plane of FIG. 10, FIGS. 18A and 18B are views for illustrating the locking and unlocking, respectively, of the support frame 1012 by the lock ring 1113, FIG. 19 is an exploded perspective view showing the constituent elements of a stepping motor 19, FIGS. 20A to 20H show the positional relations between a magnet rotor 1193 and stator yokes 1191, 1192 in the stepping motor 1019, FIG. 21 is a timing chart of the electrical energization of a coil in the stepping motor 1019, and FIG. 22 shows the relation between the stopped position of the stepping motor 1019 and the state of the lock ring 1113.

Reference is first had to FIG. 9 to briefly describe the construction of the correction optical apparatus in the image blur correcting apparatus according to the second embodiment of the present invention.

The correction lens 1011 is supported by the support frame 1012, which in turn is coupled to the ground plate 1013 by driving means comprising permanent magnets, coils, etc. which will be described later, a correction optical system comprising the correction lens 1011 and the support frame 1012 is driven in a pitch direction 1114$p$ and a yaw direction 1114$y$, whereby image blur is corrected. The lock ring 1113 locks the support frame 1012, i.e., the correction optical system, at a predetermined position by the output of the stepping motor 1019 which will be described later being transmitted to a rack 1113$a$. The rolling regulating member 1112 has its three shaft portions 1112$a_1$ to 1112$a_3$ fitted to the support frame 1012 through the ground plate 1013 to thereby regulate the rolling of the support frame 1012 about the optical axis. The reference numeral 1111 designates a hard substrate (printed substrate) on which the terminals of the aforementioned stepping motor and coil and further of a Hall element which will be described later forming position detecting means, etc. are concentratedly wired on the same plane.

Detailed construction will hereinafter be described with reference to FIGS. 10 and so on.

Yokes 1015$p$ and 1015$y$ to which permanent magnets 1014$p$ and 1014$y$ shown in FIG. 12A (in FIG. 10, these magnets are unseen by being hidden by the yokes 1015$p$ and 1015$y$) are adsorbed are fixed to the support frame 1012 supporting the correction lens 1011, by caulking or screwing.

Coils 1016$p$ and 1016$y$ are attached to that surface of the ground plate 1013 which is opposed to the permanent magnets 1014$p$ and 1014$y$ (see FIG. 12A). The coil 1016$p$ (the coil 1016$y$ also), as shown in FIGS. 13A and 13B, is integrally formed with a coil frame 1016$a$ of resin material, and is made into a unit with the both terminals of the coil 1016$p$ connected to a terminal pin 1016$b$ which is an electrically conductive member forced into the coil frame 1016$a$, and the terminal pin 1016$b$ is soldered to the hard substrate 1111 which will be described later. FIG. 13A is a plan view of the coil unit 1016, FIG. 13B is a side view thereof, and FIG. 13C is a cross-sectional view taken along the line 13C—13C of FIG. 13B.

The relations among the yokes 1015$p$, 1015$y$, the permanent magnets 1014$p$, 1014$y$ and the coils 1016$p$, 1016$y$ forming the driving means for the correction optical system constructed in the manner as described above will be described with reference to FIGS. 14A to 14C. FIG. 14A shows an embodiment of the present invention, FIG. 14B shows an inappropriate example, and FIG. 14C shows an example of the prior art.

In the example of the prior art shown in FIG. 14C, coils 1076$p$ and 1076$y$ are mounted on a support frame 1075. A permanent magnet 1073, as shown, forms a closed magnetic circuit indicated by broken line 1073$b$, by a first yoke 1712 and a second yoke 1072. The reason why a closed magnetic circuit is thus formed is that thereby the flow of a magnetic flux is adjusted and driving efficiency is improved.

In the second embodiment of the present invention, to form a closed magnetic circuit when the permanent magnet 1014$p$ (1014$y$) is to be mounted on the support frame 1012, as shown in FIG. 14B, the permanent magnets 1014$p$ and 1014$y$ can be provided on the support frame 1012 and opposed yokes 1015$ap$ and 1015$ay$ can be provided at positions opposed thereto. Thereby, a closed magnetic circuit 1014$a$ is formed.

In the second embodiment of the present invention, however, as shown in FIG. 14A, the opposed yokes 1015$ap$ and 1015$ay$ are not provided and the closed magnetic circuit is used from the points of view of the balance between the improvement in driving efficiency by providing the opposed yokes 1015$ap$ and 1015$ay$ and the aggravation of follow-up property brought about the increase in weight by mounting the opposed yokes 1015$ap$ and 1015$ay$. That is, attention is paid to the fact that the absolute value of consumed electric power can be reduced by not increasing the weight rather than improving the driving efficiency.

Arm portions 1012$a$ extend radially in three directions on the support frame 1012, as shown in FIGS. 10 and 16A, and rollers 1017 are screwed to these arm portions 1012$a$ (particularly, through screws 1017$a$ as shown in FIG. 12A), and these rollers 1017 are fitted in guide grooves 1013$a$ (see FIGS. 9 and 11A) in the ground plate 1013 in the manner as described below.

The guide grooves 1013$a$ are slots extending in the direction of arrow 1013$b$ as shown in FIG. 11A and therefore, the three rollers 1017 can move in this direction. That is, the support frame 1012 is freely slidable in all directions in a plane containing the ground plate 1013 (it is position-regulated only in the direction of the optical axis 1013$c$ in FIG. 11A).

During assembly, the rollers 1017 are screwed to one or two of the three locations of the arm portions 1012$a$ of the support frame 1012, and the screwed rollers 1017 are fitted into the guide grooves 1013$a$ in the ground plate 1013 to thereby place the support frame 1012 on the ground plate 1013 and finally, the remaining roller 1017 is screwed to the arm portion 1012$a$ of the support frame 1012 through the remaining guide groove 1013$a$, whereby the incorporation of the support frame 1012 into the ground plate 1013 in completed.

Here, by using eccentric rollers as shown in FIG. 12B as the rollers 1017, the adjustment of the inclination of the correction lens 1011 is possible (FIG. 12B is a plan and cross-sectional view showing a portion of FIG. 12A on an enlarged scale, as previously described). That is, by the rollers 1017 being rotated, the arm portions 1012a are moved back and forth in the direction of the optical axis and therefore, by the positions of the three arm portions 1012a in the direction of the optical axis being adjusted by the rollers 1017, the inclination of the correction lens 1011 can be adjusted, and by tightening the screws 1017a after the adjustment, the rollers 1017 can be made unrotatable relative to the arm portions 1012a.

Figure 17A:
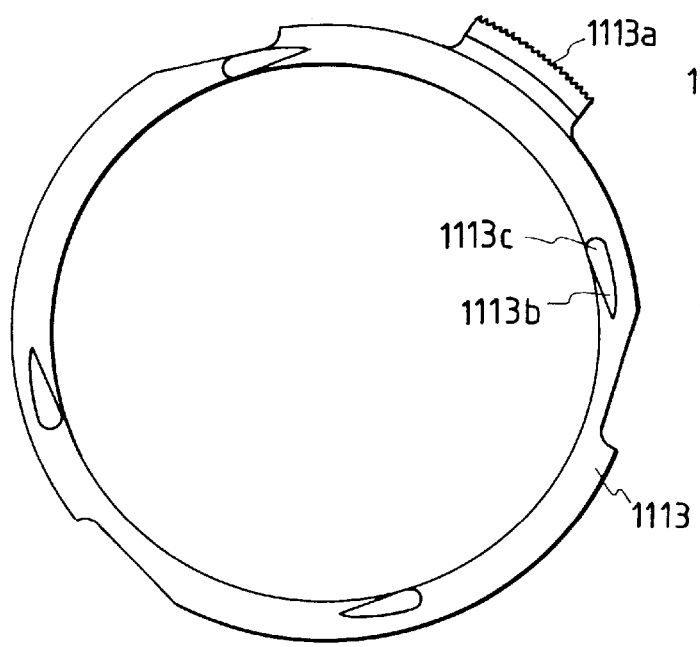
FIGS. 17A and 17B are views showing a lock ring shown in FIG. 9, etc., as it is seen from the plane of FIG. 10, and a side view of the lock ring, respectively.
Figure 17B:
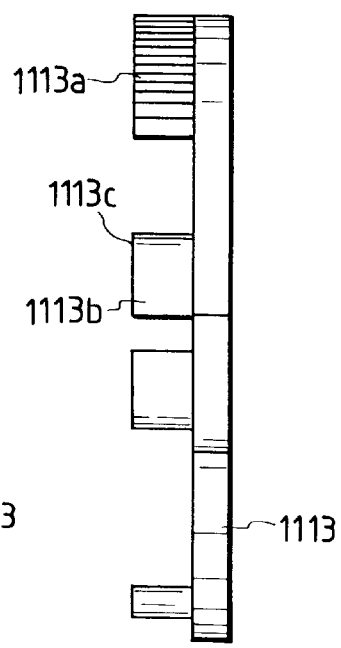
Figure 17C:
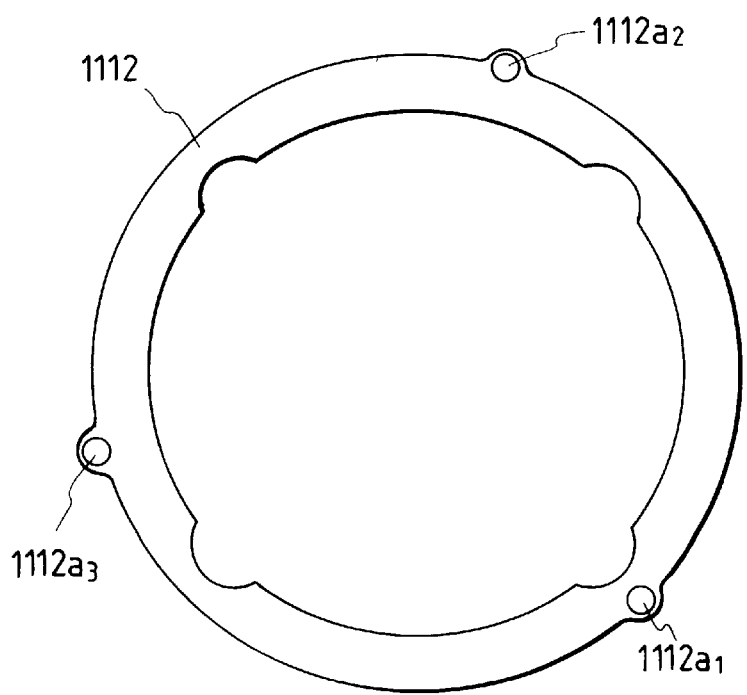
FIGS. 17C and 17D are views showing a rolling regulating ring shown in FIG. 9, etc., as it is seen from the plane of FIG. 10, and a side view of the rolling regulating ring, respectively.
Figure 17D:
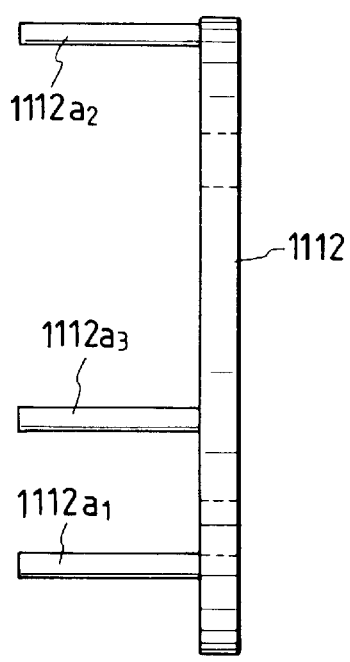

The lock ring 1113 shown in FIGS. 17A and 17B is rotatably supported on the ground plate 1013 from the back side of the surface shown in FIG. 10, and a gear 1193a provided on the rotor 1193 of a stepping motor 1019 (see FIGS. 10, 19 and 20A to 20H, the details thereof will be described later) mounted also on the ground plate 1013 through a motor ground plate 1198 (see FIG. 10) is in meshing engagement with a rack 1113a and can drive the lock ring 1113 in the direction of rotation. Four cams 1113b provided on this lock ring 1113 effect the locking and unlocking of the support frame 1012 by their relations with a four-point projection 1012b shown in FIG. 16A and thereby function as locking means.

That is, when the lock ring 1113 shown in FIG. 17B is rotated counter-clockwisely, the cam portions 1113b of the lock ring 1113 separate from the projections 1012b of the support frame 1012, as shown in FIG. 18A, and therefore the support frame 1012 becomes free (unlocked) relative to the lock ring 1113. Also, when the lock ring 1113 is rotated in a clockwise direction, the flat portions 1113c of the cam portions 1113b come into contact with the projections 1012b, and the support frame 1012 and the lock ring 1113 come into engagement with each other. That is, the support frame 1012 is locked relative to the ground plate 1013.

Thus, when blur correction is to be effected, the lock ring 1113 is driven in a clockwise direction by the stepping motor 1019 to thereby render the support frame 1012 free (unlocked) relative to the lock ring 1113, and on the other hand, when the blur correction is terminated, the lock ring 1113 is driven in a clockwise direction to thereby render the support frame 1012 locked relative to the ground plate 1013.

As described above, the support frame 1012 is coupled to the ground plate 1013 by the rollers 1017 and guide grooves 1013a and is position-regulated in the direction of the optical axis. This supporting method is excellent in assembling property, and the guide grooves 1013a are integrally formed in the ground plate 1013 and the control of the fitting between the rollers 1017 and the holes of the guide grooves 1013a is easy to effect (generally this will be easily understood if the relation between a roller and a cam often used in a lens barrel is considered). Further, there is the merit that conventional eccentric rollers are used as the rollers 1017, whereby the inclination between the support frame 1012 and the ground plate 1013 can be adjusted by the rotation of the rollers 1017.

In the case of the above-described supporting method, however, the support frame 1012 can freely move in a pitch direction 1114p and a yaw direction 1114y (blur correcting direction) show in FIG. 10 and besides, rotates also in a rolling direction 1114r. This rotation aggravates the accuracy of blur correction.

So, in the present embodiment, the following method is adopted to reduce the influence of the above-mentioned rolling.

Referring to FIG. 16B which is a view of only the ground plate 1013 of FIG. 10 as it is seen from the back thereof, there are formed slots $1013d_1$, $1013d_2$ and $1013d_3$ extending in the direction 1114y. Shaft portions $1112a_1$, $1112a_2$ and $1112a_3$ extending from a rolling regulating ring 1112 shown in FIG. 17D toward the back of the plane of the drawing sheet extend through these slots $1013d_1$, $1013d_2$ and $1013d_3$, respectively. The shaft portion $1112a_1$ and the slot $1013d_1$, and the shaft portion $1112a_3$ and the slot $1013d_3$ are in fitted relationship with each other, and from these two points, the rolling regulating ring 1112 is movable only in the direction 1114y relative to the ground plate 1013.

The slot $1013d_2$ is large as compared with the slots $1013d_1$ and $1013d_3$ (although they are depicted substantially likewise in the drawing), and the fitting backlash thereof with the shaft portion $1112a_2$ is made great. This is because if all of the three shaft portions $1112a_1$, $1112a_2$ and $1112a_3$ are fitted, the fitting becomes duplicate and therefore the movement between the rolling regulating ring 1112 and the ground plate 1013 becomes difficult. That is, it is preferable that one of the three slots be opened large.

Now, considering with the slot $1013d_1$ as the reference, the slot $1013d_3$ is longer in the span in the direction 1114y than the slot $1013d_2$. Consequently, if the slots $1013d_1$ and $1013d_3$ are used as fitting slots, even when fitting backlash occurs between them and the shaft portions $1112a_1$, $1112a_3$, the rolling backlash between the rolling regulating ring 1112 and the ground plate 1013 can be reduced. (If the slots $1013d_1$ and $1013d_2$ are used as fitting slots, the rolling backlash will become great because the span thereof in the direction 1114y is short.)

The rolling regulating ring 1112 is resiliently engaged and regulated in the direction of the optical axis by pawls 1013k (see FIGS. 12A and 16B) provided on the ground plate 1013. The shaft portions $1112a_1$, $1112a_2$ and $1112a_3$ of this rolling regulating ring go into slots $1012c_1$, $1012c_2$ and $1012c_3$, respectively, formed in the back of the support frame 1012 and extending in the direction 1114p through the ground plate 1013 (see the rear view of the support frame of FIG. 16A and FIG. 12A). Here again, the slot $1012c_1$ and the shaft portion $1112a_1$, and the slot $1012c_2$ and the shaft portion $1112a_2$ are brought into fitting relationship with each other and the slot $1012c_3$ is set large, thereby avoiding duplicate fitting. The reason why in this case the slot $1012c_3$ is opened large is similar to that in the case of the slot 1013d. Consequently, the support frame 1012 is movable only in the direction 1114p relative to the rolling regulating ring 1112.

With the construction as described above, the support frame 1012 is movable only in the directions 1114p and 1114y relative to the ground plate 1013 and is regulated in the rolling direction 1114r, but actually minute rolling by the fitting backlash between the shaft portion 1112a and the slots 1013d, 1012b still remains and therefore, springs 1018 are provided between hooks 1012d provided on arm portions 1012a on the support frame 1012 and hooks 1013e provided on the periphery of the ground plate 1013 (see FIGS. 10, 12A and 12B). The springs 1018, as shown in FIG. 10, extend radially in three directions from the center of the support frame 1012, and pull the support frame 1012 in a divergent manner. The hooks 1012d are provided at locations diametrally greatly spaced apart from the center of the support frame 1012 and therefore, when a force in the rolling direction acts on the support frame 1012, that force can be suppressed by the resilient forces of the springs disposed in diverging directions. That is, rolling regulation is resiliently effected and therefore, minute rolling backlash can be prevented from occurring.

FIG. 15 shows the hard substrate 1111 shown in FIGS. 11B and 12A, and Hall elements 1110p and 1110y which are position detecting means which will be described later are coupled to the back side of patterns 1111*cp* and 1111*cy* (only the positional relation thereof is also shown in FIG. 10). While Hall elements are shown as being used as the position detecting means, use can be made of magnetic detecting means such as MR elements. Optical detecting means such as photoreflectors may also be used.

This hard substrate 1111 is attached to the ground plate 1013 with the positioning pins 1013*f* of the ground plate 1013 and apertures 1111*d* in the hard substrate 1111 as a guide, and screws are inserted into apertures 1111*e* and are screwed to threaded holes 1013*g* (see FIG. 10). At this time, the terminal pins 1016*b* of the coils made into a unit as previously described extend upwardly in the plane of the drawing sheet of FIG. 10, and the connecting terminals 1194*a*, 1194*b*, 1195*a* and 1195*b* of the coils 1194 and 1195 (see FIG. 19) of the stepping motor 1019 which will be described later also extend in this direction and therefore, naturally the terminal pins 1016*b* and the connecting terminals 1194*a*, 1194*b*, 1195*a* and 1195*b* also: extend through apertures 1111*b* and 1111*a* (see FIG. 15). The apertures 1111*a* and 1111*b* are in the form of through-holes, and there the terminal pins and connecting terminals are soldered to terminal pins 1016*a* and 1019*a* to thereby make electrical connection.

As the position detecting means attached to the hard substrate 1111, the Hall elements 1110*p* and 1110*y* are used as previously described (see FIGS. 11B and 14A).

The operation of the Hall elements will hereinafter be described with reference to FIG. 14A.

The Hall element 1110*p* (1110*y*) changes its output in accordance with a change in the magnetic field around it. In FIG. 14A, the Hall element 1110*p* (1110*y*) is opposed to a permanent magnet 1014*p* (1014*y*) having its two poles magnetized, and with the driving (e.g. in the pitch direction 1114*p*) of the support frame 1012, the relation between the Hall element 1110*p* (1110*y*) and the permanent magnet 1014*p* (1014*y*) deviates and therefore, the intensity of the magnetic field applied to the Hall element 1110*p* (1110*y*) changes and the Hall element 1110*p* (1110*y*) effects an output corresponding thereto to thereby detect the position of the support frame 1012.

FIG. 19 is an exploded perspective view showing the constituent elements of the aforedescribed stepping motor 1019.

The reference numeral 1191 designates a stator yoke comprising a plurality of (six) plates: of soft magnetic material layered and secured together, and the plates of soft magnetic material comprise plates of the same shape stacked and made into a unit.

The reference numeral 1192 denotes the same part as the stator yoke 1191, and it provides the other stator yoke of a stepping motor of the two-phase type. This stator yoke 1192 is the stator yoke 1191 as it is turned over.

The reference numeral 1193 designates a rotor made of a plastic magnet which becomes rotatable by the excited state of the stator yokes 1191 and 1192, and the outer periphery thereof is divisionally and alternately magnetized. The rotor 1193 is integrally provided with a gear 1193*a* for transmitting the rotational force of the rotor 1193 to the rack 1113*a* of the lock ring 1113. The reference numerals 1194 and 1195 denote coils for exciting the stator yoke 1191 and the stator yoke 1192, respectively, and the coils 1194 and 1195 are constructed of the same part. The coils 1194 and 1195 may be electrically energized from connecting terminals 1194*a*, 1194*b*, 1195*a* and 1195*b* to thereby excite the stator yokes 1191 and 1192, respectively.

The reference numeral 1196 designates a motor case for positioning and supporting the stator yokes 1191 and 1192 and rotatably supporting the rotary shaft 1193*b* of the rotor 1193. The motor case 1196 is attached to the ground plate 1013 through the motor ground plate 1198. Of course, the motor case 1196 can be designed to be provided integrally with the ground plate 1013.

The reference numeral 1197 denotes a motor case lid which rotatably supports the rotary shaft 1193*c* of the rotor 1193 and has its pawl portions 1197*a* to 1197*d* hooked in the groove portions 1196*c* to 1196*f*, respectively, of the motor case 1196, whereby there is constructed a stepping motor 1019 made into a unit as an electromagnetic driving device.

The operation of the stepping motor 1019 thus constructed will now be described.

The coils 1194 and 1195 are electrically energized through the connecting terminals 1194*a*, 1194*b*, 1195*a* and 1195*b*, whereby magnetic fields are produced in the stator yokes 1191 and 1192 and interact with the magnetic field of the rotor 1193 to thereby form a closed magnetic circuit. If at this time, the coil 1195 is not electrically energized, the magnetic circuit produced by the electrically energized coil 1194 becomes dominant and causes the rotor 1193 to produce a rotational torque (This also holds true when only the coil 1195 is electrically energized). Also, when the two coils 1194 and 1195 are electrically energized, magnetic circuits are formed in the stator yokes 1192 and 1193 and interact with the rotor 1193, thereby giving a rotational torque to the rotor 1193. Accordingly, the both coils 1194 and 1195 are electrically energized while the direction of the electric current is sequentially changed over, whereby the driving of the stepping motor which is well known can be accomplished, and by the meshing engagement between the gear portion 1193*a* of the rotor 1193 and the rack 1113*a* of the lock ring 1113, the lock ring 1113 can be rotated by a predetermined angle.

FIGS. 20A to 20H show the positional relations between the rotor 1193 and the stator yokes 1191, 1192 in the stepping motor 1019.

In each of these figures, symbols N and S are given to poles magnetized on the outer periphery of the rotor 1193 and poles created on the stator yokes 1191 and 1192 by the electrical energization of the coils 1194 and 1195.

Figure 20A:
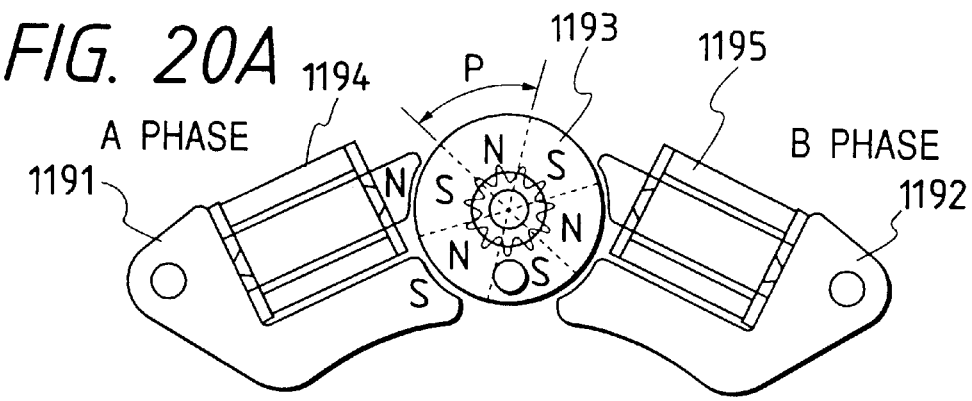
FIGS. 20A, 20B, 20C, 20D, 20E, 20F, 20G and 20H show the positional relations between a magnet rotor and stator yokes in the stepping motor of FIG. 19.

FIG. 20A shows a state in which the coil 1194 is electrically energized in a direction in which the poles of the symbols are created in the stator yoke 1191 (this state will hereinafter be called the "A phase energized state", and the electrically energizing state in the opposite direction will hereinafter be called the "/A phase energized state"). When in such a state, the poles of the rotor 1193 attract the poles created in the stator yoke 1191 and therefore, the rotor 1193 is stopped with the poles thereof opposed to the stator yoke 1191, and at that time, the rotor 1193 is stopped with a deviation of ½ of the magnetization pitch P thereof (=P/2) without the poles of the stator yoke 1192 and rotor 1193 being opposed to one another. That is, consideration is paid such that the stator yokes 1191 and 1192 are disposed with a deviation of "nP+(P/2):(n being an integer)". Also, even when in this state, the electrical energization is stopped, the poles of the rotor 1193 attract the stator yoke 1191 and therefore, the rotor 1193 can remain stopped. That is, it is in a mechanically stable position.

In the ensuing description, the position in which the rotor 1193 can remain stopped even if the electrical energization is cut off will be referred to as a "stable position" or a "one-phase energized position".

Figure 20B:
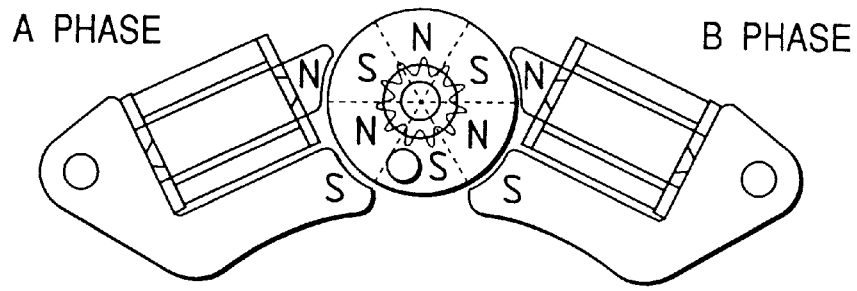

FIG. 20B shows a state in which the coil 1194 is A-phase-energized and the coil 1195 is electrically energized in a direction in which the poles of the symbols are created in the stator yoke 1192 (this state will hereinafter be referred to as a "B-phase energized state" and the electrically energized state in the opposite direction will hereinafter be referred to as a "/B-phase energized state"). When A and B phase energizations are effected from the state of FIG. 20A, the poles of the rotor 1193 and the poles created in each stator repulse or attract one another, and the rotor 1193 is rotated in a clockwise direction by P/4 and is stopped in the state of FIG. 20B while keeping balance. Also, when in this state, the electrical energization is stopped, the poles of the rotor 1193 try to attract either of the stator yokes 1191 and 1192 and therefore, the rotor 1193 cannot remain stopped in that position, but moves to the state of FIG. 20A or the state of FIG. 20C which will be described later.

In the ensuing description, such a position in which the rotor 1193 cannot remain stopped when the electrical energization is cut off will be referred to as an "unstable position" or a "two-phase energized position".

Figure 20C:
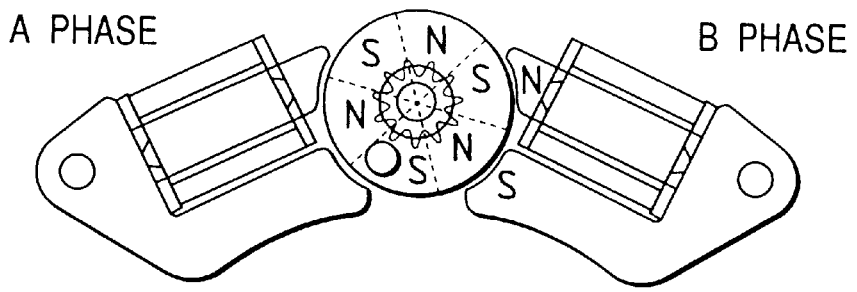

FIG. 20C shows a state in which the electrical energization of the coil 1194 has been cut off from the state of FIG. 20B and the coil 1195 has been B-phase-energized, and at this time, the poles of the symbols are created in the stator yoke 1192 and therefore, they attract the poles of the rotor 1193 and thus, the rotor 1193 is further rotated in a clockwise direction by P/4 relative to the state of FIG. 20B. Also, this state is the stable position like FIG. 20A.

Figure 20D:
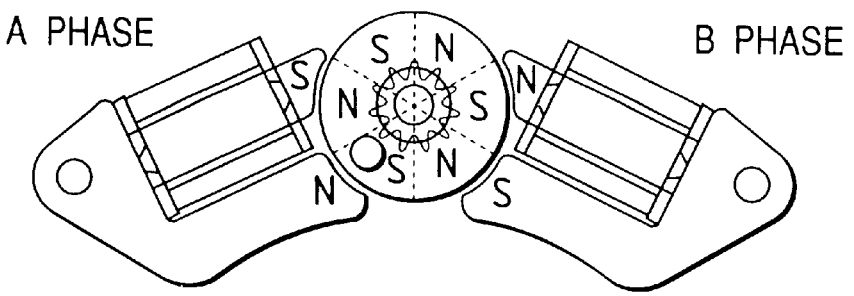
Figure 20E:
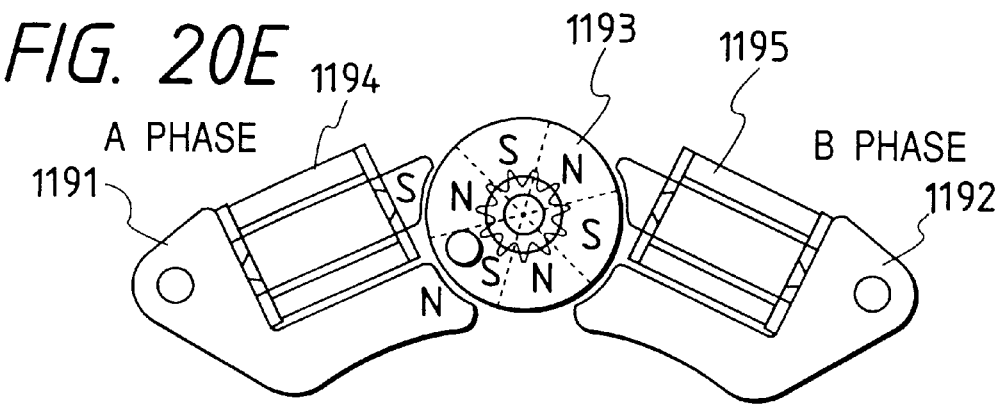
Figure 20F:
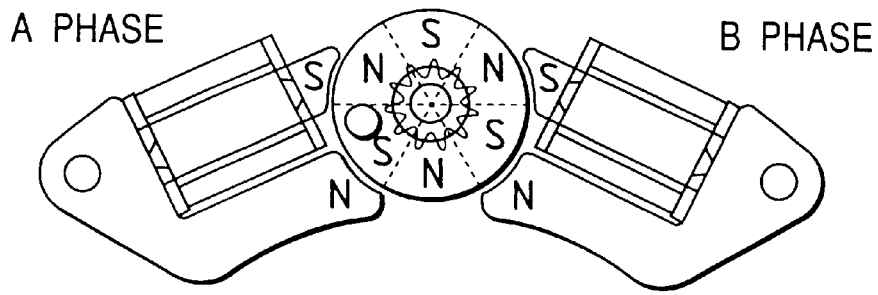
Figure 20G:
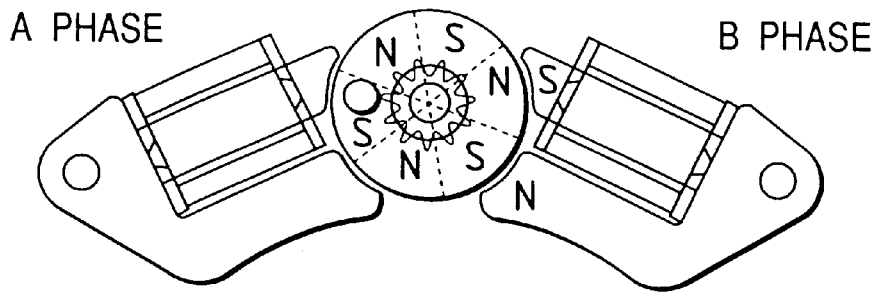
Figure 20H:
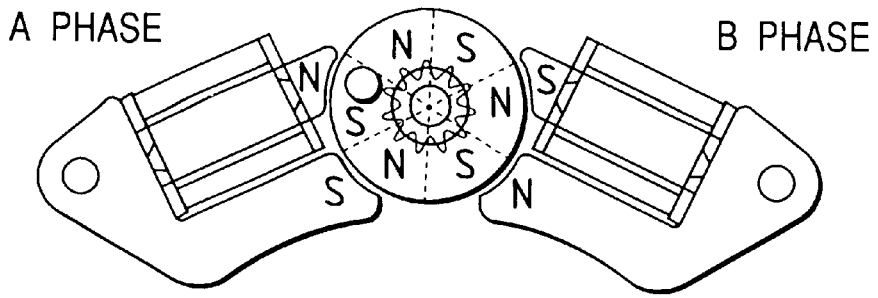

FIG. 20D shows a state in which /A and B phase energization has been effected, FIG. 20E shows a state in which /A phase energization has been effected, FIG. 20F shows a state in which /A and /B phase energization has been effected, FIG. 20G shows a state in which /B phase energization has been effected, and FIG. 20H shows a state in which A and /B phase energization has been effected. In these figures, the rotor 1193 is sucessively rotated in a clockwise direction by P/4 relative to the preceding figure, but the principle is similar to that shown in FIGS. 20A to 20C and therefore, the operation need not be described.

A timing chart of the electrical energization of the coils is shown in FIG. 21 on the basis of the principle of operation as described above. In FIG. 21, the axis of abscissas represents pulse number (or time) and the axis of ordinates represents the state of electrical energization, and at the lowermost stage, there are shown the supplied phase and the correspondence to the states of FIGS. 20A to 20H.

It is seen from this figure that the state of the supplied phase permits eight combinations, and assuming that a combination at this time is counted as one pulse, the phase amount from the first pulse can be supplied from the ninth pulse and so on, to thereby rotate the rotor 1193 up to any angle. Also, it is possible as a matter of course to trace back the states of FIGS. 20A to 20H to thereby rotate the rotor 1193 by P/4 each in the counter-clockwise direction.

FIG. 22 shows the relation between the stopped position of the stopping motor 1019 by one- and two-phase driving illustrated in FIGS. 19, 20A to 20H, and 21 and the state of the lock ring 1113 shown in FIG. 18.

In FIG, 22, positions at which the rotor 1193 can be stopped even if it is not electrically energized (one-phase energized positions) are represented by white circles, and positions at which the rotor 1193 can be stopped with the two coils electrically energized at a time (two-phase energized positions) are represented by black circles, and the supplied phases at those positions are shown at the lower stage. The letter a indicates the position of the rotor 1193 when the lock ring 1113 is in its locking state as shown in FIG. 18B, and the letter b indicates the position of the rotor 1193 when the lock ring 1113 is in its unlocking state as shown in FIG. 18A, and in the present embodiment, both of them are the positions in the A phase energized state which are mechanically stable positions. Therefore, the stopped position is stable even when the electrical energization is cut off after the termination of driving, and the rotor can remain stopped at that position.

Figure 23:
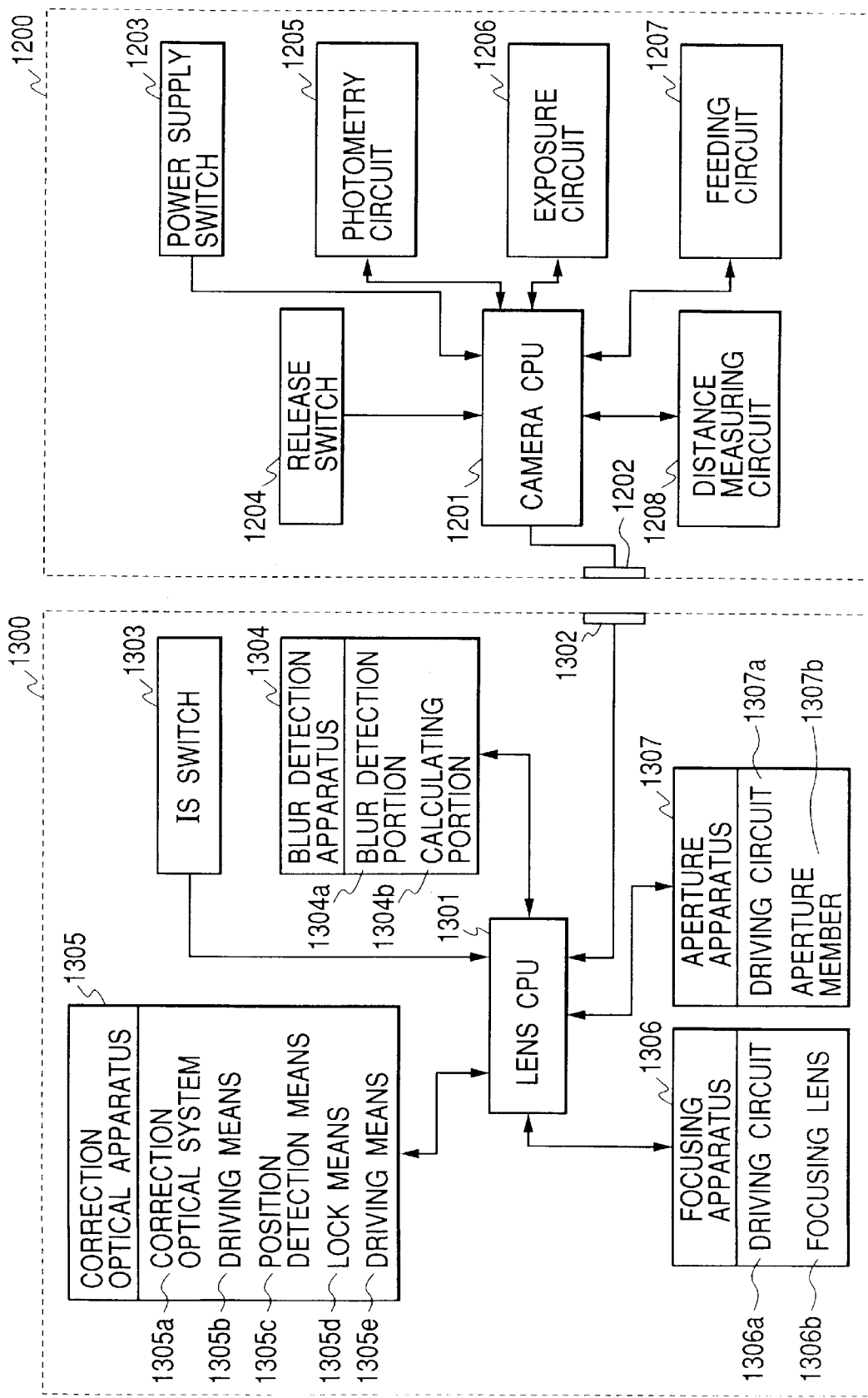
FIG. 23 is a block diagram showing the circuit construction of an interchangeable lens carrying therein an image blur correcting apparatus according to the second embodiment of the present invention and a camera body.

FIG. 23 is a block diagram of an auto focus (AF) single-lens reflex camera system of the lens interchange type carrying thereon an image blur correcting apparatus including the correction optical apparatus according to the present invention described with reference to FIGS. 9 to 22.

In FIG. 23, the reference numeral 1200 designates a camera body and the reference numeral 1300 denotes an interchangeable lens body. The reference numeral 1201 designates a camera CPU comprised of a microcomputer. This camera CPU 1201 controls the operations of various circuits in the camera body 1200 as will be described later, and effects communication with a lens CPU 1301 through a camera contact 1202 during the mounting of the lens body 1300. The reference numeral 1203 denotes a power supply switch operable from the outside to start the camera CPU 1201 and make power supply to each actuator, sensor, etc., in the systems, and operation of the system is thereby made possible. The reference numeral 1204 designates a release switch of the two-stroke type operable from the outside, and the signal thereof is inputted to the camera CPU 1201.

If a first stroke switch is ON (SW1 signal is produced) in accordance with a signal inputted from the release switch 1204, the camera CPU 1201 effects the determination of an exposure amount by a photometry circuit 1205, the focusing operation, etc and enters a preparation for photographing, and when it detects that a second stroke switch has been operated up to ON (SW2 signal is produced), it transmits an aperture operating command which will be described later to the lens CPU 1301 (which, as will be described later, controls the operations of various devices in the lens body 1300 and which, when mounted on the camera body 1200, effects communication with the camera CPU 1201 through the lens contact 1302) in the lens body 1300, and transmits an exposure starting command to an exposure circuit 1206 to effect the actual exposure operation, and when it receives an exposure completion signal, it transmits a feed starting command to a feeding circuit 1207 to effect the winding of film. The reference numeral 1208 designates a distance measuring circuit which measures the distance of an object present in a distance measurement area in accordance with a distance measurement starting command transmitted from the camera CPU 1201 by the SW1 of the release switch 1204 being closed, and determines the amount of movement of a focusing lens necessary to focus thereon and transmits it to the camera CPU 1201.

The reference numeral 1303 denotes an image blur operation switch (hereinafter referred to as the IS switch) operable from the outside, and capable of selecting (selecting IS operation upon ON) whether the image blur correcting operation (hereinafter also referred to as the IS operation) should be performed. The reference numeral 1304 designates a blur detection apparatus comprised of a blur detection portion 1304a for detecting the acceleration or speed of the vertical vibration and lateral vibration of the camera in accordance with a command from the lens CPU 1301, and a calculating portion 1304b for outputting to the lens CPU 1301 the displacement resulting from having electrically or mechanically integrated the output signal of the blur detection portion 1304a.

The reference numeral 1305 denotes the correction optical apparatus described in detail with reference to FIGS. 9 to 22, and divided broadly into the following five constituents controlled by the lens CPU 1301. The first is a correction optical system 1305*a* comprising chiefly a correction lens 1011 and a support frame 1012, the second is driving means 1305*b* comprising chiefly permanent magnets 1014*p*, 1014*y* and coils 1016*p*, 1016*y* and for moving the correction lens 1011, the third is position detection means 1305*c* comprising chiefly permanent magnets 1014*p*, 1014*y* and Hall elements 1110*p*, 1110*y* and for detecting the position of the moved correction lens 1011, the fourth is lock means 1305*d* comprising a lock ring 1113 and the projection 1012*b* of the support frame 1012 and capable of locking the correction lens 1011 at a predetermined position (the central position of the optical axis) as required, and the fifth is driving means 1305*e* comprising a stepping motor and for driving the lock ring 1113.

The correction optical apparatus 1305, the IS switch 1303, the blur detection apparatus 1304 and the lens CPU 1301 for controlling these together constitute an image blur correcting apparatus.

The reference numeral 1306 designates a focusing apparatus comprised of a driving circuit 1306*a* controlled by the lens CPU 1301 in accordance with the amount of movement of a focusing lens transmitted from the camera CPU 1201 as previously described, and a focusing lens 1306*b* driven by the driving circuit 1306*a*. The reference numeral 1307 denotes an aperture apparatus comprised of a driving circuit 1307*a* controlled by the lens CPU 1301 in accordance with an aperture operation command transmitted from the camera CPU 1201 as previously described, and an aperture member 1307*b* driven by the driving circuit 1307*a* and determining the area of the aperture.

Figure 24B:
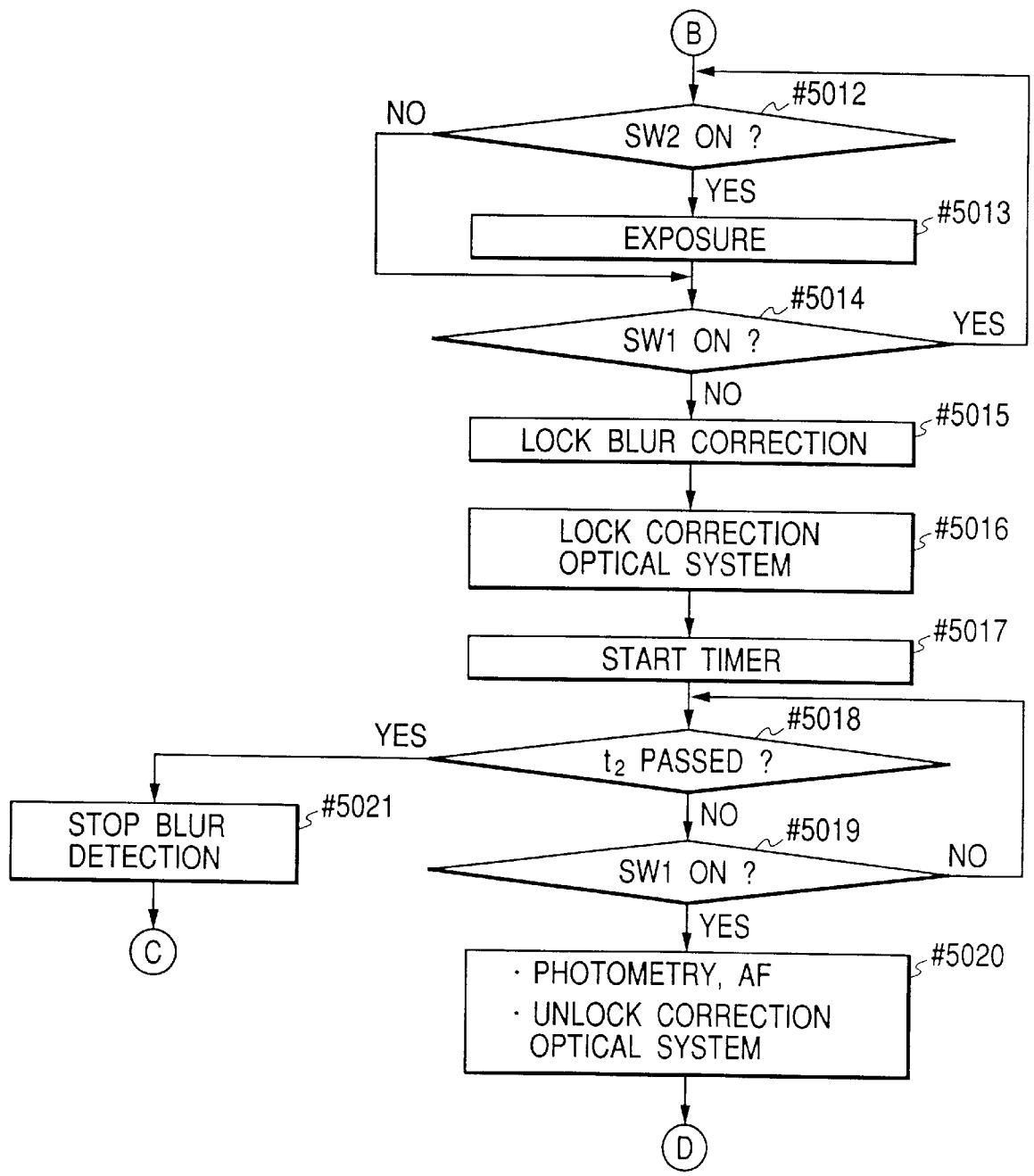
FIG. 24 which is comprised of FIGS. 24A and 24B is a flow chart showing the series of operations of the camera of FIG. 23.

FIGS. 24A and 24B are flow charts showing the main operations in the camera system shown in FIG. 23.

When it is judged that the power supply switch 1203 of the camera body 1200 has been closed and the supply of the electric power to the lens body 1300 has been started (or when a new battery has been put in, or when the lens body 1300 has been mounted on the camera body 1200, communication is started between the camera body 1200 and the lens body 1300) (Yes at #5001), the lens CPU 1301 effects the A phase energization of the stepping motor 1019 constituting the lock means 1305*d* in the correction optical apparatus 1305.

Thereby, even if for example, a great shock is applied against detect torque and the rotor 1193 is at the neighboring mechanically stable position (A and /B or A and B phase energization), it can be pulled into the position of A phase energization.

That is, in the present embodiment, the rotor positions of the stepping motor 1019 in the locking state and the unlocking state are of the same phase, and more particularly, both of the phases of the electrical energization at the stopped position of the stepping motor 1019 are A phase energization and therefore, even when the lock ring 1113 has been moved from the locking state or the unlocking state to the neighboring mechanically stable position by a great shock as described above (when the deviation of the stopped position has been caused), the lock ring can be easily driven to the locking state or the unlocking state in which it should originally be stopped, simply by A phase energization being effected irrespective of the state before the positional deviation.

Thereafter, the lens CPU 1301 detects the position of the correction lens 1011 from the outputs of the Hall elements 1110*p* and 1110*y* (#5003), and brings about a state in which the driving control thereafter can be properly effected by the A phase energization, and examines whether the lock ring 1113 has been brought into the locking state or the unlocking state. Specifically, the difference between the central position of the photo-taking optical axis and the position of the correction lens 1011 (or an amount by which the correction lens 1011 is actually movable when a driving command for the correction lens 1011 has been sent to the driving means 1305*b*) is found, and whether the value thereof is a value smaller than the supposed lock backlash of the flat portion 1113*c* of the cam 1113*b* of the lock ring 1113 and the projection 1012*b* of the support frame 1012 in the locking state (see FIG. 18B) is determined (#5004), and if it is smaller, the lock ring is judged to be in the locking state and advance is made to #5006, and if it is greater, the lock ring is judged to be in the unlocking state and the stepping motor 1019 is electrically energized, whereby the lock ring 1019 is driven to the locking state which is the initial state (#5005).

Thus, the electrical energization for driving the lock ring 1113 to the locking state can be effected only when the lock ring 1113 is in the unlocking state and therefore, unnecessary electrical energization can be prevented and the saving of electric power and improved reliability can be achieved.

Also, by these series of operations (#5002 to #5005), the lock ring 1113 can be driven to the locking state irrespective of the state (the locking state or the unlocking state) thereof and finally without the stepping motor 1019 being stepped out even if stopped position deviation is caused by a shock.

Further, if the driving of the lock ring 1113 from the unlocking state to the locking state is effected after the correction lens 1011 (the correction optical system 1305*a*) is adjusted to the center of the optical axis by the driving means 1305*b*, the driving load can be mitigated and it is possible to drive the lock ring within a shorter time.

Next, whether the camera CPU 1201 judges whether SW1 signal is produced in the release switch 1204 (#5006), and if it is produced, the lens CPU 1301 judges whether the IS switch 1303 is ON (IS operation is selected), and if the IS operation is selected, advance is made to a step #5008, and if the IS operation is not selected, advance is made to a step #5022. At the step #5008, the lens CPU 1301 starts an internal timer, and subsequently, the camera CPU 1201 effects photometry and AF (distance measuring operation), and the lens CPU 1301 starts AF (focusing operation) and blur detection, and further the stepping motor 1019 is electrically energized so as to release the lock means 1305*d* to make the blur correction control by the driving means 1305*b* possible (#5009).

Next, the lens CPU 1301 examines whether the time count by the timer has reached a predetermined time $t_1$, and if it has not been reached, the program stays at this step until it reaches the predetermined time to (#5010). This is a process for waiting for the time until the output of the blur detection apparatus 1304 becomes stable. Thereafter, when the predetermined time $t_1$ has passed, the correction optical system 1305*a* is driven through the driving means 1305*b* on the basis of a target value signal by the output of the blur detection apparatus 1304 and the output of the position detection means 1305*c* to thereby start blur correction control (#5011).

Next, the camera CPU 1201 examines whether a SW2 signal is produced in the release switch 1204 (#5012), and if it is not produced, whether a SW1 signal is produced is again judged (#5014), and if a SW1 signal is not produced either, the lens CPU 1301 stops blur correcting control (#5015) and electrically energizes the lock means 1305*d*, i.e., the stepping motor 1019, so as to lock the correction optical system 1305*a* at a predetermined position (the central position of the optical axis) (#5016).

Also, if at step #5012, it is judged that a SW2 signal is not produced, but at step #5014, it is judged that a SW1 signal is produced, return is made to step #5012. If at this step #5012, it is judged that the SW2 signal of the release switch 1204 has been produced, the lens CPU 1301 controls the aperture apparatus 1307 and at the same time, the camera CPU 1201 effects the exposure operation on the film through the exposure circuit 1206 (#5013). Then, the camera CPU 1201 examines the state of the SW1 signal (#5014), and when the SW1 signal is no longer produced, the lens CPU 1301 stops blur correction control as previously described (#5015), and electrically energizes the stepping motor 1019 which is the driving means 1305b so as to lock the correction optical system 1305a at a predetermined position (the central position of the optical axis) by the lock means 1305d (#5016).

When the above-described-operations are completed, the lens CPU 1301 then once resets the timer and starts it again (#5017), and again judges whether the SW1 signal is produced within a predetermined time $t_2$ (#5018→#5019→#5018 . . . ). If the SW1 signal is again produced within the predetermined time $t_2$ after blur correction is stopped, photometry, AF (the distance measuring operation and the focusing operation) and the unlocking of the correction optical system 1305a are effected (#5020), and since the blur detection remains continued, the correction optical system 1305a is immediately driven on the basis of the target value signal and the output of the position detection means 1305c, and blur correction control is again started (#5011).

Thereafter, operations similar to those described above are repeated. By carrying out such a process, it becomes possible to eliminate the inconvenience that each time the photographer stops the release operation and thereafter performs the release operation again as previously described, the photographer starts the blur detection apparatus 1304 and waits until the output thereof becomes stable.

On the other hand, if the SW1 signal is not produced within the predetermined time $t_2$ after blur detection is stopped (Yes at #5018), blur detection is stopped the operation of the blur detection apparatus 1304 is stopped (#5021). Thereafter, return is made to #5006, where production of a SW1 signal is awaited.

Also, if at the step #5007, the IS operation is not selected, the camera CPU 1201 executes photometry and AF (the distance measuring operation) and the lens CPU 1301 executes AF (the focusing operation) (#5022).

Next, the camera CPU 1201 examines whether the SW2 signal of the release switch 1204 is produced (#5023), and if it is not produced, whether the SW1 signal is produced is again judged (#5025), and if the SW1 signal is not produced either, return is made to the step #5006, where the production of a SW1 signal is awaited. Also, if at the step #5023, it is judged that the SW2 signal is not produced, but at the step #5025, it is judged that the SW1 signal is produced, return is made to the step #5023. If at this step #5023, it is detected that the SW2 signal has been produced in the release switch 1204, the lens CPU 1301 controls the aperture apparatus 1307 and at the same time, the camera CPU 1201 performs an exposure operation on the film through the exposure circuit 1206 (#5024). Then, the camera CPU 1201 examines the state of the SW1 signal (#5025), and if the SW1 signal is not produced, return is made from the step #5025 to the step #5006.

In the AF signal-lens reflex camera system of the lens interchange type according to the present embodiment, the above-described series of operations are repeated until the power supply switch 1203 is opened, and when this switch is opened, the communication between the camera CPU 1201 and the lens CPU 1301 is terminated and the supply of electric power to the lens body 1300 is terminated.

According to the above-described embodiment, the rotor positions of the stepping motor 1019 in the locking state and the unlocking state of the lock ring 1113 are electrically of the same phase (in the embodiment, A phase energization) and therefore, even if the stopped position of the lock ring 1113 deviates due to a shock or the like, the A phase energization is effected, whereby the lock ring 1113 can be easily driven to the locking state or the unlocking state. Accordingly, it becomes possible to position the lock ring 1113 in a state in which it should originally be stopped, without providing any expensive and bulky position detection means for detecting the position of the lock ring 1113.

Also, design is made such that the A phase energization is effected when an interchangeable lens (provided with the image blur correcting apparatus) is mounted on the camera body or when the electric power is supplied and therefore, it becomes possible to properly effect the changeover control of the lock ring 1113 thereafter.

As described above, according to the construction of the above-described second embodiment of the present invention, there can be provided a position control apparatus which can properly effect the position control of a movable member, without the necessity of providing expensive means for detecting the position of the movable member, even when the deviation of the stopped position of the movable member occurs due to a shock or the like.

Also, according to the construction of the above-described second embodiment, there can be provided a correction optical apparatus which can properly effect the position control of the lock means, without the necessity of providing expensive means for detecting the state of the lock means, even if the lock means causes positional deviation due to a shock or the like and is not in the locking state or the unlocking state.

(Third Embodiment)

Figure 26:
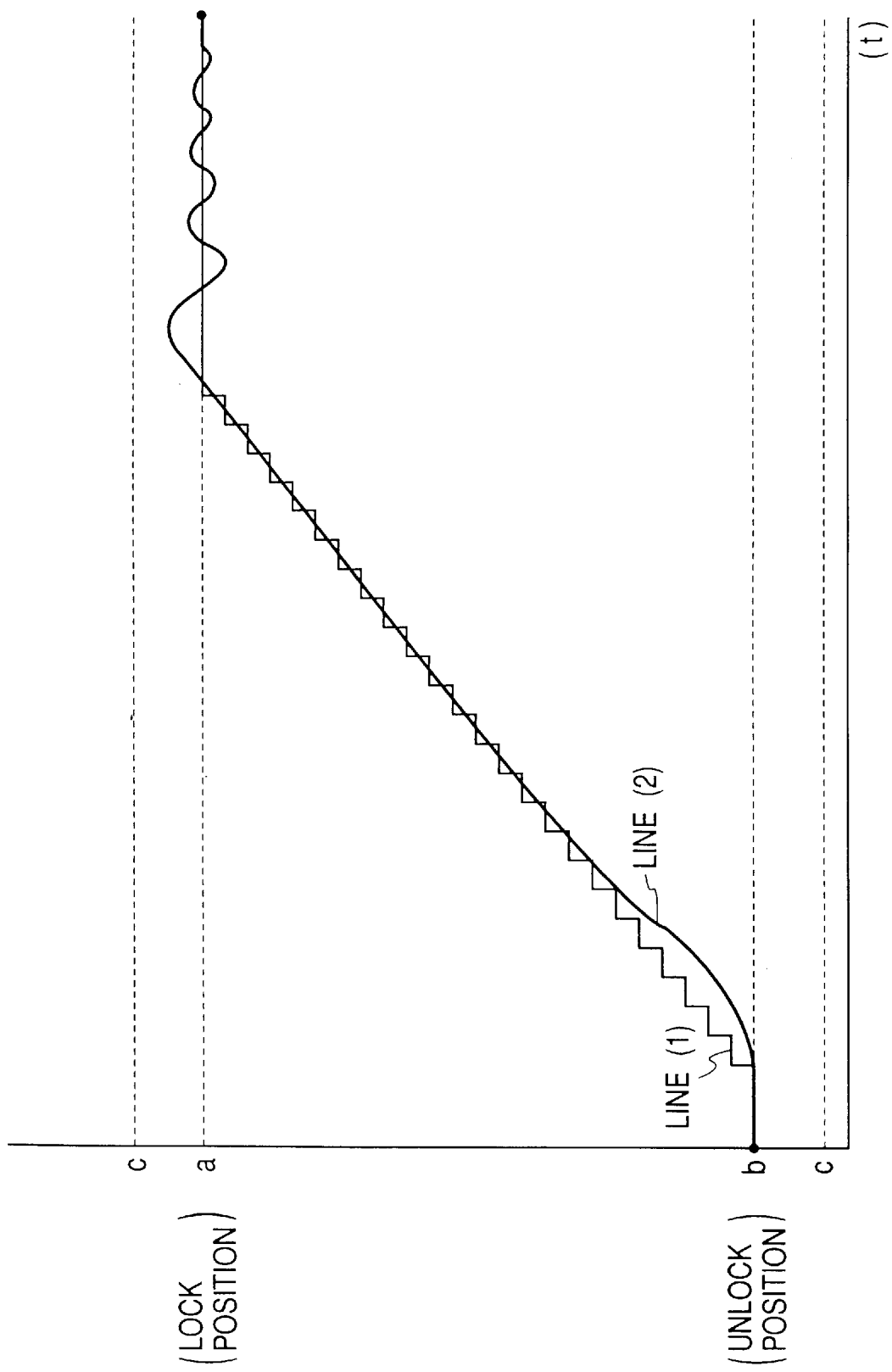
FIG. 26 is a graph for illustrating the state when in the third embodiment of the present invention, the lock ring positioned in its locking state by the stepping motor of FIG. 19 has been driven to its unlocking position.
Figure 27:
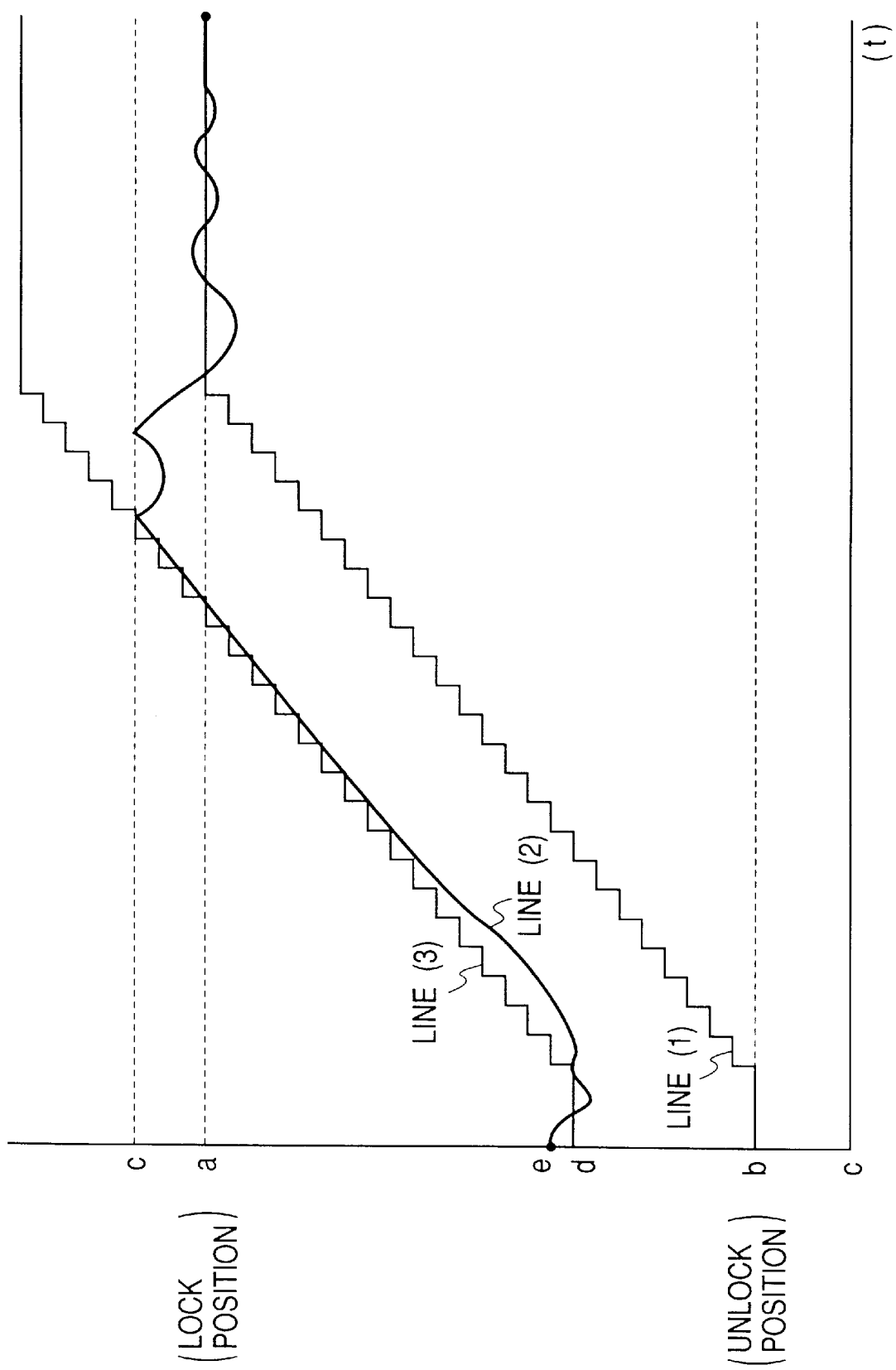
FIG. 27 is a graph for illustrating the state when in the third embodiment of the present invention, the lock ring stopped halfway by the stepping motor of FIG. 19 has been driven to the unlocking position.

A third embodiment of the present invention is designed to operate in accordance with a flow chart shown in FIGS. 28A and 28B, instead of the flow chart (FIGS. 24A and 24B) showing the operation of the aforedescribed second embodiment, and sets the relation between the stopped position of a lock ring 1113 and a mechanical regulating position prescribing the end of the movement range of the lock ring, as shown in FIGS. 26 and 27 which will be described later. In the other points, the construction of the third embodiment is similar to that shown in FIGS. 8 to 19, 20A to 20H and 22. The operation of an apparatus according to the third embodiment will hereinafter be described. In the following description, members similar to those of the second embodiment are given the reference characters of FIGS. 8 to 19, 20A to 20H and 22.

Figure 25:
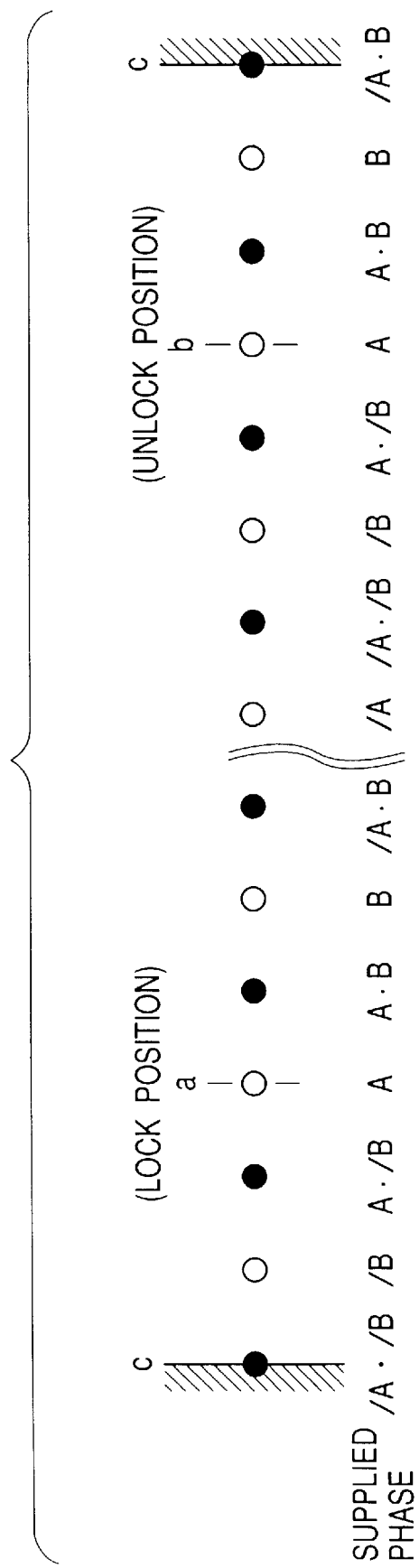
FIG. 25 shows the relation between the stopped position of the stepping motor of FIG. 19 and the state of the lock ring in a third embodiment of the present invention.

FIG. 25 is for illustrating the operation of the apparatus according to the third embodiment, and shows the relation between the stopped position of the rotor 1193 of a stepping motor 1019 by one- and two-phase driving and the state of a lock ring 1113 shown in FIGS. 18A and 18B.

In FIG. 25, positions at which the rotor 1193 can be stopped even if it is not electrically energized (one-phase energization positions) are represented by white circles, and positions at which the rotor 1193 can be stopped with two coils electrically energized at a time (two-phase energization positions) are represented by black circles, and the supplied phase at those positions is shown at the lower stage. The letter a indicates the position of the rotor 1193 at a position whereat the lock ring 1113 is in the locking state as shown in FIG. 18B, and the letter b indicates the position of the rotor 1193 at a position whereat the lock ring 1113 is in the unlocking state as shown in FIG. 18A, and in the present embodiment, both of them are the position of the A phase energization state which is a mechanically stable position and therefore, even if the electrical energization is cut off after the termination of driving, the stopped position is stable and the rotor can remain stopped at that position.

The letter c indicates the position of the rotor 1193 at a position whereat the end surface 1013n in the direction of rotation in the aperture 1013m of a ground plate 1013 bears against the end surface 1113e of a rack 1113a in the lock ring 1113 (the rotation of the lock ring 1113 is mechanically regulated), and in the present embodiment, the end surface 1113e of the ground plate 1113 is set so that this position may be shifted by about three steps to the outside of the range between the locking and unlocking states from the positions (positions a and b) of the rotor 1193 in the locking and unlocking states of the lock ring 1113.

FIGS. 26 and 27 are graphs showing the pattern of the electrical energization, in the present embodiment, of the stepping motor 1019 described with reference to FIGS. 19 to 22 and the actual movement of the rotor 1193 (i.e., the movement of the lock ring 1113). FIG. 26 shows the movement when the lock ring 1113 is moved from the unlocking state to the locking state, and FIG. 27 shows the movement when the lock ring 1113 is moved from its halfway stopped state to the locking state. In these figures, the axis of abscissas represents time and the axis of ordinates represents the position of the rotor 1193 (the position of the lock ring 1113) or the electrical energization state of the stepping motor 1019 corresponding to that position, and line (1) indicates the electrical energization state of the stepping motor 1019, and line (2) indicates the movement of the rotor 1193 (the lock ring 1113).

The pattern of the electrical energization of the stepping motor 1019 will first be described with reference to FIG. 26.

First, electrical energization is effected to the supplied phase (A phase) in the unlock position for a predetermined time. Thereafter, electrical energization is sequentially effected up to the supplied phase (24 steps) in the lock position while the supplied phase is advanced by one step each in the driving direction as described with reference to FIG. 20. At this time, electrical energization for a longer time than the energization time at each step in the driving hitherto is effected to the supplied phase (A phase) in the lock position which is a stop target position.

Description will now be made of the state of the actual movement of the rotor 1193 by the pattern of the electrical energization as described above.

In FIG. 26, if the lock ring 1113 is in the unlocking state, it remains stopped during the electrical energization to the A phase at the beginning, and when there has occurred deviation by a great shock exceeding the detect torque of the stepping motor 1019, the lock ring is driven to the regular unlocking state during this energization time. Next, as regards the electrical energization during driving to the lock position, several steps at the start causes follow-up delay relative to the supplied phase, but thereafter the lock ring is driven substantially following the advance of the supplied phase. When the advance of the supplied phase stops and is fixed in the lock position which is the stop target position, the lock ring once passes (overshoots), the lock position by inertia, but it is immediately pulled back and again passes the lock position toward the opposite side by inertia, and is pulled back. The lock ring is gradually attenuated in its movement while repeating this movement several times, and at least stops in the lock position which is the stop target position.

Description has been made above of the state when the lock ring 1133 is moved from the unlock position to the lock position and to move the lock ring from the lock position to the unlock position, the driving direction (the direction of advance of the supplied phase) can be changed.

In the present embodiment, electrical energization for a predetermined time is effected to the supplied phase in the first locking or unlocking state during driving energization (the state in which the lock ring should originally be before driving), and when positional deviation is caused by a shock or the like (in such a case, the lock ring usually deviates by about one step relative to the state in which it should originally be), the lock ring can be returned to the state in which it should originally be, and then can be actually driven and therefore, the lock ring can be reliably driven without causing any inconvenience such as step-out.

Also, the electrical energization time at the stop target position is set longer than the electrical energization time at each step during driving so that electrical energization may be stopped after the overshooting by inertia is attenuated, and there is no irregularity of the stopped position and reliable driving can be effected.

Further, the stopped position (a or b) in the locking state or the unlocking state and the mechanical regulating position (c) are set larger than the amount of overshooting occurring when the driving is stopped and thus, stable driving can be accomplished and the occurrence of unpleasant sound by mechanical contact can be prevented.

The driving from the halfway stopped state (where the lock ring is stopped is unknown) to the locking state will now be described with reference to FIG. 27.

The driving pattern (line (1)) is the same as that described with reference to FIG. 26 and therefore need not be described, and the state of the actual movement of the rotor 1193 (the lock ring 1113) will hereinafter be described. Assuming that the position before driving is the position of the ninth step (position e) from the unlock position toward the lock position (this is caused, e.g., by the power supply being cut off during image blur correction), electrical energization is effected to A phase at first, whereby during this energization time, the lock ring is driven to the position of the eighth step (position d) which is the nearest A phase position whereafter it is driven toward the lock position along line (3) of the same supplied phase as line (1) and preceding by 8 steps relative to line (1).

However, driving electrical energization is effected by an amount corresponding to 24 steps, whereas there are only 16 steps (from position d to position a) to the lock position and therefore, the lock ring passes the lock position which is the stop target position and once mechanically strikes and springs back, but is immediately pulled back in a direction along line (3). It then mechanically strikes again and springs back, but now it is pulled in a direction along line (1) because line (1) is nearer than line (3) (the force with which the lock ring is moved along line (1) is stronger than the force with which the lock ring is moved along line (3)).

That is, as previously described, the end surface 1113e of the ground plate 1113 is set so as to be at a position shifted by about three steps toward the outside of the range between the unlock position and the lock position relative to the position (position a) of the rotor 1193 in the locking state of the lock ring 1113 and thus, before a half cycle (in the present embodiment, 4 steps and corresponding to ⅙ of one full rotation) of the supplied phase of the step motor 1019 is reached (in the example shown in FIG. 27, when /A and B phase energized state corresponding to FIG. 20D which precedes A phase by 3 steps is brought about), the lock ring repeats mechanical striking and springing back, and in the meantime, the supplied phase advances so that A phase energization may be effected (because the supplied phase advances in the manner of /A→/A and /B→A and /B→A from /A and B) and therefore, the force with which the lock ring is moved along line (1) becomes strong and thus, the lock ring is pulled in the direction along line (1).

When the advance of the supplied phase stops and is fixed at the lock position which is the stop target position, the lock ring once passes (overshoots) the lock position by inertia, but it is immediately pulled back and passes the lock position toward the opposite side again by inertia, and is pulled back. The back ring is gradually attenuated in its movement while repeating such movement several times and at last, is stopped at the lock position which is the stop target position.

The foregoing description has been made on the assumption that the position before driving is the position (position e) of the ninth step from the unlock position toward the lock position, but even when the lock ring is stopped at any position other than that, at a point of time whereat A phase energization has been terminated, the rotor 1193 (the lock ring 1113) is at one position of four A phases (a (lock position), b (unlock position), d (the eighth step) and the intermediate between a and d (in the example shown in FIG. 27, the position of the sixteenth pulse)) and therefore moves in accordance with the driving pattern until thereafter it mechanically strikes (except when it is at the position b), and after the mechanical striking, it is finally stopped at the lock position (position a) while repeating the movement toward the nearest driving pattern supplied phase position and the mechanical striking.

In the present embodiment, design is made such that electrical energization for a predetermined time is effected to the supplied phase in the unlocking state (the state in which the lock ring should originally be before driving) at the beginning of driving electrical energization, and when the lock ring is stopped at any position, actual driving can be effected after the lock ring is moved to the position of the same supplied phase as the unlocking state and therefore, movement can be reliably started without causing any inconvenience such as step-out.

Also, the lock position (a or b) and the mechanical striking position (c) are set smaller (about 3 steps) than ½ (4 steps) of the supplied phase cycle and therefore, finally by the electrical energization to the lock position which is the stop target position, the lock ring can be stopped at the lock position.

Further, the electrical energization time at the stop target position is set longer than the electrical energization time at each step during driving so that electrical energization may be stopped after the irregular behavior due to the overshooting by inertia or the springing-back during mechanical striking is reliably attenuated, and reliable driving can be accomplished without any irregularity of the stopped position.

As described above, in the present embodiment, whenever the rotor 1193 (the lock ring 1113) is stopped, lock driving and unlock driving can be reliably done with the same driving pattern and therefore, it is not necessary to detect the position of the lock ring 1113. Also, in order to alleviate the creation of a shock or a sound during the mechanical striking, at least one of the end surface 1013 in the direction of rotation in the aperture 1013m of the ground plate 1013 and the end surface 1113e of the rack 1113a in the lock ring 1113 may preferably be formed by a shock alleviating member such as a resilient member.

Figure 28B:
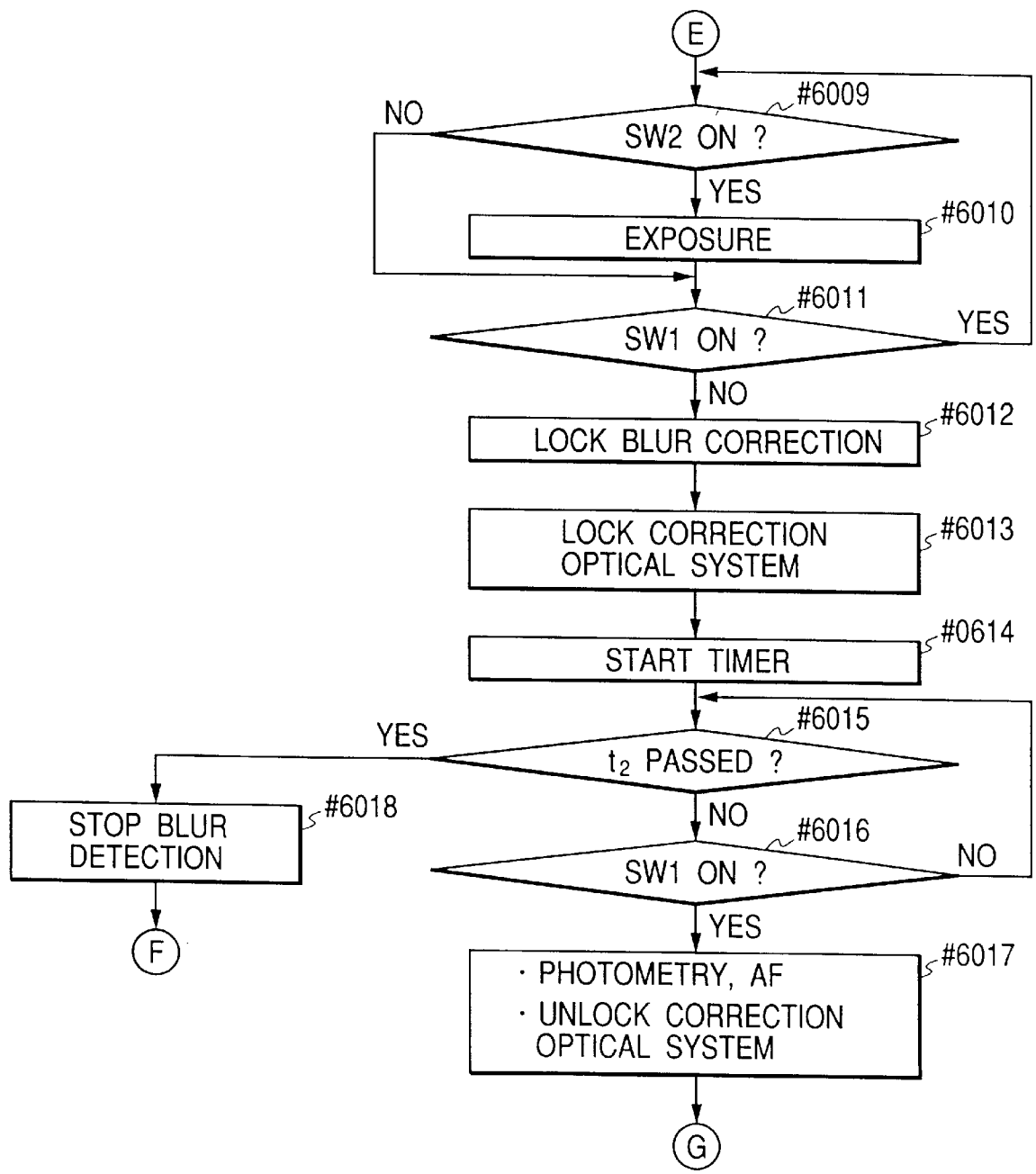
FIG. 28, which is comprised of FIGS. 28A and 28B is a flow chart showing the series of operations of a camera according to the third embodiment of the present invention.
Figure 29:
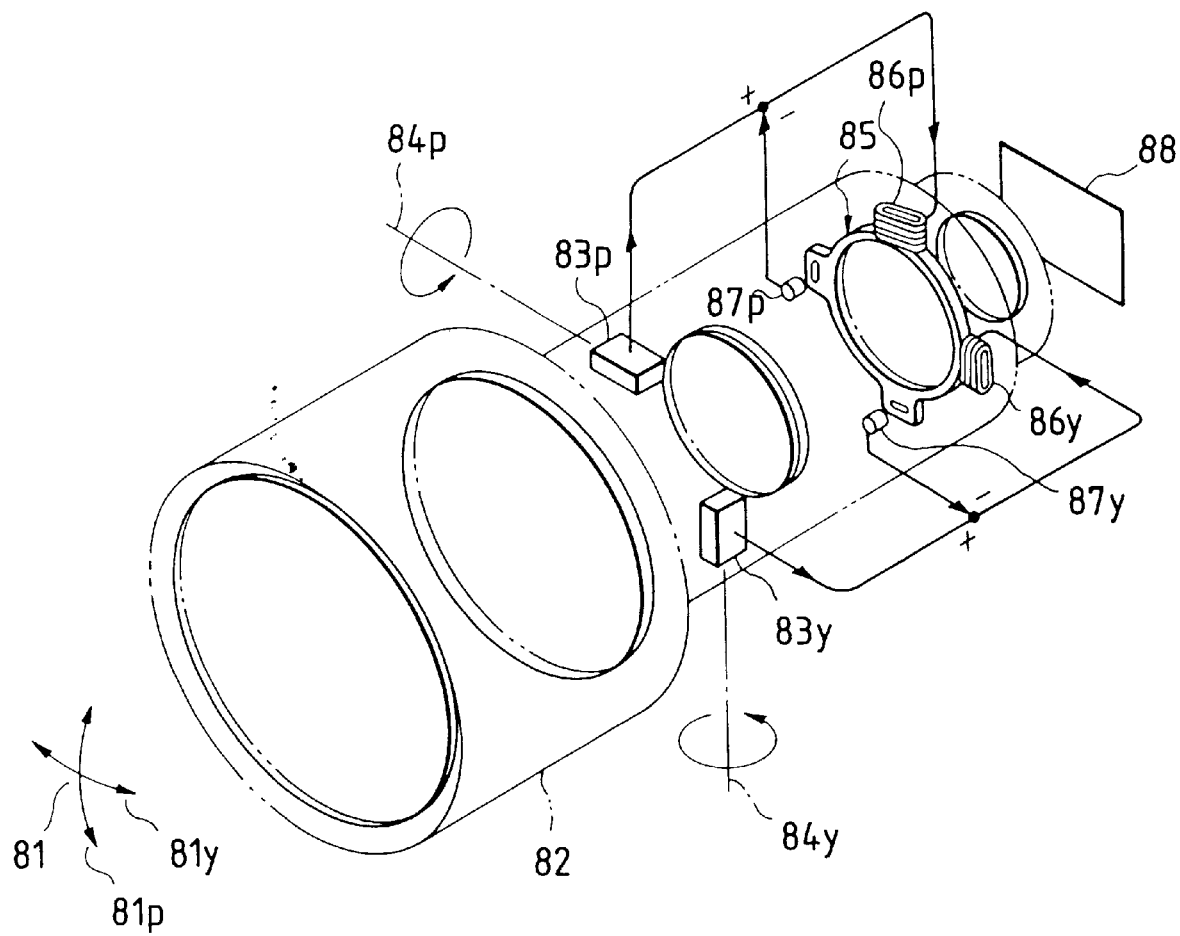
FIG. 29 schematically shows an image blur suppressing system according to the prior art.

The general construction of the present embodiment is similar to the construction of FIG. 22, and FIGS. 28A and 28B are flow charts showing the main operations of the present embodiment in the camera system shown in FIG. 22.

First, when the power supply switch 1203 of a camera body 1200 is closed and it is judged that the supply of electric power has been started to a lens body 1300 (or that communication has been started between the camera body 1200 and the lens body 1300 when a new battery has been put in or when the lens body 1300 has been mounted on the camera body 1200) (Yes at #6001), a lens CPU 1301 effects the locking electrical energization (A phase electrical energization described with reference to FIGS. 26 and 27 to a stepping motor 1019 which is a constituent of lock means 1305d in a correction optical apparatus 1305 (#6002).

Thereby, the driving to the locking state can be reliably effected in whatever situation the power supply switch has been opened at the last time (at whatever position the lock ring 1113 is stopped).

Next, a camera CPU 1201 judges whether SW1 signal is produced in a release switch 1204 (#6003), and if it is produced, the lens CPU 1301 judges whether IS switch 1303 is ON (IS operation is selected) (#6004), and if IS operation is selected, advance is made to a step #6005, and if IS operation is not selected, advance is made to a step #6019. At the step #6005, the lens CPU 1301 starts an internal timer and next, the camera CPU 1201 effects photometry and AF (the distance measuring operation), and the lens CPU 1301 electrically energizes the stepping motor 1019 so as to release the lock means 1305d to make AF (the focusing operation), the starting of blur detection and further the blur correction control by driving means 1305b possible (#6006).

Next, the lens CPU 1301 examines whether the time count by the timer has reached a predetermined time $t_1$, and if it has not been reached, the lens CPU stays at this step until it reaches time $t_1$ (#6007). This is a process for waiting for the time until the output of a blur detection apparatus 1304 becomes stable. When thereafter the predetermined time $t_1$ has elapsed, a correction optical system 1305a is driven through the driving means 1305b on the basis of the target value signal by the output of the blur detection apparatus 1304 and the output of position detection means 1305c to thereby start blur correction control (#6008).

Next, the camera CPU 1201 examines whether a SW2 signal is produced in the release switch 1204 (#6009), and if it is not produced, the camera CPU judges again whether SW1 signal is produced (#6011), and if the SW1 signal is not produced either, the lens CPU 1301 stops blur correction control (#6012) and electrically energizes the lock means 1305d, i.e., the stepping motor 1019, so as to lock the correction optical system 1305a at a predetermined position (the central position of the optical axis) (#6013).

Also, if at the step #6009, it is judged that a SW2 signal is not produced, but at the step #6011, it is judged that a SW1 signal is produced, return is made to the step #6009. If at this step #6009, it is judged that the SW2 signal of the release switch 1204 has been produced, the lens CPU 1301 controls an aperture apparatus 1307 and at the same time, the camera CPU 1201 effects an exposure operation on the film through an exposure circuit 1206 (#6010). Then, the camera CPU 1201 examines the state of the SW1 signal (#6011), and when the SW1 signal is no longer produced, the lens CPU 1301 stops blur correction control (#6012) and electrically energizes the stepping motor 1019 which is the driving means 1305*b* so as to lock the correction optical system 1305*a* at a predetermined position (the central position of the optical axis) by the lock means 1305*d* (#6013).

When the above-described operations are terminated, the lens CPU 1301 then once resets the timer and starts it again (#6014), and judges again whether the SW1 signal is produced within a predetermined time $t_2$ (#6015→#6016→#6015 . . . ). If the SW1 signal is produced again within the predetermined time $t_2$ after blur correction is stopped, photometry, AF (the distance measuring operation and the focusing operation) and the release of the locking state of the correction optical system 1305*a* are effected (#6017), and since blur detection is continued, the correction optical system 1305*a* is immediately driven on the basis of the target value signal and the output of the position detection means 1305*c*, and blur correction control is started again (#6008).

Thereafter, operations similar to those described above are repeated. By carrying out such processes, it becomes possible to eliminate the inconvenience that each time the photographer performs the release operation again after he has stopped the release operation as previously described, he starts the blur detection apparatus 1304 and waits until the output thereof becomes stable.

On the other hand, if a SW1 signal is not produced within the predetermined time $t_2$ after blur correction is stopped (Yes at #6015), blur detection is stopped (the operation of the blur detection apparatus 1304 is stopped) (#6018). Thereafter, return is made to the step #6003, where the production of the SW1 signal is awaited.

Also, if at the step #6004, the selection of IS operation is not done, the camera CPU 1201 executes photometry and AF (the distance measuring operation) and the lens CPU 1301 executes AF (the focusing operation) (#6019).

Next, the camera CPU 1201 examines whether the SW2 signal of the release switch 1204 is produced (#6020), and if it is not produced, the camera CPU 1201 again judges whether the SW1 signal is produced (#6022), and if the SW1 signal is not produced either, return is made to the step #6003, where production of the SW1 signals awaited. Also, if at the step #6020, it is judged that the SW2 signal is not produced, but at a step #6023, it is judged that the SW1 signal is produced, return is made to the step #6020. When at this step #6020, it is detected that the SW2 signal has been produced in the release switch 1204, the lens CPU 1301 controls an aperture apparatus 1307 and at the same time, the camera CPU 1201 effects the exposure operation on the film through an exposure circuit 1206 (#6021). Then, the camera CPU 1201 examines the state of the SW1 signal (#6022), and if the SW1 signal is not produced, return is made from the step #6022 to the step #6003.

In the AF signal-lens reflex camera system of the lens interchange type according to the present embodiment, the above-described series of operations are repeated until the power supply switch 1203 is opened, and when this switch is opened, the communication between the camera CPU 1201 and the lens CPU 1301 is terminated and the supply of electric power to the lens body 1300 is terminated.

The relation between each means shown in the claims and each of the above-described embodiments is as already described, whereas the present invention is not restricted to the constructions of these embodiments, but of course, may be any construction which can achieve the functions shown in the claims or the functions the embodiments have.

In each of the above-described embodiments, a stepping motor is used for the changeover of the locking state and the unlocking state of the lock ring, whereas this is not restrictive, but the present invention can be applied to any apparatus which has a stepping motor and a movable member moved between a first position and a second position by the stepping motor and in which the movable member has such structure that with the first position or the second position as the initial position, it is moved and controlled to the other position.

Also, in each of the above-described embodiments, the lock ring for locking the correction lens provides the movable member, but for example, in order to set the position of a zoom lens, a lens barrel (constructed so as to be driven and controlled with the telephoto end or the wide end as the initial position) intervening between the zoom lens and the stepping motor may provide the movable member.

Also, in the third embodiment, as shown in FIG. 26, the positions (c) three steps outside the lock position and the unlock position are mechanically striking positions, but alternatively, the apparatus may have at least one of them.

Also, in the second and third embodiments, as shown in FIG. 22, etc., with 8 steps as one cycle of the supplied phase, a step motor for moving the lock ring 1113 from one of the locking state and the unlocking state to the other with 3 cycles, i.e., 24 steps, is taken as an example, but of course, the effect of the present invention can be obtained by any step motor for moving the lock ring 1113 from one of the locking state and the unlocking state to the other at one or more cycles of the supplied phase.

As is apparent from the foregoing, the present invention has been described with respect to an example in which it is applied to a camera, whereas this is not restrictive, but the present invention is also applicable to an apparatus provided with a correction optical apparatus or to other apparatuses.

As described above, according to the construction of the third embodiment of the present invention, there can be provided a position control apparatus which can reliably move a movable member to a position which is the stop target even if the movable member is not at its initial position of movement.

Also, according to the construction of the third embodiment of the present invention, there can be provided a correction optical apparatus which can changeover-control lock means to a state which is the target even when at the end of the last use of the apparatus, the lock means is not in the initial state of the locking state or the unlocking state.

Also, according to the construction of the third embodiment of the present invention, there can be provided a correction optical apparatus which can prevent lock means from striking against the mechanical regulating portion when the lock means which is in a normal position at the initial stage of driving is moved from one state to the other state.

Also, according to the construction of the third embodiment of the present invention, there can be provided a correction optical apparatus which can alleviate the shock experienced when lock means strikes against the mechanical regulating portion and can prevent damage of the mechanical regulating portion and the striking portion of the correction means and the occurrence of unpleasant sound caused by the striking.

Also, according to the construction of the third embodiment of the present invention, there can be provided a correction optical apparatus which can set lock means to a predetermined drive starting state so that the changeover control to a desired state can be effected smoothly even when at the end of the last use of the apparatus, the lock means is not in the initial state of the locking state or the unlocking state.

Also, according to the construction of the third embodiment of the present invention, there can be provided a correction optical apparatus which can reliably drive lock means to the final target position which is the unlocking state or the locking state for a correction optical system even when at the end of the last use of the apparatus, the lock means is not in the initial state of the locking state or the unlocking state.

Also, according to the construction of the third embodiment of the present invention, there can be provided a correction optical apparatus which can lock lock means so as to make the optical axis of a correction optical system and the optical axis of other optical system coincident with each other when a user has again started the use of the apparatus even when at the end of the last use of the apparatus, the lock means is not in the initial state of the locking state or the unlocking state, and makes it possible to reliably and quickly effect the driving of the lock means thereafter, and can prevent the feeling of physical disorder by the backlash of the correction optical system and the damage by disturbance vibration and further, the wasteful power consumption by the correction optical system even if the apparatus is used without the blur correcting operation being performed.

In the present invention, the blur detection means may be any means capable of detecting blur, such as an angular acceleration meter, an acceleration meter, an angular speedometer, a speedometer, an angular displacement meter, a displacement meter or further a method of detecting the blur itself of an image.

In the present invention, the blur preventing means for moving a movable member to thereby prevent image blur may be any means capable of preventing image blur, such as light beam changing means such as a shift optical system for moving an optical member in a plane perpendicular to the optical axis thereof or a variable vertical angle prism, or means for moving the photo-taking plane in a plane perpendicular to the optical axis.

The present invention can be applied to various forms of camera such as a single-lens reflex camera, a lens shutter camera and a video camera, and further, optical instruments other than cameras and other apparatuses, and furthermore, apparatuses applied to those cameras, optical instruments and other apparatuses, or elements constituting these.

In the present invention, the whole or part of the construction of the appended claims or the embodiments may form an apparatus, or may be coupled to other apparatus, or may be an element constituting the apparatus.

The individual components shown in a schematic or block form in the drawings are all well known in the camera art and their specific construction and operation are not critical to the operation or best mode for carrying out the invention.

While the present invention has been described with respect to what is presently considered to be the preferred embodiments, it is to be understood that the invention is not restricted to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur preventing apparatus comprising:
    a movable member movable to perform image blur prevention;
    a driving device which produces a drive force for driving said movable member so as to move in accordance with a signal corresponding to a fluctuation;
    a regulating member operable to regulate movement of said movable member, said regulating member being movable to a regulating position, in which movement of said movable member is regulated by said regulating member, and to a non-regulating position, in which movement of said movable member is not regulated by said regulating member; and
    a step driving motor which moves said regulating member to the regulating position or the non-regulating position, said step driving motor including means for holding said step driving motor at a stopped position during non-electrical energization with a self-holding force, thereby holding said regulating member at a predetermined position.

2. An image blur preventing apparatus according to claim 1, wherein said holding means holds said regulating member in the regulating position during non-electrical energization.

3. An image blur preventing apparatus according to claim 1, wherein said holding means holds said regulating member in the non-regulating position during non-electrical energization.

4. An image blur preventing apparatus according to claim 1, wherein said movable member includes an optical member.

5. An image blur preventing apparatus according to claim 4, wherein said optical member corrects image blur by deflecting a light beam.

6. An image blur preventing apparatus according to claim 4, wherein said optical member corrects image blur by operation in a direction perpendicular to an optical axis thereof.

7. An image blur preventing apparatus according to claim 1, further comprising a member positioned at the end of a range of movement of said movable member, and a resilient member that imparts a biasing force to said movable member, said resilient member thereby preventing movement of said movable member that causes said movable member to strike against the member positioned at the end of the range of movement of said movable member.

8. An image blur preventing apparatus according to claim 7, wherein said resilient member includes means for generating a biasing force along a direction in which said resilient member moves when said movable member performs image blur prevention.

9. An image blur preventing apparatus according to claim 1, wherein said regulating member includes means for locking said movable member.

10. An image blur prevention apparatus comprising:
    a movable member movable to perform image blur prevention;
    a driving device which produces a drive force for driving said movable member so as to move in accordance with a signal corresponding to a fluctuation;
    a regulating member operable to regulate movement of said movable member, said regulating member being movable to switch over between a regulating state, in which movement of said movable member is regulated, and a releasing state, in which movement of said movable member is not regulated; and
    a motor which moves said regulating member to switch over said regulating member between the regulating state and the non-regulating state, and where said motor is stopped by a self-holding force during non-electrical energization, thereby substantially fixing said regulating member with the self-holding force.

11. An image blur prevention apparatus according to claim 10, wherein said motor includes a step driving motor.

12. An image blur prevention apparatus according to claim 10, wherein said motor includes means for holding said regulating member in a position that regulates movement of said movable member with a self-holding force during non-electrical energization.

13. An image blur prevention apparatus according to claim 10, wherein said motor includes means for holding said regulating member in a position that does not regulate movement of said movable member with a self-holding force during non-electrical energization.

* * * * *

UNITED STATES PATENT AND TRADEMARK OFFICE
CERTIFICATE OF CORRECTION

PATENT NO. : 5,974,269

DATED : October 26, 1999

INVENTOR(S): SHIGEKI SATO, ET AL.                           Page 1 of 5

It is certified that error appears in the above-identified patent and that said Letters Patent is hereby corrected as shown below:

At Item [30] Foreign Application Priority Data

"Nov. 17, 1996" should read --Nov. 7, 1996--.

At Item [57] ABSTRACT

Line 11, "position,:wherein" should read --position, wherein--.

Column 1

Line 18, "cosumption" should read --consumption--.
    Line 26, "as a" should be deleted.

Column 2

Line 23, "therebyeffect" should read --thereby effect--.
    Line 24, "In" should read --in--.

UNITED STATES PATENT AND TRADEMARK OFFICE
CERTIFICATE OF CORRECTION

PATENT NO. : 5,974,269

DATED : October 26, 1999

INVENTOR(S): SHIGEKI SATO, ET AL.

It is certified that error appears in the above-identified patent and that said Letters Patent is hereby corrected as shown below:

Column 5

Line 33, "tape." should read --tape).--
    Line 46, "becomes:" should read --becomes--.

Column 6

Line 65, "Invention," should read --invention,--.

Column 10

Line 57, "mirror-up:" should read --mirror-up--.

Column 11

Line 4, "Is" should read --is--.
    Line 23, "Is" should read --is--.

Column 12

Line 20, "arcuately" should read --accurately--.

UNITED STATES PATENT AND TRADEMARK OFFICE
CERTIFICATE OF CORRECTION

PATENT NO. : 5,974,269

DATED : October 26, 1999

INVENTOR(S): SHIGEKI SATO, ET AL.

It is certified that error appears in the above-identified patent and that said Letters Patent is hereby corrected as shown below:

Column 13

Line 38, "later, a" should read --later.  A--.

Column 14

Line 1, "the both" should read --both--.
Line 18, "as shown,." should read --as shown,--.
Line 37, "about" should read --about by--.
Line 64, "in" should read --is--.

Column 15

Line 3, "scale,." should read --scale,--.
Line 16, "the:" should read --the--.
Line 26, "counter-clockwisely," should read --counter-clockwise,--.

Column 18

Line 28, "the" should be deleted.

UNITED STATES PATENT AND TRADEMARK OFFICE
CERTIFICATE OF CORRECTION

PATENT NO. : 5,974,269

DATED : October 26, 1999

INVENTOR(S): SHIGEKI SATO, ET AL.

Page 4 of 5

It is certified that error appears in the above-identified patent and that said Letters Patent is hereby corrected as shown below:

Column 20

Line 31, "etc" should read --etc.,--.

Column 22

Line 22, "these" should read --this--.

Column 23

Line 17, "above-described-operations" should read --above-described operations--.
    Line 40, "stopped" should read --stopped, and--.
    Line 50, "the" should read --a--.

Column 25

Line 59, "causes" should read --cause--.
    Line 64, "(overshoots)," should read --(overshoots)--.

UNITED STATES PATENT AND TRADEMARK OFFICE
CERTIFICATE OF CORRECTION

PATENT NO. : 5,974,269

DATED : October 26, 1999

INVENTOR(S): SHIGEKI SATO, ET AL.

It is certified that error appears in the above-identified patent and that said Letters Patent is hereby corrected as shown below:

Column 29

Line 52, "signal-lens" should read --single lens--.

Column 31

Line 31, "means such" should read --mean, such--.

Column 32

Line 67, "non-regulating" should read --releasing--.

Signed and Sealed this

Twenty-first Day of November, 2000

Attest:

Q. TODD DICKINSON

Attesting Officer      Director of Patents and Trademarks